(12) United States Patent
Miyatake

(10) Patent No.: US 6,925,253 B2
(45) Date of Patent: Aug. 2, 2005

(54) ZOOM LENS AND ELECTRONIC STILL CAMERA USING IT

(75) Inventor: Yoshito Miyatake, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 251 days.

(21) Appl. No.: 10/473,545

(22) PCT Filed: Apr. 1, 2002

(86) PCT No.: PCT/JP02/03246

§ 371 (c)(1),
(2), (4) Date: Sep. 29, 2003

(87) PCT Pub. No.: WO02/082158

PCT Pub. Date: Oct. 17, 2002

(65) Prior Publication Data

US 2004/0076417 A1 Apr. 22, 2004

(30) Foreign Application Priority Data

| Apr. 2, 2001 | (JP) | ......................................... 2001-103234 |
| Nov. 21, 2001 | (JP) | ......................................... 2001-356412 |

(51) Int. Cl.[7] ............................. G03B 5/00; G02B 15/14
(52) U.S. Cl. ....................... 396/79; 348/240.3; 359/684; 359/689
(58) Field of Search ....................... 396/79; 348/240.3; 359/682, 684, 689, 784

(56) References Cited

U.S. PATENT DOCUMENTS

| 5,666,232 | A | * | 9/1997 | Toyama ..................... 359/689 |
| 5,715,097 | A | | 2/1998 | Shibayama et al. .......... 359/691 |
| 5,872,660 | A | | 2/1999 | Kohno et al. ............... 359/689 |
| 5,991,091 | A | | 11/1999 | Hayakawa ................... 359/680 |
| 6,124,984 | A | | 9/2000 | Shibayama et al. ......... 359/689 |
| 6,169,635 | B1 | | 1/2001 | Ozaki et al. ................. 359/691 |
| 6,308,011 | B1 | | 10/2001 | Wachi et al. ................. 396/72 |
| 6,614,599 | B1 | * | 9/2003 | Watanabe .................... 359/689 |
| 6,654,180 | B2 | * | 11/2003 | Ori ............................ 359/689 |
| 6,671,103 | B2 | * | 12/2003 | Itoh ............................ 359/689 |

FOREIGN PATENT DOCUMENTS

| EP | 1 096 287 | 5/2001 | ......... G02B/15/177 |
| EP | 1 103 834 | 5/2001 | .......... G02B/15/16 |
| JP | 2-118509 | 5/1990 | .......... G02B/15/16 |
| JP | 6-94996 | 4/1994 | ......... G02B/15/163 |
| JP | 7-63992 | 3/1995 | .......... G02B/15/16 |
| JP | 8-111804 | 4/1996 | .......... H04N/5/232 |
| JP | 8-327907 | 12/1996 | .......... G02B/15/20 |
| JP | 9-21950 | 1/1997 | .......... G02B/15/16 |
| JP | 9-258103 | 10/1997 | .......... G02B/15/22 |
| JP | 10-39214 | 2/1998 | ......... G02B/15/163 |

(Continued)

OTHER PUBLICATIONS

Kimura K. et al., "Application of aberration theory to image stabilizing systems", *19th Optics Symposium Proceedings*, 1994, pp 47–50, with English Translation.

(Continued)

*Primary Examiner*—W. B. Perkey
(74) *Attorney, Agent, or Firm*—Merchant & Gould, P.C.

(57) ABSTRACT

A zoom lens comprising, disposed in order from an object side to an image surface side, a negative-power first lens group, a diaphragm, a positive-power second lens group, and a positive power third lens group, characterized in that, when zooming from a wide-angle end to a telelscope end, an air gap between the first lens group and the second lens group shrinks and an air gap between the second lens group and the third lens group expands, the third lens group is movable in an optical axis direction for focusing, and a zoom ratio at a shooting distance of ∞ is 2.5- to 3.2- magnification.

37 Claims, 42 Drawing Sheets

FOREIGN PATENT DOCUMENTS

| JP | 10-170826 | 6/1998 | ........... G02B/15/16 |
| JP | 11-52245 | 2/1999 | ........... G02B/15/20 |
| JP | 11-52246 | 2/1999 | ........... G02B/15/20 |
| JP | 11-223768 | 8/1999 | ........... G02B/15/14 |
| JP | 11-287953 | 10/1999 | ........... G02B/15/16 |
| JP | 2000-89110 | 3/2000 | ........... G02B/15/16 |
| JP | 2000-231149 | 8/2000 | ........... G03B/17/14 |
| JP | 2000-298235 | 10/2000 | ........... G02B/15/16 |
| JP | 2001-033702 | 2/2001 | ......... G02B/15/163 |
| JP | 2001-66503 | 3/2001 | ........... G02B/15/20 |
| JP | 2001-100098 | 4/2001 | ......... G01B/15/163 |

OTHER PUBLICATIONS

Matsui Y., "Theory of Decentred Optical System and Its Application", *Kogaku*, Dec. 1995, vol. 24(12), pp 708–712, with English Translation.

\* cited by examiner

ZOOM LENS AND ELECTRONIC STILL CAMERA USING IT

TECHNICAL FIELD

The present invention relates to zoom lenses and electronic still cameras using the same. More specifically, it relates to high-picture quality zoom lenses used in electronic still cameras, zoom lenses provided with a camera shake-correction function, and electronic still cameras using these zoom lenses.

BACKGROUND ART

As personal computers have become more sophisticated and widespread, electronic still cameras quickly have gained popularity as image input devices. The total pixel number of the solid-state imaging elements used in electronic still cameras has reached more than 1 million pixels, and recently, electronic still cameras provided with solid-state imaging elements having a total pixel number greater than 3 million pixels also have appeared on the market. Video cameras that are capable of shooting high-quality still images in addition to moving pictures also have been released on the market.

Although electronic still cameras come in many forms, one example is a compact type electronic still camera provided with a zoom lens having a ×2 to ×3 zoom ratio. Compact electronic still cameras must be easy to carry, and zoom lenses constituted by three groups have been proposed as zoom lenses that meet this requirement (for example, JP H11-52246A and JP H11-287953A). Zoom lenses constituted by three groups are made of a first lens group having a negative power, a second lens group having a positive power, and a third lens group having a positive power, arranged in that order from the object side to the image plane side. When zooming from the wide-angle end to the telescope end, the air gap between the first lens group and the second lens group is monotonically reduced and the air gap between the second lens group and the third lens group is monotonically increased. The third lens group is moved in the direction of the optical axis to carry out focus adjustment. Here, the third lens group is suited for autofocus because it is made of a single lens with a small outer diameter and can be driven at high speeds using a compact motor. Movement of the first lens group and the second lens group is carried out using cylindrical cams. Consequently, a collapsing configuration in which all three lens groups are drawn toward the solid-state imaging element using cylindrical cams when the zoom lens is not in use can be adopted. Also, if such a zoom lens is used in an electronic still camera, then the electronic still camera can be made thin in the depth direction when not in use.

With solid-state imaging elements, when the pixel number is increased but the picture size is kept the same, the pixel pitch becomes smaller, lowering the aperture ratio and the photosensitivity. Accordingly, by providing a miniature positive lens at each pixel of the solid-state imaging element, the effective aperture ratio is increased, preventing a drop in the photosensitivity. In this case, to let most of the light emitted from the miniature positive lenses arrive at the corresponding pixels, it is necessary to configure the zoom lens so that the principal rays that are incident on the pixels are substantially parallel to the optical axis. That is, there must be good telecentricity.

Solid-state imaging element performs spatial sampling due to their pixel structure, however, an optical low-pass filter generally is arranged between the zoom lens and the solid-state imaging element to remove the aliasing distortion that occurs at this time, removing high-frequency components from the image formed by the zoom lens. Optical low-pass filters generally are made of a quartz plate. Here, when natural light is incident on the quartz plate, the natural light is split into an ordinary ray and an extraordinary ray due to the birefringence of the quartz, and these are emitted parallel to one another.

Among video cameras, video cameras provided with a camera shake-correction function for correcting vibration in the captured image when the user's hand shakes have been released on the market. Many techniques have been proposed for camera shake correction, and a method for parallel displacement of a portion of the lens groups of the zoom lens in the direction perpendicular to the optical axis has been adopted (for example, JP 2000-298235A).

JP H11-52245A discloses a zoom lens made of a first lens group having a negative power, a second lens group having a positive power, a third lens group having a positive power, and a fourth lens group having a positive power or a negative power, arranged in that order from the object side to the image plane side, wherein correction of camera shake is carried out by parallel displacement of the third lens group in the direction perpendicular to the optical axis. This publication also discloses that decentered curvature of field and decentered coma aberration when the third lens group is parallel displaced can be corrected favorably.

Regarding the design of a zoom lens provided with a camera shake-correction function, Kenichi KIMURA et. al. in "Aberration Theory Applications in Anti-Vibration Optical Systems". (19th Optics Symposium Proceedings, page 47 to 50, 1994) have proposed a method for using decentered third-order aberration. Also, Yoshiya MATSUI in "Theory of Decentered Optical System and Its Application" (*Kogaku*, Volume 24 Issue 12, page 708 to 712, December 1995) present a third-order aberration theory of decentered optical system .

To provide the images captured by an electronic still camera with high resolution, its zoom lens must have high resolution. However, the astigmatism of the zoom lens disclosed in the aforementioned JP H11-287953A is insufficient for correcting the curvature of field, and thus there is the problem that the overall image cannot be made high resolution.

To make an electronic still camera thin in the depth direction when not in use, it is possible to adopt a configuration in which the zoom lens collapses, however, to shorten the overall optical length (the distance from the object side end of the zoom lens to the light-receiving surface of the solid-state imaging element) when a three-group zoom lens is collapsed, it is necessary to shorten the overall length of each of the lens groups. However, with the zoom lens disclosed in the aforementioned JP H11-52246A, since the second lens group includes a long air gap or a lens with a thick center portion, there is the problem that the overall length of the second lens group is long and even if a collapsing configuration is adopted, the overall optical length when collapsed is not very short. Also, a moving lens barrel that moves during zooming and a stationary lens barrel that supports the moving lens barrel are required for a collapsing configuration, however, if the overall optical length during use is significantly longer than the overall optical length when collapsed, then the stationary lens barrel cannot stably support the moving lens barrel, and thus there is the problem that a portion of the lens groups becomes decentered, leading to a drop in the image-formation properties of the captured image.

The zoom lens disclosed in JP H11-52245A is made of ten or eleven lenses, and since the number of lenses is large, there is the problem of increased costs. Another problem with the zoom lens disclosed in this publication is that it has poor telecentricity.

Because the number of pixels of solid-state imaging elements used in electronic still cameras is much larger than the number of pixels of solid-state imaging elements used in conventional video cameras, when a video camera zoom lens provided with a camera shake-correction function is used in an electronic still camera, the image-formation properties at the peripheral portion of image in a state where camera shake is corrected are poorer than the image-formation properties in a state where camera shake has not been corrected (in the standard state).

If camera shake correction is performed by parallel displacement of a portion of the lens groups in the direction perpendicular to the optical axis, then to obtain good image-formation properties when camera shake is corrected, it is conceivably possible to reduce as much as possible the various aberrations in the lens groups that is parallel displaced. To do this, however, a large number of lenses must be combined, making the lens group that is parallel displaced heavy. When the lens group that is parallel displaced is heavy, an actuator with a large drive force and large external dimensions must be used to secure the required response speed. However, when the actuator is large, it is difficult to achieve an electronic still camera that is compact.

DISCLOSURE OF INVENTION

The present invention was arrived at in order to solve the foregoing problems of the prior art, and it is an object thereof to provide zoom lenses with a zoom ratio of ×2.5 to ×3.2 and an angle of view at the wide-angle end of about 60°, and that have high resolution and a short overall optical length when not in use, and moreover to provide zoom lenses that include a camera shake correction function. It is a further object of the present invention to use these zoom lenses to provide electronic still cameras with high resolution and that are thin in the depth direction when not being used, and furthermore to provide electronic still cameras that include a camera shake correction function.

To achieve the foregoing objects, a zoom lens of a first configuration according to the present invention is provided with a first lens group with a negative power, an aperture stop, a second lens group with a positive power, and a third lens group with a positive power, arranged in that order from an object side to an image plane side; wherein the first lens group includes a first lens that is a negative meniscus lens whose surface with strong curvature is facing the image plane, a second lens that is a negative meniscus lens whose surface with strong curvature is facing the image plane, and a third lens that is a positive lens, arranged in that order from the object side, the second lens group includes a fourth lens that is a positive lens, a fifth lens that is a positive lens, a sixth lens that is a negative lens, and a seventh lens that is a positive lens, arranged in that order from the object side, the third lens group includes a single positive lens and can be moved in the optical axis direction for focus adjustment, the image plane-side surface of the first lens or the second lens is an aspherical surface whose local radius of curvature is monotonically increased as distance from the center increases, the object-side surface of the fourth lens is an aspherical surface whose local radius of curvature is monotonically increased as distance from the center increases, the object-side surface of the seventh lens is an aspherical surface whose local radius of curvature is monotonically increased as distance from the center increases, or the image plane-side surface of the seventh lens is an aspherical surface whose local radius of curvature is monotonically decreased as distance from the center increases, wherein when zooming from a wide-angle end to a telescope end, an air gap between the first lens group and the second lens group is reduced and an air gap from the second lens group to the third lens group is increased, and a zoom ratio is ×2.5 to ×3.2 if the shooting distance is ∞.

In the zoom lens of the first configuration according to the present invention, when the shooting distance is ∞, $f_W$ is a combined focal length of the overall lens system at the wide-angle end, $f_{G2}$ is a combined focal length of the second lens group, $f_{G3}$ is a combined focal length of the third lens group, and $d_{L6}$ is an air gap between the sixth lens and the seventh lens, it is preferable that then the conditional expressions $$2.0 < f_{G2}/f_W < 3.0 \tag{1}$$

$$4.0 < f_{G3}/f_W < 7.0 \tag{2}$$

$$0.02 < d_{L6}/f_{G2} < 0.1 \tag{3}$$

are satisfied.

In this case, when $f_4$ is a focal length of the fourth lens and $f_7$ is a focal length of the seventh lens, then it is preferable that the conditional expressions $$0.8 < f_4/f_{G2} < 1.2 \tag{4}$$

$$1.6 < f_7/f_{G2} < 3.0 \tag{5}$$

are satisfied.

In the zoom lens of the first configuration according to the present invention, it is preferable that the fifth lens and the sixth lens are cemented.

In the zoom lens of the first configuration according to the present invention, it is preferable that the sixth lens and the seventh lens are in contact outside their effective diameters.

In the zoom lens of the first configuration according to the present invention, it is preferable that the third lens group is a cemented lens constituted by a positive lens and a negative lens.

In the zoom lens of the first configuration according to the present invention, it is preferable that the surface of the fourth lens that is on the image plane side is a flat surface.

A zoom lens of a second configuration according to the present invention is provided with a first lens group with a negative power, an aperture stop, a second lens group with a positive power, and a third lens group with a positive power, arranged in that order from an object side to an image plane side, wherein when zooming from a wide-angle end to a telescope end, an air gap between the first lens group and the second lens group is reduced and an air gap between the second lens group and the third lens group is increased, the third lens group can be moved in the optical axis direction for focus adjustment, the second lens group can be parallel displaced in the direction perpendicular to the optical axis, a zoom ratio is ×2.5 to ×3.2 if the shooting distance is ∞, and when $m_{G2T}$ is the magnification of the second lens group at the telescope end with a shooting distance of ∞ and $m_{G3T}$ is the magnification of the third lens group at the telescope end with a shooting distance of ∞, and σ is defined as σ=(1−$m_{G2T})m_{G3T}$, then the conditional expression $$1.7 < |\sigma| < 2.1 \tag{6}$$

is satisfied.

In the zoom lens of the second configuration according to the present invention, it is preferable that the first lens group includes a first lens that is a negative meniscus lens whose surface with strong curvature is facing the image plane, a second lens that is a negative meniscus lens whose surface with strong curvature is facing the image plane, and a third lens that is a positive lens, arranged in that order from the object side, that the second lens group includes a fourth lens that is a positive lens, a fifth lens that is a positive lens, a sixth lens that is a negative lens, and a seventh lens that is a positive lens, arranged in that order from the object side, that the third lens group includes a single positive lens, that the image plane-side surface of the first lens or the second lens is an aspherical surface whose local radius of curvature is monotonically increased as distance from the center increases, that the object-side surface of the fourth lens is an aspherical surface whose local radius of curvature is monotonically increased as distance from the center increases, that the object-side surface of the seventh lens is an aspherical surface whose local radius of curvature is monotonically increased as distance from the center increases, or the image plane-side surface of the seventh lens is an aspherical surface whose local radius of curvature is monotonically decreased as distance from the center increases, that an air gap between the aperture stop and the second lens group is constant, and that the position of the aperture stop in the direction perpendicular to the optical axis is fixed.

In this case, it is preferable that the fifth lens and the sixth lens are cemented.

In this case, it is also preferable that the sixth lens and the seventh lens are in contact outside their effective diameters.

In this case, it is moreover preferable that the third lens group is a cemented lens constituted by a positive lens and a negative lens.

In this case, it is also preferable that the surface of the fourth lens that is on the image plane side is a flat surface.

In the zoom lens of the second configuration according to the present invention, when the shooting distance is ∞, $f_W$ is a combined focal length of the overall lens system at the wide-angle end, $f_{G2}$ is a combined focal length of the second lens group, $f_{G3}$ is a combined focal length of the third lens group, and $d_{L6}$ is an air gap between the sixth lens and the seventh lens, then it is preferable that the conditional expressions $$2.2 < f_{G2}/f_W < 2.8 \quad (7)$$

$$4.0 < f_{G3}/f_W < 7.0 \quad (8)$$

$$0.02 < d_{L6}/f_{G2} < 0.1 \quad (9)$$

are satisfied.

In this case, when $f_4$ is a focal length of the fourth lens and $f_7$ is a focal length of the seventh lens, then it is preferable that the conditional expressions $$0.8 < f_4/f_{G2} < 1.2 \quad (10)$$

$$1.5 < f_7/f_{G2} < 3.0 \quad (11)$$

are satisfied.

In the zoom lens of the second configuration according to the present invention, when $n_7$ is the refractive index of the seventh lens, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end when the shooting distance is ∞, then it is preferable that $B_7$ in Expression 1 satisfies the below condition.

$$-5 < B_7 < -15 \quad (12)$$

$$B_7 = (n_7 - 1)\left(\frac{\kappa_{7F}}{r_{7F}^3} + 8D_{7F} - \frac{\kappa_{7R}}{r_{7R}^3} - 8D_{7R}\right)f_T^3 \quad \text{Expression 1}$$

An electronic still camera of a first configuration according to the present invention includes a zoom lens and a solid-state imaging element, wherein the zoom lens that is used is the zoom lens of the first configuration according to the present invention.

In the electronic still camera of the first configuration according to the present invention, it is preferable that a miniature positive lens is provided at each pixel of the solid-state imaging element.

An electronic still camera of a second configuration according to the present invention is provided with a zoom lens in which a portion of the lens groups are parallel displaced in a direction perpendicular to an optical axis, a solid-state imaging element, a camera shake detection means for detecting a camera shake angle in two directions, and a lens group drive means for parallel displacing the parallel displaced lens group in correspondence with signals output by the camera shake detection means, wherein the zoom lens that is used is the zoom lens of the second configuration according to the present invention.

In the electronic still camera of the second configuration according to the present invention, it is preferable that a miniature positive lens is provided at each pixel of the solid-state imaging element.

The electronic still camera of the second configuration according to the present invention is preferably provided with an electronic zoom means that uses a signal processing circuit to magnify, up to the entire picture, an image formed in a center portion of the solid-state imaging element.

Hereinafter, the operations of the zoom lenses of the first configuration and the second configuration of the present invention are described.

A lens system made of a first lens group having a negative power and a second lens group having a positive power is configured so that the focal length of the overall lens system is changed by altering the air gap between the two lens groups. Also, by shifting the third lens group having a positive power in the direction of the optical axis, focus adjustment is performed. The third lens group has good telecentricity, and thus a drop in photosensitivity at portions around the picture at the wide-angle end in a case where a solid-state imaging element provided with miniature positive lenses for each pixel is used can be prevented. Also, the third lens group is small and lightweight, and can be driven at high speeds using a compact motor, thus allowing autofocus adjustment to be performed at high speeds.

By constituting the first lens group by three lenses, a negative lens (first lens), a negative lens (second lens), and a positive lens (third lens) and making the image plane-side surface of one of the two negative lenses an aspherical surface, it is possible to suppress negative distortion. Also, by generating positive distortion at the positive lens, it is possible to reduce negative distortion at the wide-angle end of the overall lens system. Moreover, because the image plane-side surface of either the first lens or the second lens is an aspherical surface whose local radius of curvature monotonically increases with increased distance from the center, negative distortion that occurs at the first lens or the second lens can be reduced. Furthermore, with respect to the seventh lens of the second lens group that is disposed furthest on the image plane side, either its surface on the object side is an aspherical surface whose local radius of curvature increases monotonically with increased distance from the center or its surface on the image plane side is an aspherical surface whose local radius of curvature decreases monotonically with increased distance from the center, so that there is less negative distortion generated at the seventh lens than if both of its surfaces were spherical. Through these three operations, a reduction in negative distortion at the wide-angle end of the overall lens system is achieved.

The local radius of curvature ρ at the height h of the aspherical surface from the optical axis is found as shown in Expression 2

$$\rho = \frac{\left(1 + \left(\frac{dz}{dh}\right)^2\right)^{3/2}}{\frac{d^2z}{dh^2}}$$

Expression 2

In Expression 2 above, z denotes the sag amount at a height h on the aspherical surface from the optical axis.

The local curvature is defined as $1/\rho$.

The second lens group is made of four lenses, and a positive lens with a strong positive power is disposed furthest on the object side and a positive lens with a weak positive power is disposed furthest on the image plane side, so that the principal point of the second lens group on the object side is deviated toward the object side. Consequently, at the telescope end where the first lens group and the second lens group are nearest one another, the distance between the principal point on the image plane side of the first lens group and the principal point on the object side of the second lens group can be shortened. As a result, it is possible to reduce the combined focal length of the second lens group, allowing the overall optical length when in use to be shortened.

Making at least one of the surfaces of the seventh lens an aspherical surface reduces distortion, and this creates space that allows the air gap between the sixth lens and the seventh lens to be reduced. Also, by cementing the fifth lens and the sixth lens to one another, the overall length of the second lens group can be reduced. Furthermore, by constituting the third lens group by a single lens or a cemented lens made of two lenses, the overall length of the third lens group can be shortened. As a result, the overall optical length of the zoom lens of the present invention when collapsed is shortened.

Because an aperture stop is arranged near the object side of the second lens group, the incidence height of the axial ray is largest at the fourth lens. Consequently, making the object-side surface of the fourth lens an aspherical surface in which the local radius of curvature increases monotonically with increased distance from the center allows the overall spherical aberration of the lens system to be reduced.

The decenter tolerances of the four lenses making up the second lens group are apt to become severe. By cementing the fifth lens and the sixth lens and making the sixth lens and the seventh lens contact one another outside their effective diameters, there is less decenter during assembly. Also, making the image plane-side surface of the fourth lens a flat surface allows the position of the fourth lens to be easily adjusted in the direction perpendicular to the optical axis by attaching the fourth lens after the fifth lens, the sixth lens, and the seventh lens are incorporated into a lens barrel supporting the four lenses of the second lens group, and thus makes it possible to further reduce the decenter of the lenses in the second lens group.

In the zoom lens of the present invention, if the camera is shaken while a picture is being captured, the second lens group can be parallel displaced by an appropriate amount in the direction perpendicular to the optical axis so as to keep the subject that is formed on the solid-state imaging element from moving, without much deterioration of the image forming properties during camera shake correction. Here, a parallel displacement amount of zero of the second lens group is referred to as the "standard state" and the state in which the second lens group has been parallel displaced is the "state where camera shake has been corrected."

The inventors of the present invention independently evaluated decentered third-order aberration, and after performing various tests, found that a method for parallel displacing the second lens group perpendicularly to the optical axis is useful for correcting camera shake in a zoom lens constituted by three lens groups.

When the magnification of the second lens group (parallel displaced lens group) is regarded as $m_{G2}$ and the magnification of the third lens group is regarded as $m_{G3}$, then the amount of image decenter $e_M$ when the second lens group is parallel displaced by the amount $e_{G2}$ perpendicularly to the optical axis is expressed by:

$$e_M = (1 - m_{G2}) m_{G3} e_{G2} \tag{21}$$

To prevent the image-formation properties from becoming worse during correction of camera shake, it is necessary that the change in aberration between the standard state and the state where camera shake has been corrected is kept small. The inventors of the present invention realized that, although a light beam with a small angle of view that passes through the center portion of the aperture stop can be approximated by third-order aberration, there is an increase in approximation error when a light beam that passes through the peripheral portion of the aperture stop is approximated by third-order aberration, and reached the conclusion that to achieve good image-formation properties during camera shake correction, the light beam that passes through the center portion of the aperture stop and the light beam that passes through the peripheral portion the aperture stop should be considered separate. Also, in the present invention, the amount of parallel displacement of the second lens group (parallel displaced lens group) with respect to the light beam that passes through peripheral portion of the aperture stop is kept small and the decentered third-order aberration that occurs at the second lens group (parallel displaced lens group) with respect to the light beam that passes through the center portion of the aperture stop is kept small, so as to keep the image-formation properties from deteriorating when camera shake is corrected.

It is clear from Expression 21 that $(1-m_{G2})m_{G3}$ can be increased to keep the amount of parallel displacement of the second lens group (parallel displaced lens group) small. However, when $(1-m_{G2})m_{G3}$ is made too large it becomes difficult to securely align the image to a constant position during camera shake correction. Accordingly, in the present invention, the amount by which the second lens group (parallel displaced lens group) is parallel displaced is appropriately selected.

The inventor of the present invention, as the result of individually evaluating the decentered third-order aberration of the second lens group (parallel displaced lens group), has made the image-formation properties during the standard state good and reduced the decentered third-order aberration that occurs at the second lens group (parallel displaced lens group) with respect to the light beam that passes through the center portion of the aperture stop in the state where camera shake has been corrected. The surfaces of the second lens group (parallel displaced lens group) in which the decentered coma and the decentered astigmatism are large are the object side surface of the fourth lens, the image plane side surface of the sixth lens, and the aspherical surface of the seventh lens. Of these three surfaces, the object side surface of the fourth lens and the image plane side surface of the sixth lens govern the power distribution and are governed by the image-formation properties in the standard state, and therefore the parameters cannot be significantly changed. However, since both surfaces of the seventh lens have a low incidence height with respect to axial ray, the parameters of the aspherical surface of the seventh lens can be altered to a certain extent in order to achieve good image-formation properties during camera shake correction. Accordingly, in the present invention, conditions are provided with regard to the surface of the seventh lens that is aspherical so that the decentered coma and the decentered astigmatism of the second lens group (parallel displaced lens group) are small.

The Conditional Expressions mentioned above are described below.

Conditional Expression (1) is a condition for suppressing the simultaneous occurrence of various aberrations when the overall optical length is made extremely short. When $f_{G2}/f_W$ is above the upper limit, the overall optical length during use becomes long because the distance between the object and the image (distance from the object point to the image point) of the second lens group becomes long. In this case, although the overall optical length becomes short if the magnification of the third lens group is reduced, since the power of the third lens group is strong there is insufficient correction of the curvature of field that occurs at the third lens group, and it becomes difficult to correct this curvature of field at the first lens group and the second lens group. On the other hand, when $f_{G2}/f_W$ is below the lower limit there is the benefit that the overall optical length can be shortened, however, changes in the spherical aberration that occurs at the second lens group due to the zoom position become large, and it become difficult to correct the various aberrations in a balanced manner from the wide-angle end to the telescope end.

Conditional Expression (2) is a condition for reducing the slope angle of the principal ray at the maximum image height at which it is incident on the solid-state imaging element, that is, for improving the telecentricity, and for reducing the curvature of field. When $f_{G3}/f_W$ is below the lower limit, the telecentricity is good but the ability to correct the curvature of field of the overall lens system is lost. On the other hand, when $f_{G3}/f_W$ is above the upper limit, the curvature of field is reduced but the telecentricity is insufficient.

Conditional Expression (3) is a condition for correcting the various aberrations that occur at the second lens group in a balanced manner and for shortening the overall length of the second lens group. When $d_{L6}/f_{G2}$ is above the upper limit, the overall length of the second lens group becomes long. On the other hand, when $d_{L6}/f_{G2}$ is below the lower limit, the sixth lens and the seventh lens are in contact at peripheral portions, and thus it is no longer possible to strengthen the curvature of the image-plane side surface of the sixth lens or to reduce the curvature of the object-side surface of the seventh lens, and it is difficult to correct negative distortion at the wide-angle end. Also, the ability to correct coma and astigmatism is lost.

Conditional Expressions (4) and (5) are conditions for correcting the various aberrations that occur at the second lens group in a balanced manner and for shortening the overall optical length of the overall lens system when in use. When $f_4/f_{G2}$ is above the upper limit or when $f_7/f_{G2}$ is below the lower limit, the principal point on the object side of the second lens group is insufficiently deviated toward the object side, so that the minimum distance between the principal point on the image plane side of the first lens group and the principal point on the object side of the second lens group is no longer short and the combined focal length of the second lens group becomes long, and therefore it becomes difficult to shorten the overall optical length of the overall lens system when in use. Even if the overall optical length when collapsed can be made short, if the overall optical length of the overall lens system during use is long, then the first lens group and the second lens group cannot be securely supported during use, and thus it is difficult to achieve good image-formation properties during use. On the other hand, when $f_4/f_{G2}$ is below the lower limit or when $f_7/f_{G2}$ is above the upper limit, the overall optical length of the overall lens system during use can be reduced because the principal point on the object side of the second lens group is sufficiently deviated to the object side, however, since the power of the fourth lens becomes too strong, it becomes difficult to correct the spherical aberration and the coma that occur at the fourth lens in a balanced manner with the other lenses.

Conditional Expression (6) is a condition for achieving good image-formation properties during correction of camera shake. When $|\sigma|=|(1-m_{G2T})m_{G3T}|$ is below the lower limit, the amount of decenter of the second lens group (parallel displaced lens group) that is required to make the image decenter by a predetermined amount becomes too large, and thus the change in aberration due to parallel displacement of the second lens group (parallel displaced lens group) becomes large, resulting in worse image-formation properties at the margin of the image. On the other hand, when $|\sigma|=|(1-m_{G2T})m_{G3T}|$ is above the upper limit, the amount of decenter of the second lens group (parallel displaced lens group) that is required to make the image decenter by a predetermined amount becomes too small, and it is difficult to parallel displace the second lens group (parallel displaced lens group) with precision. As a result, it is not possible to sufficiently reduce pixel displacement while a picture is being captured, and thus it becomes difficult to achieve good image-formation properties during correction of camera shake.

Conditional Expressions (7) to (11) are the same as Conditional Expressions (1) to (5) described above. It should be noted that in Conditional Expression (1) and Conditional Expression (7) the lower limit and the upper limit values are different, and in Conditional Expression (5) and Conditional Expression (11) the lower limit values are different. This is because leeway is required in the image-formation properties in the standard state in order to achieve good image-formation properties during correction of camera shake, and thus the value range in Conditional Expression (7) is narrower than the value range in Conditional Expression (1).

The Conditional Expression (12) is a condition for reducing deterioration of the image-formation properties during correction of camera shake by restricting the conic constant and the fourth-order aspheric coefficient at the aspherical surface of the seventh lens with respect to the light beam with a small angle of view that passes through the center portion of the aperture stop. $B_7$ defined in Expression 1 is the amount that the aspherical surface of the seventh lens contributes to the third-order aberration in a lens system normalized so that the combined focal length at the telescope end of the entire lens system is 1. The expression in the second parenthesis on the right side of Expression 1 is of a case where both surfaces are aspherical surfaces, and if only one surface is aspherical, then there are only the two terms on the front side or the two terms on the latter side (for third-order aberration of a lens system in which decenter is not included, see "Lens Design Methods" by Yoshiya MATSUI (Kyoritsu Shuppan, first edition, eighth printing, Sep. 20, 1991), pages 86 and 87).

Since the incidence height of axial ray is low with the seventh lens, there is little change in the spherical aberration in the standard state even if the conic constant and the fourth-order aspheric coefficient of the seventh lens are changed, however, astigmatism in the standard state and coma and astigmatism if the second lens group (parallel displaced lens group) is parallel displaced are significantly changed. Accordingly, by making one of the surfaces of the seventh lens an aspherical surface and suitably selecting its conic constant and its fourth-order aspheric coefficient, the decentered coma and the decentered astigmatism of the second lens group as a whole in the state where camera shake has been corrected can be reduced with little deterioration of the image-formation properties in the standard state.

When $B_7$ is above the upper limit or below the lower limit in Conditional Expression (12), there is either too much or too little decentered coma and decentered astigmatism caused by the aspherical surface of the seventh lens, there is too much decentered coma and decentered astigmatism in the second lens group as a whole in the state where camera shake has been corrected, and it is no longer possible to correct deterioration in the image-formation properties in the state where camera shake is corrected.

A zoom lens of a third configuration according to the present invention is provided with a first lens group with a negative power, an aperture stop, a second lens group with a positive power, and a third lens group with a positive power, arranged in that order from an object side to an image plane side, wherein the first lens group includes a first lens that is a negative meniscus lens whose surface with strong curvature is facing the image plane, a second lens that is a negative meniscus lens whose surface with strong curvature is facing the image plane, and a third lens that is a positive lens, arranged in that order from the object side, the second lens group includes a fourth lens that is a positive lens, a fifth lens that is a positive lens, a sixth lens that is a negative lens, and a seventh lens that is a biconvex lens, arranged in that order from the object side, the third lens group includes a single positive lens and can be moved in the optical axis direction for focus adjustment, the image plane-side surface of the first lens or the second lens is an aspherical surface, the object-side surface of the fourth lens is an aspherical surface whose local radius of curvature is monotonically increased as distance from the center increases, the object-side surface or the image plane-side surface of the seventh lens is an aspherical surface where an absolute value of the local radius of curvature has a local maximum in a range from the center to the effective diameter, when zooming from a wide-angle end to a telescope end, an air gap between the first lens group and the second lens group is reduced and an air gap between the second lens group and the third lens group is increased, and if the shooting distance is ∞ a zoom ratio is ×2.5 to ×3.2.

In the zoom lens of the third configuration according to the present invention, when the shooting distance is ∞, $f_W$ is a combined focal length of the overall lens system at the wide-angle end, $f_{G2}$ is a combined focal length of the second lens group, $f_{G3}$ is a combined focal length of the third lens group, and $d_{L6}$ is an air gap between the sixth lens and the seventh lens, it is preferable that the conditional expressions $$2.2 < f_{G2}/f_W < 2.8 \tag{13}$$

$$4.0 < f_{G3}/f_W < 7.0 \tag{14}$$

$$0.05 < d_{L6}/f_{G2} < 0.15 \tag{15}$$

are satisfied.

In this case, when $f_4$ is a focal length of the fourth lens and $f_7$ is a focal length of the seventh lens, then it is preferable that the conditional expressions $$0.9 < f_4/f_{G2} < 1.2 \tag{16}$$

$$1.2 < f_7/f_{G2} < 1.7 \tag{17}$$

are satisfied.

In the zoom lens of the third configuration according to the present invention, it is preferable that the fifth lens and the sixth lens are cemented.

In the zoom lens of the third configuration according to the present invention, it is preferable that the image-plane side surface of the fourth lens is a flat surface.

In the zoom lens of the third configuration according to the present invention, if the image-plane side surface of the first lens is an aspherical surface, then it is preferable that the aspherical surface is an aspherical surface in which the local radius of curvature is monotonically increased as distance from the center increases.

In the zoom lens of the third configuration according to the present invention, if the image-plane side surface of the second lens is an aspherical surface, then it is preferable that the aspherical surface is an aspherical surface in which the local curvature is monotonically decreased as distance from the center increases and that the local curvature at the effective diameter is negative.

In the zoom lens of the third configuration according to the present invention, it is preferable that the third lens group is a cemented lens constituted by a positive lens and a negative lens.

A zoom lens of a fourth configuration according to the present invention is provided with a first lens group with a negative power, an aperture stop, a second lens group with a positive power, and a third lens group with a positive power, arranged in that order from an object side to an image plane side, wherein the lens of the second lens group furthest to the image-plane side can be parallel displaced in the direction perpendicular to an optical axis, the third lens group can be moved in the direction of the optical axis for focus adjustment, when zooming from a wide-angle end to a telescope end an air gap between the first lens group and the second lens group is reduced and an air gap between the second lens group and the third lens group is increased, a zoom ratio is ×2.5 to ×3.2 if the shooting distance is ∞, and when $m_{DT}$ is the magnification of the parallel displaced lens at the telescope end with a shooting distance of ∞ and $m_{G3T}$ is the magnification of the third lens group at the telescope end with a shooting distance of co, then the conditional expression $$0.9 < (1-m_{DT})m_{G3T} < 1.3 \tag{18}$$

is satisfied.

In the zoom lens of the fourth configuration according to the present invention, it is preferable that the first lens group includes a first lens that is a negative meniscus lens whose surface with strong curvature is facing the image plane, a second lens that is a negative meniscus lens whose surface with strong curvature is facing the image plane, and a third lens that is a positive lens, arranged in that order from the object side, that the second lens group includes a fourth lens that is a positive lens, a fifth lens that is a positive lens, a sixth lens that is a negative lens, and a seventh lens that is a biconvex lens, arranged in that order from the object side, that the third lens group includes a single positive lens, that the image plane-side surface of the first lens or the second lens is an aspherical surface, that the object-side surface of the fourth lens is an aspherical surface whose local radius of curvature is monotonically increased as distance from the center increases, that the object-side surface or the image plane-side surface of the seventh lens is an aspherical surface where an absolute value of the local radius of curvature has a local maximum in a range from the center to the effective diameter, that an air gap between the aperture stop and the second lens group is constant, and that the position of the aperture stop in the direction perpendicular to the optical axis is fixed.

In this case, if the image-plane side surface of the first lens is an aspherical surface, then it is preferable that the aspherical surface is an aspherical surface in which the local radius of curvature is monotonically increased as distance from the center increases.

Also, in this case, if the image-plane side surface of the second lens is an aspherical surface, then it is preferable that the aspherical surface is an aspherical surface in which the local curvature is monotonically decreased as distance from the center increases and that the local curvature at the effective diameter is negative.

In the zoom lens of the fourth configuration according to the present invention, when the shooting distance is ∞, $f_W$ is a combined focal length of the overall lens system at the wide-angle end, $f_{G2}$ is a combined focal length of the second lens group, $f_{G3}$ is a combined focal length of the third lens group, and $d_{L6}$ is an air gap between the sixth lens and the seventh lens, then it is preferable that the conditional expressions $$2.2 < f_{G2}/f_W < 2.8 \quad (13)$$

$$4.0 < f_{G3}/f_W < 7.0 \quad (14)$$

$$0.05 < d_{L6}/f_{G2} < 0.15 \quad (15)$$

are satisfied.

In this case, when $f_4$ is a focal length of the fourth lens and $f_7$ is a focal length of the seventh lens, then it is preferable that the conditional expressions $$0.9 < f_4/f_{G2} < 1.2 \quad (16)$$

$$1.2 < f_7/f_{G2} < 1.7 \quad (17)$$

are satisfied.

In the zoom lens of the fourth configuration according to the present invention, when $n_7$ is the refractive index of the seventh lens, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end when the shooting distance is ∞, then it is preferable that $B_7$ defined by Expression 3 below satisfies the conditions:

$$-0.7 < B_7 < -1.5 \quad (19)$$

$$B_7 = (n_7 - 1)\left(\frac{\kappa_{7F}}{r_{7F}^3} + 8D_{7F} - \frac{\kappa_{7R}}{r_{7R}^3} - 8D_{7R}\right)f_T^3 \quad \text{Expression 3}$$

In the zoom lens of the fourth configuration according to the present invention, when the Abbe number of the seventh lens at a d-line is $\nu_7$, then it is preferable that the conditional expression $$\nu_7 > 50 \quad (20)$$

is satisfied.

In the zoom lens of the fourth configuration according to the present invention, it is preferable that the fifth lens and the sixth lens are cemented.

In the zoom lens of the fourth configuration according to the present invention, it is preferable that the third lens group is a cemented lens constituted by a positive lens and a negative lens.

In the zoom lens of the fourth configuration according to the present invention, it is preferable that the image-plane side surface of the fourth lens is a flat surface.

An electronic still camera of a third configuration according to the present invention includes a zoom lens and a solid-state imaging element, wherein the zoom lens that is used is the zoom lens of the third configuration according to the present invention.

In the electronic still camera of the third configuration according to the present invention, it is preferable that a miniature positive lens is provided at each pixel of the solid-state imaging element.

An electronic still camera of a fourth configuration according to the present invention is provided with a zoom lens in which a portion of the lenses is parallel displaced in the direction perpendicular to the optical axis, a solid-state imaging element, a camera shake detection means for detecting a camera shake angle in two directions, and a lens drive means for parallel displacing the parallel displaced lens in correspondence with signals output by the camera shake detection means, wherein the zoom lens that is used is the zoom lens of the fourth configuration according to the present invention.

In the electronic still camera of the fourth configuration according to the present invention, it is preferable that a miniature positive lens is provided at each pixel of the solid-state imaging element.

The electronic still camera of the fourth configuration according to the present invention is preferably provided with an electronic zoom means that uses a signal processing circuit to magnify, up to the entire picture, an image formed in a center portion of the solid-state imaging element.

Hereinafter, the operations of the zoom lenses of the third configuration and the fourth configuration of the present invention are described, with emphasis placed on how they differ from the zoom lenses of the first and the second configurations.

In the third and fourth configurations as well, by constituting the first lens group by three lenses, a negative lens (first lens), a negative lens (second lens), and a positive lens (third lens) and making the image plane-side surface of one of the two negative lenses an aspherical surface, it is possible to suppress negative distortion. Also, by generating positive distortion at the positive lens, it is possible to reduce negative distortion at the wide-angle lens of the overall lens system.

If the image plane side surface of the first lens is an aspherical surface, then it is an aspherical surface in which the local radius of curvature is increased monotonically as distance from the center increases, and if the image plane side surface of the second lens is an aspherical surface, then it is an aspherical surface in which the local curvature is monotonically decreased as distance from the center increases and in which the local curvature at its effective diameter is negative. If both surfaces of the first and second lens, which are both negative lenses, are spherical, for a total of four spherical surfaces, then the refractive power becomes too strong as the point of incidence becomes farther from the center, thus causing a large negative distortion at the wide-angle end, however, by making the image plane-side surface of either one of the lenses an aspheric surface as described above, the refractive power can be kept from becoming extremely strong even if the point of incidence is distant from the center, and thus negative distortion can be kept from occurring at the wide-angle end.

The decenter tolerances of the three lens of the second lens group other than the parallel displaced lens are apt to become severe, and the decenter tolerance of the object-side surface of the fourth lens and the image plane-side surface of the sixth lens are apt to become particularly severe. Accordingly, the fifth lens and the sixth lens are cemented and the image plane-side surface of the fourth lens is given a flat surface. Cementing the fifth lens and the sixth lens reduces the decenter during assembly for these two lenses. Also, if the image plane side surface of the fourth lens is a flat surface, then it is easy to adjust the position of the fourth lens in the direction perpendicular to the optical axis by attaching the fourth lens after the combined fifth and sixth lenses are incorporated into a lens barrel for supporting the three lenses of the second lens group other than the parallel displaced lens, allowing a further reduction in the decenter of the lenses of the second lens group. It should be noted that the seventh lens is configured so that there is little decenter aberration even if it is parallel displaced for correction of camera shake, and the decenter tolerance is very large.

In the zoom lens of the present invention, if the camera is shaken while a picture is being captured, the parallel displaced lens element can be parallel displaced by an appropriate amount in the direction perpendicular to the optical axis so as to keep the subject that is formed on the solid-state imaging element from moving, without much deterioration of the image forming properties during camera shake correction.

The inventor of the present invention independently evaluated decentered third-order aberration, and after performing various tests, found that a method for parallel displacing the lens of the second lens group that is furthest on the image plane side perpendicularly to the optical axis is useful for correcting camera shake in a zoom lens constituted by three groups.

If the lens group that is parallel displaced perpendicularly to the optical axis for correction of camera shake can be constituted by a single lens, then the portion that is shifted becomes lightweight, so that an actuator that has a small drive force and small outer dimensions can be used to parallel displace the lens. As a result, the electronic still camera can be made compact.

When $m_D$ is the magnification of the parallel displaced lens and $m_{G3}$ is the magnification of the third lens group, the amount of image decenter $e_M$ when the parallel displaced lens is moved by the amount $e_D$ perpendicularly to the optical axis is expressed by:

$$e_M = (1-m_D)m_{G3}e_D \quad (21)$$

To prevent the image-formation properties from becoming worse during correction of camera shake, it is necessary that the change in aberration between the standard state and the state where camera shake has been corrected is kept small. The inventor of the present invention realized that, although a light beam with a small angle of view that passes through the center portion of the aperture stop can be approximated by third-order aberration, there is an increase in approximation error when a light beam that passes through the peripheral portion of the aperture stop is approximated by third-order aberration, and reached the conclusion that to achieve good image-formation properties during camera shake correction, the light beam that passes through the center portion of the aperture stop and the light beam that passes through the peripheral portion the aperture stop should be considered separate. Also, in the present invention, by reducing the amount of parallel displacement of the parallel displaced lens with respect to the light beam that passes through the peripheral portion of the aperture stop and making the object-side surface or the image plane-side surface of the parallel displaced lens an aspherical surface that satisfies predetermined conditions, the third-order decentered coma and the third-order astigmatism that occurs at the parallel displaced lens with respect to light beam that passes through the center portion of the aperture stop is kept small so as to keep the image-formation properties from deteriorating when camera shake is corrected.

It is clear from Expression 21 that $(1-m_D)m_{G3}$ can be increased to keep the amount of parallel displacement of the parallel displaced lens small. However, when $(1-m_{G2})m_{G3}$ is made too large it becomes difficult to securely align the image to a constant position during camera shake correction. Accordingly, in the present invention, the amount by which the parallel displaced lens is parallel displaced is appropriately selected.

Next, to reduce the third-order decentered coma and the third-order decentered astigmatism that are generated at the parallel displaced lens, at least one of the object side and the image plane side surfaces of the parallel displaced lens is made an aspherical surface and conditions are set for the conic constant and the fourth-order aspheric coefficient of the aspherical surface. That is, with regard to the local radius of curvature near the center of the aspherical surface of the parallel displaced lens, if the object-side surface of the parallel displaced lens is an aspherical surface, then it is made an aspherical surface with which the local radius of curvature is monotonically increased as distance from the center increases, and if the image plane side surface of the parallel displaced lens is an aspherical surface, then it is an aspherical surface whose local radius of curvature is monotonically decreased with increased distance from the center. Thus, the third-order decentered coma and the third-order decentered astigmatism that are generated at the parallel displaced lens during correction of camera shake can be suppressed.

With respect to the light beam that passes through the peripheral portion of the aperture stop, since the image plane side surface of the sixth lens has a small radius of curvature, the refractive power becomes excessive as the point of incidence becomes increasingly distant from the center, and the off-axis aberration that occurs at the peripheral portion of this surface easily becomes large. Accordingly, the refractive power of the peripheral portion of the aspherical surface on the object side or the image plane side surface of the seventh lens is made larger than the refractive power at the middle portion, and the refractive power at the peripheral portion is set to cancel out the excessive refractive power of the peripheral portion of the image plane side surface of the sixth lens. Therefore, the various aberrations that occurs at the parallel displaced lens with respect to the light beam that passes through the peripheral portion of the aperture stop can be favorably corrected.

Taking the above into account, if the object side surface of the parallel displaced lens is an aspherical surface, then it is an aspherical surface in which the local radius of curvature has one maximum in the range from the center to the effective diameter, and if the image plane side surface of the parallel displaced lens is an aspherical surface, then it is an aspherical surface in which the local radius of curvature has one local minimum in the range from the center to the effective diameter.

If the shooting distance is ∞, then with respect to the change from the wide-angle end to the telescope end, the change in the magnification $m_{G3}$ of the third lens group is extremely small and the change in the magnification $m_D$ of the parallel displaced lens is extremely large. If the camera shake angle is the same, then with respect to the change from the wide-angle end to the telescope end, the amount of image decenter $e_M$ that is required for camera shake correction is monotonically increased. Viewing the situation as a whole, if the camera shake angle is the same, then the amount of decenter that is required for camera shake correction of the parallel displaced lens monotonically increases with respect to the change from the wide-angle end to the telescope end. Consequently, the longer the combined focal length of the overall lens system, the greater the blur due to camera shake. If it is possible to perform camera shake correction at the telescope end up to a level at which in practice there are no problems, then it is possible to perform camera shake correction up to a level at which in practice there are no problems at other zoom positions as well.

If a single lens is parallel displaced perpendicularly to the optical axis, then noticeable chromatic aberration of magnification is prone to occur at a portion of the picture margin. To solve this problem, the Abbe number with respect to the d-line of the parallel displaced lens can be made large, and it is desirable that the Abbe number with respect to the d-line of the parallel displaced lens is larger than 50.

The Conditional Expressions mentioned above are described below.

Conditional Expressions (13) to (17) are the same as the Conditional Expressions (1) to (5), respectively.

Conditional Expression (18) is a condition for achieving good image-formation properties during correction of camera shake. When $(1-m_{DT})m_{G3T}$ is below the lower limit, the amount of decenter of the parallel displaced lens that is required to make the image decentered by a predetermined amount becomes too large, and thus the change in aberration due to parallel displacement of the parallel displaced lens (seventh lens) becomes large, resulting in deterioration of image-formation properties at the margin of the image. On the other hand, when $(1-m_{DT})m_{G3T}$ is above the upper limit, the amount of decenter of the parallel displaced lens (seventh lens) that is required to make the image decentered by a predetermined amount becomes too small and it is difficult to parallel displace the parallel displaced lens (seventh lens) with precision. As a result, it is not possible to sufficiently reduce pixel displacement while a picture shooting, and thus it becomes difficult to achieve good image-formation properties during correction of camera shake.

Conditional Expression (19) is the same as Conditional Expression (12).

When $B_7$ is above the upper limit or below the lower limit in Conditional Expression (19), there is either too much or too little third-order decentered coma and third-order decentered astigmatism caused by the aspherical surface of the seventh lens, there is too much third-order decentered coma and third-order decentered astigmatism at the seventh lens, and it is no longer possible to correct deterioration in the image-formation properties in the state where camera shake is corrected.

Conditional Expression (20) is an expression for suppressing chromatic aberration of magnification in the state where camera shake is corrected. If $v_7$ does not satisfy the conditions of Conditional Expression (20), then noticeable color blurring occurs in part of the picture if the seventh lens is parallel displaced for the purpose of camera shake correction.

If a single lens is parallel displaced perpendicularly to the optical axis, then noticeable chromatic aberration of magnification is prone to occur at a portion of the picture margin. To solve this problem, the Abbe number with respect to the d-line of the parallel displaced lens (seventh lens) can be made large, and it is preferable that the Abbe number with respect to the d-line of the parallel displaced lens (seventh lens) is greater than 50, as shown in Conditional Expression (20).

BEST MODE FOR CARRYING OUT THE PRESENT INVENTION

Hereinafter, the present invention is described in further detail using embodiments.

First Embodiment

Figure 1:
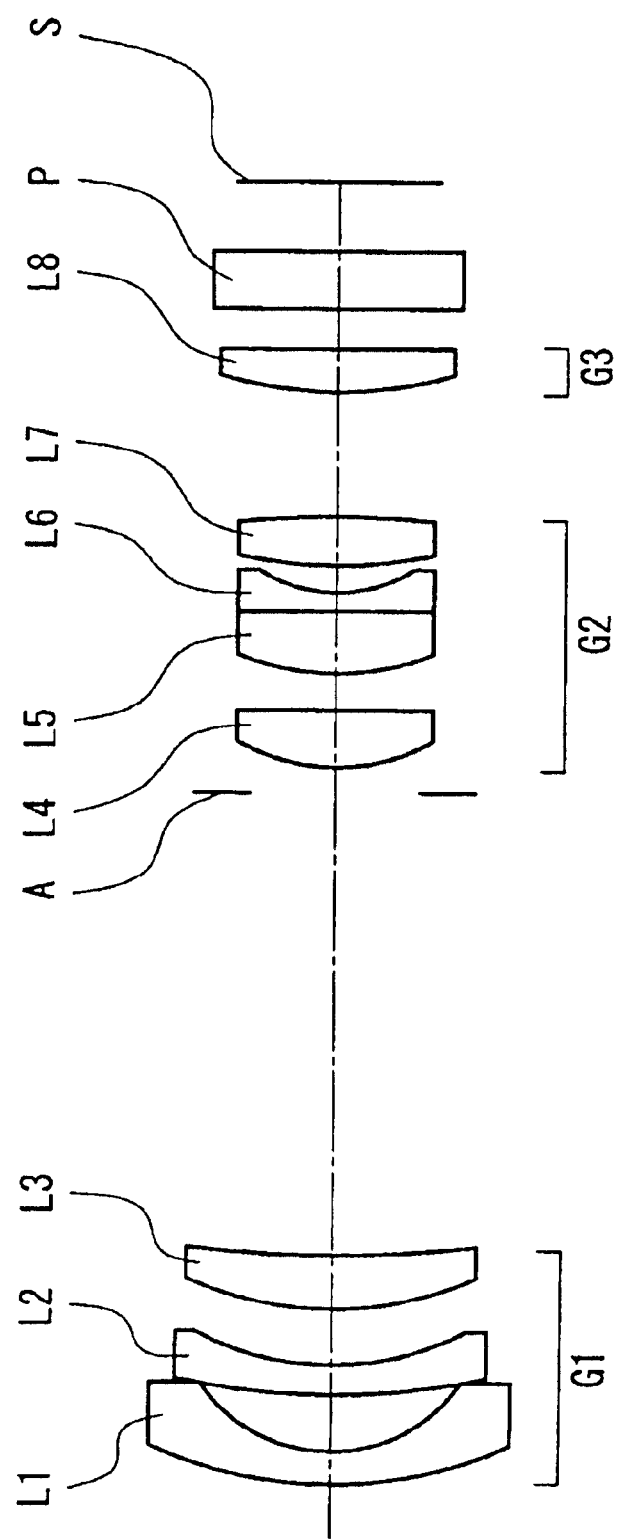
FIG. 1 is a layout drawing showing the configuration of a zoom lens according to a first embodiment of the present invention.

FIG. 1 is a layout drawing showing the configuration of a zoom lens according to a first embodiment of the present invention.

As shown in FIG. 1, the zoom lens of this embodiment is made of a first lens group G1 having a negative power, an aperture stop A, a second lens group G2 having a positive power, and a third lens group G3 having a positive power, arranged in that order from the object side (left side in FIG. 1) toward the image plane S side (right side in FIG. 1), and includes eight lenses.

The first lens group G1 is made of a first lens L1 that is a negative meniscus lens whose surface with strong curvature is facing the image plane S, a second lens L2 that is a negative meniscus lens whose surface with strong curvature is facing the image plane S, and a third lens L3 that is a positive lens whose surface with strong curvature is facing the object, arranged in that order from the object side.

The second lens group G2 is made of a fourth lens L4 that is a plano-convex lens (positive lens) whose convex surface is facing the object, a fifth lens L5 that is a positive lens, a sixth lens L6 that is a negative lens, and a seventh lens L7 that is a biconvex lens, arranged in that order from the object side. Here, the fifth lens L5 and the sixth lens L6 are cemented. By cementing the fifth lens L5 and the sixth lens L6, the overall length of the second lens group G2 can be shortened and there is less decentered with regard to these two lenses during assembly. Also, the sixth lens L6 and the seventh lens L7 are near one another at the outer periphery of their effective diameter, although they are just slightly separated.

The third lens group G3 is made of a single eighth lens L8 that is a positive lens. Constituting the third lens group G3 by only a single lens allows the overall length of the third lens group G3 to be shortened and as a result the overall optical length of the zoom lens when collapsed can be shortened.

The surface of the second lens L2 on the image plane S side is an aspherical surface whose local curvature is monotonically reduced as distance from the center increases and whose local curvature at the effective diameter is negative. If all four surfaces of the first lens L1 and the second lens L2, which are both negative lenses, are spherical surfaces, then a large negative distortion occurs at the wide-angle end because the refracting power becomes excessively strong as the point of incidence becomes farther from the center, however, if the surface of the second lens L2 on the image plane S side is an aspherical surface like that described above, then the refracting power can be kept from becoming extremely strong even if the point of incidence is away from the center, and thus negative distortion can be kept from occurring at the wide-angle end. The object side surface of the fourth lens L4 is an aspherical lens whose local radius of curvature increases monotonically as distance from the center increases, within the range from the center to the effective diameter. The object side surface of the seventh lens L7 is an aspherical surface whose local radius of curvature has a local maximum in the range from the center to the effective diameter. The surface of the fourth lens L4 on the image plane S side is flat. By making the image plane S side surface of the fourth lens L4 a flat surface, the fourth lens L4 can be easily positioned in the direction perpendicular to the optical axis by attaching the fourth lens L4 after a cemented lens of the fifth lens L5 and the sixth lens L6 is incorporated into the lens barrel supporting the three lenses of the second lens group G2 other than the parallel displaced lens element (seventh lens L7), allowing the decenter of the lenses in the second lens group G2 to be reduced even further. It should be noted that the seventh lens L7 is configured so that the decentered aberration is small, even if it is parallel displaced for the purpose of camera shake correction, and its decenter tolerance is very large.

On the image plane S side of the zoom lens, an infrared cut filter, an optical low-pass filter constituted by a quartz plate, and a solid-state imaging element are arranged in that order from the object side, and a cover glass for protection is attached to the solid-state imaging element. In FIG. 1, the infrared cut filter, the optical low-pass filter, and the cover glass are expressed as a single equivalent parallel plate element P. The image of the subject captured by the zoom lens is formed on the light-receiving surface (image plane) S of the solid-state imaging element.

The first lens group G1 and the second lens group G2 can be moved in the direction of the optical axis in order to change the combined focal length of the overall lens system, and the third lens group G3 can be moved in the direction of the optical axis for focus adjustment. The aperture stop A can be moved as a single unit with the second lens group G2 in the direction of the optical axis. Also, the seventh lens L7, which is the lens of the second lens group G2 furthest to the image plane S side, can be parallel displaced in the direction perpendicular to the optical axis for camera shake correction. It should be noted that the aperture stop A is not parallel displaced in the direction perpendicular to the optical axis even if the seventh lens. L7 is parallel displaced in the direction perpendicular to the optical axis.

In this case, when the Abbe number of the seventh lens L7 at the d-line is $v_7$, then it is preferable that the conditional expression $$v_7 > 50 \tag{20}$$

is satisfied.

When zooming from the wide-angle end to the telescope end, the air gap between the first lens group G1 and the second lens group G2 is reduced and the air gap between the second lens group G2 and the third lens group G3 is increased. Cylindrical cams are used to move the first lens group G1 and the second lens group G2 to a predetermined position with the light-receiving surface (image plane) S of the solid-state imaging element serving as a reference.

Focus adjustment is performed by keeping the first lens group G1 and the second lens group G2 stationary and shifting only the third lens group G3 in the direction of the optical axis. In this case, the third lens group G3 is moved toward the object as the shooting distance becomes shorter. Because the third lens group G3 is made of a single lens and the shifted portion, which includes other mechanism components that are shifted, is lightweight, the third lens group G3 can be moved quickly using a compact low-power motor.

There is only one lens, the seventh lens L7, that is parallel displaced in the direction perpendicular to the optical axis for the purpose of camera shake correction, and the shifted section, which includes other mechanism components for parallel displacement of the seventh lens L7, is lightweight, so that the seventh lens (parallel displaced lens) L7 can be moved quickly using a compact low-power actuator.

Giving the zoom lens shown in FIG. 1 a collapsing structure in which the first lens group G1, the second lens group G2, and the third lens group G3 are drawn toward the solid-state imaging element when not in use allows the overall optical length after collapsing to be shortened. A collapsing structure can be achieved by adding cam grooves to the cylindrical cams for moving the first lens group G1 and the second lens group G2 in the direction of the optical axis.

The zoom lens of this embodiment is configured so that the zoom ratio at a shooting distance of ∞ is ×2.5 to ×3.2.

With the zoom lens of this embodiment, when the shooting distance is ∞, $f_W$ is the combined focal length of the overall lens system at the wide-angle end, $f_{G2}$ is the combined focal length of the second lens group G2, $f_{G3}$ is the combined focal length of the third lens group G3, and $d_{L6}$ is the air gap between the sixth lens L6 and the seventh lens L7, then it is preferable that the conditional expressions $$2.2 < f_{G2}/f_W < 2.8 \quad (13)$$

$$4.0 < f_{G3}/f_W < 7.0 \quad (14)$$

$$0.05 < d_{L6}/f_{G2} < 0.15 \quad (15)$$

are satisfied.

Also, in this case, when $f_4$ is the focal length of the fourth lens L4 and $f_7$ is the focal length of the seventh lens L7, then it is preferable that the conditional expressions $$0.9 < f_4/f_{G2} < 1.2 \quad (16)$$

$$1.2 < f_7/f_{G2} < 1.7 \quad (17)$$

are satisfied.

With the zoom lens of this embodiment, when $m_{DT}$ is the magnification of the parallel displaced lens (seventh lens L7) at the telescope end with the shooting distance at ∞, and $m_{G3T}$ is the magnification of the third lens group G3 at the telescope end with the shooting distance at ∞), then it is preferable that the conditional expression $$0.9 < (1-m_{DT})m_{G3T} < 1.3 \quad (18)$$

is satisfied.

With the zoom lens of this embodiment, when $n_7$ is the refractive index of the seventh lens L7, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end when the shooting distance is ∞, then it is preferable that $B_7$ in Expression 4 below satisfies the conditions:

$$-0.7 < B_7 < -1.5. \quad (19)$$

$$B_7 = (n_7 - 1)\left(\frac{\kappa_{7F}}{r_{7F}^3} + 8D_{7F} - \frac{\kappa_{7R}}{r_{7R}^3} - 8D_{7R}\right)f_T^3 \quad \text{Expression 4}$$

Table 1 below shows specific examples of the numerical values of the zoom lens shown in FIG. 1.

TABLE 1

| Group | Element | Surface | r | d | $n_d$ | $v_d$ |
|---|---|---|---|---|---|---|
| G1 | L1 | 1 | 16.640 | 1.100 | 1.77250 | 49.6 |
| | | 2 | 5.698 | 2.136 | | |
| | L2 | 3 | 29.254 | 1.060 | 1.60602 | 57.8 |
| | | 4 | 8.171* | 2.102 | | |
| | L3 | 5 | 12.952 | 2.000 | 1.74077 | 27.8 |
| | | 6 | 66.291 | variable | | |
| G2 | Stop | 7 | ∞ | 1.000 | | |
| | L4 | 8 | 8.269* | 2.000 | 1.60602 | 57.8 |
| | | 9 | ∞ | 1.355 | | |
| | L5 | 10 | 9.932 | 2.204 | 1.69680 | 55.5 |
| | L6 | 11 | 51.280 | 0.910 | 1.80518 | 25.5 |
| | | 12 | 5.653 | 1.000 | | |
| | L7 | 13 | 16.390* | 1.700 | 1.60602 | 57.8 |
| | | 14 | −30.168 | variable | | |
| G3 | L8 | 15 | 19.235 | 1.560 | 1.51680 | 64.2 |
| | | 16 | −152.973 | variable | | |
| | P | 17 | ∞ | 2.260 | 1.51680 | 64.2 |
| | | 18 | ∞ | | | |

The unit of length in the table is [mm]. In Table 1, r is the radius of curvature of the lens, d is the distance between surfaces, and $n_d$ and $v_d$ are the refractive index and the Abbe number at the d-line of the lens, respectively (the same applies for other embodiments described later). It should be noted that surfaces with an * mark are aspheric, and that their aspheric shape is defined by Expression 5 shown below (the same applies for other embodiments described later).

$$z = \frac{h^2/r}{1 + \sqrt{1 - (1+\kappa)(h/r)^2}} + Dh^4 + Eh^6 + Fh^8 + Gh^{10} \quad \text{Expression 5}$$

In Expression 5 shown above, h is the height from the optical axis, z is the sag amount at the point on the aspherical surface where the height from the optical axis is h, K is the conic constant, and D, E, F, and G are the fourth-order, sixth-order, eighth-order, and tenth-order aspheric coefficients, respectively.

Table 2 below shows the aspheric coefficients of the zoom lens shown in FIG. 1.

TABLE 2

| | Fourth Surface | Eighth Surface | Thirteenth Surface |
|---|---|---|---|
| κ | −5.27532 × 10$^{-1}$ | −8.36550 × 10$^{-2}$ | 0.0 |
| D | −3.88830 × 10$^{-4}$ | −1.46408 × 10$^{-4}$ | −6.85762 × 10$^{-5}$ |
| E | −9.97691 × 10$^{-6}$ | −8.93905 × 10$^{-7}$ | −6.24238 × 10$^{-6}$ |
| F | 1.91208 × 10$^{-7}$ | −1.30355 × 10$^{-7}$ | 1.67948 × 10$^{-7}$ |
| G | −1.14300 × 10$^{-8}$ | 3.91244 × 10$^{-9}$ | 3.26910 × 10$^{-8}$ |

Table 3 below shows the variable distance between surfaces (in mm) in a case where the shooting distance of the zoom lens shown in FIG. 1 is ∞. In Table 3, f (mm) and 2ω represent the focal length and the angle of view, respectively (the same applies for other embodiments described later).

TABLE 3

| Surface Spacing | Wide-angle End | Intermediate Position | Telescope End |
|---|---|---|---|
| $d_6$ | 17.139 | 6.924 | 1.036 |
| $d_{14}$ | 4.768 | 9.701 | 18.306 |
| $d_{16}$ | 1.400 | 1.455 | 1.497 |
| f | 5.300 | 9.180 | 15.900 |
| F value | 2.76 | 3.50 | 4.85 |
| 2ω | 63.86° | 38.84° | 22.80° |

Here, when $f_W$ is the combined focal length of the wide-angle end and $f_T$ is the combined focal length of the telescope end with the shooting distance at ∞, then $f_N$ that satisfies the relationship of Expression 6 below is called the intermediate focal length.

$$f_N = \sqrt{f_W f_T}$$  Expression 6

Figure 2:
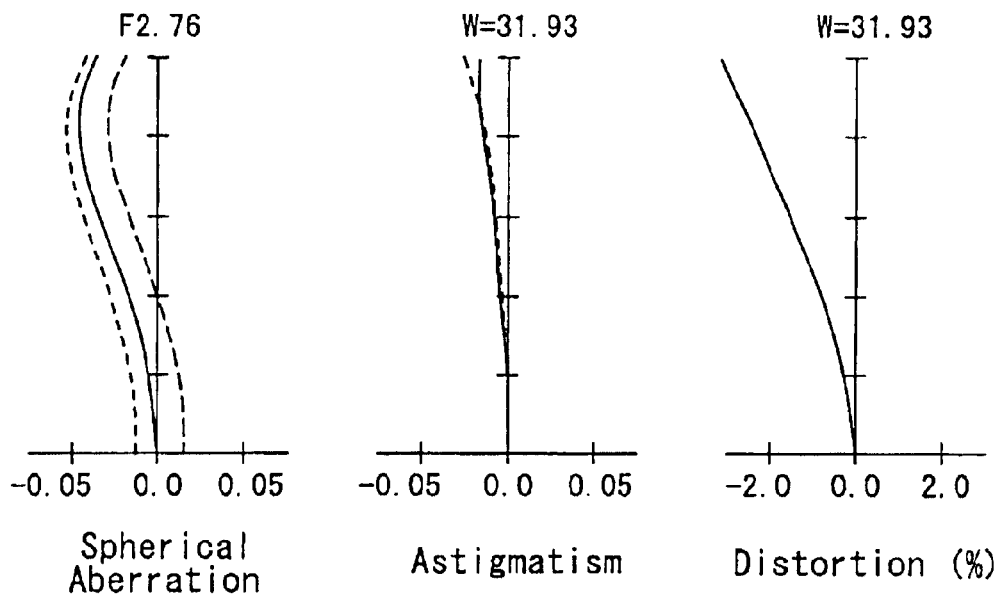
FIG. 2 shows aberration diagrams for the wide-angle end, in the standard state, of the zoom lens according to the first embodiment of the present invention.
Figure 3:
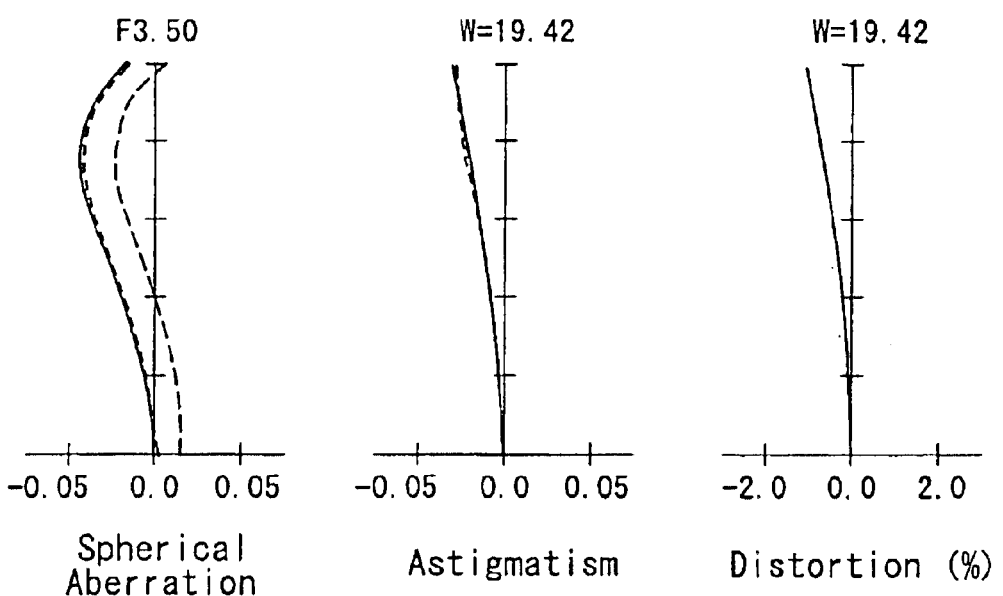
FIG. 3 shows aberration diagrams for the intermediate focal length (intermediate position), in the standard state, of the zoom lens according to the first embodiment of the present invention.
Figure 4:
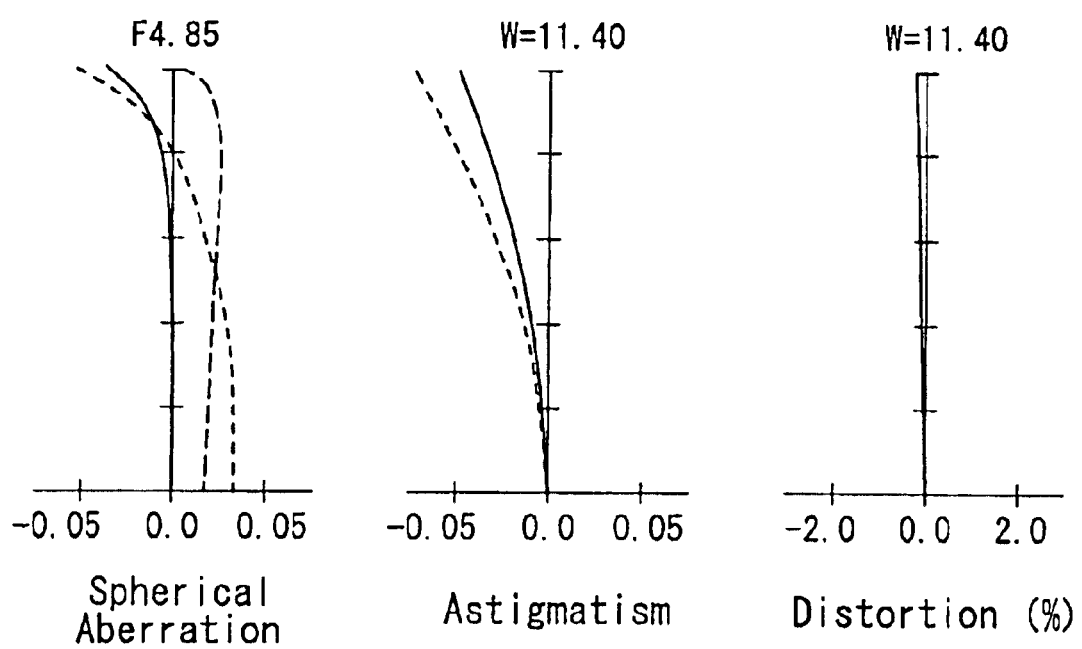
FIG. 4 shows aberration diagrams for the telescope end, in the standard state, of the zoom lens according to the first embodiment of the present invention.

FIGS. 2 to 4 are aberration diagrams (spherical aberration, astigmatism, and distortion) of the zoom lens shown in FIG. 1 when the aperture stop is open and the shooting distance is ∞. FIG. 2 is the case for the wide-angle end, FIG. 3 is the case for the intermediate focal length (intermediate position), and FIG. 4 is the case for the telescope end. It should be noted that in the spherical aberration diagrams, the solid line indicates values at the d-line, the short broken line indicates values at the F-line, and the long broken line indicates values at the C-line. Also, in the astigmatism diagrams, the solid line indicates the sagittal curvature of field and the broken line indicates the meridional curvature of field (the same applies for other embodiments described later).

It is clear from the aberration diagrams shown in FIGS. 2 to 4 that the zoom lens of this embodiment demonstrates good aberration properties even if the zoom position is changed as the shooting distance changes.

Figure 5:
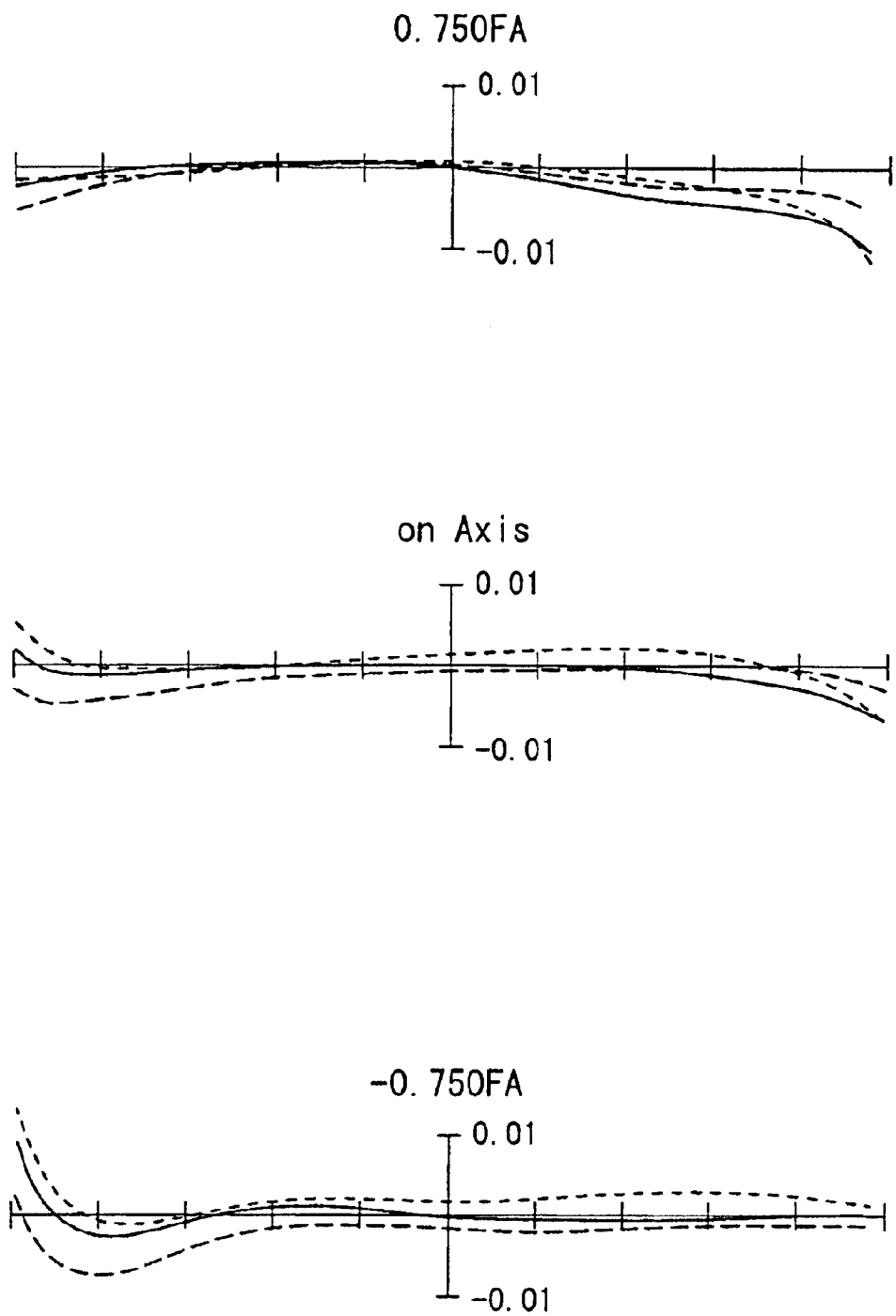
FIG. 5 shows aberration diagrams for the telescope end, in the state where camera shake is corrected, of the zoom lens according to the first embodiment of the present invention.

FIG. 5 shows the aberration diagrams during a camera shake correction at the telescope end. FIG. 5 shows the transverse aberration at an image point on the axis and at the image points of ±75% of the maximum image height in a case where the shooting distance is ∞, the aperture stop is open, and the seventh lens L7 of the second lens group G2 has been parallel displaced by 0.113 mm in the direction perpendicular to the optical axis. Here the solid line indicates values at the d-line, the short broken line indicates values at the F-line, and the long broken line indicates values at the C-line. It should be noted that in FIG. 5, the meridional plane is the plane that includes the optical axis of the first lens group G1 and the optical axis of the parallel displaced lens (seventh lens L7).

The amount of image decenter with a shooting distance of ∞, at the telescope end, in a case where the zoom lens is tilted 0.5° is equivalent to the amount of image decenter when the seventh lens L7 of the second lens group G2 is parallel displaced by 0.113 mm in the direction perpendicular to the optical axis.

It is clear from the aberration diagrams of FIG. 5 that there is good symmetry in the transverse aberration at the image point on the axis. Comparing the transverse aberration at the image point of 75% of the maximum image height and the transverse aberration at the image point of −75% of the maximum image height, from the fact that they both have a small degree of curvature and the slopes of their aberration curves are substantially equal it is clear that there is little decentered coma and decentered astigmatism. This means that sufficient image-forming properties are obtained even when the camera shake has been corrected. Also, if the camera shake angle of the zoom lens is the same, then the amount of parallel displacement of the seventh lens L7 of the second lens group G2 that is required for camera shake correction is reduced as the combined focal length of the overall lens system becomes shorter. Consequently, regardless of the zoom position, sufficient camera shake correction is possible for camera shake angles up to 0.5°.

As the solid-state imaging element of the zoom lens shown in FIG. 1, it is possible to use an element whose effective pixel number is 1600 (horizontal)×1200 (vertical), whose pixel pitch is 3.2 μm (horizontal)×3.2 μm (vertical), and whose effective picture size is 5.12 mm (horizontal)× 3.84 mm (vertical). As the solid-state imaging element, it is also possible to use an element in which a miniature positive lens is provided at each pixel in order to increase the effective aperture ratio.

As described above, the zoom lens shown in FIG. 1, with a zoom ratio of ×3.0 and an angle of view at the wide-angle end of approximately 64°, has high resolution and a short overall optical length when not in use, and is moreover provided with a camera shake-correction function, and the image-forming properties when camera shake correction is performed are also good.

It goes without saying that a zoom lens having the configuration shown in FIG. 1 but in which the seventh lens L7 is not parallel displaced in the direction perpendicular to the optical axis is also effective. Using common components for most of the components making up the lens unit, it is possible to achieve a zoom lens that has been configured so that the seventh lens L7 is parallel displaced in the direction perpendicular to the optical axis and a zoom lens in which the seventh lens L7 is not parallel displaced in the direction perpendicular to the optical axis.

Second Embodiment

Figure 6:
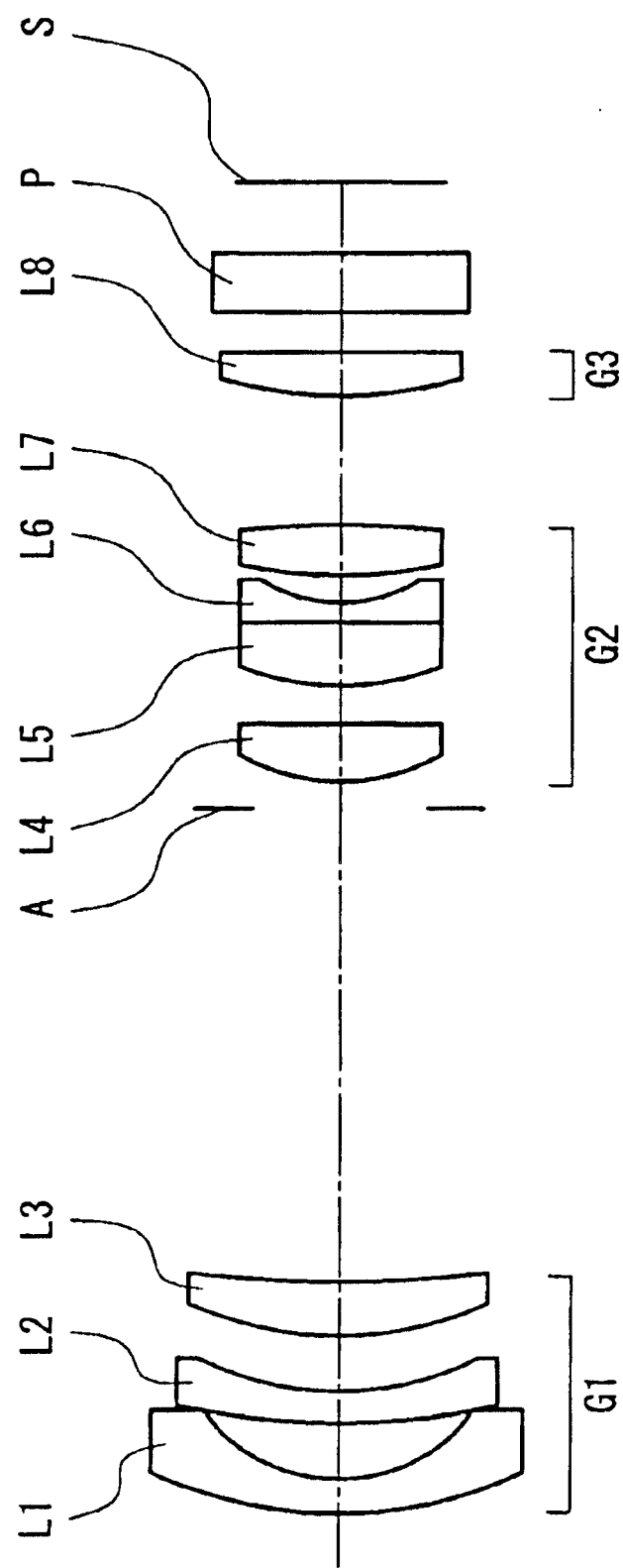
FIG. 6 is a layout drawing showing the configuration of a zoom lens according to a second embodiment of the present invention.

FIG. 6 is a layout drawing showing the configuration of a zoom lens according to the second embodiment of the present invention.

As shown in FIG. 6, the zoom lens of this embodiment is made of a first lens group G1 having a negative power, an aperture stop A, a second lens group G2 having a positive power, and a third lens group G3 having a positive power, arranged in that order from the object side (left side in FIG. 6) toward the image plane S side (right side in FIG. 6), and includes eight lenses.

The zoom lens shown in FIG. 6 has the same configuration as the zoom lens detailed above in the first embodiment (see FIG. 1), and is different only in the manner in which the seventh lens L7 is provided with an aspherical surface. That is, in the zoom lens shown in FIG. 1, the surface, whereas of the seventh lens L7 that is on the object side is an aspherical surface, whereas in the zoom lens according to this embodiment and shown in FIG. 6, the surface of the seventh lens L7 that is on the image plane S side is an aspherical surface. More specifically, the surface of the seventh lens L7 on the image plane S side is an aspherical surface whose local radius of curvature has a local minimum value within the range from its center to the effective diameter.

It is preferable that the various conditions set forth in Conditional Expression (13) to (20) are satisfied in this embodiment as well.

Table 4 below shows specific examples of the numerical values of the zoom lens shown FIG. 6, Table 5 below shows the aspheric coefficients of the zoom lens, and Table 6 below shows the variable distance between surfaces (in mm) in a case where the shooting distance of the zoom lens is ∞.

TABLE 4

| Group | Element | Surface | r | d | $n_d$ | $v_d$ |
|---|---|---|---|---|---|---|
| G1 | L1 | 1 | 14.509 | 1.100 | 1.77250 | 49.6 |
|  |  | 2 | 5.731 | 2.228 |  |  |
|  | L2 | 3 | 49.402 | 1.060 | 1.60602 | 57.8 |
|  |  | 4 | 8.567* | 2.162 |  |  |
|  | L3 | 5 | 13.079 | 2.000 | 1.74077 | 27.8 |
|  |  | 6 | 63.330 | variable |  |  |

TABLE 4-continued

| Group | Element | Surface | r | d | $n_d$ | $v_d$ |
|---|---|---|---|---|---|---|
| G2 | Stop | 7 | ∞ | 1.000 | | |
| | L4 | 8 | 8.297* | 2.000 | 1.60602 | 57.8 |
| | | 9 | ∞ | 1.216 | | |
| | L5 | 10 | 9.349 | 2.227 | 1.69680 | 55.5 |
| | L6 | 11 | 40.370 | 0.910 | 1.80518 | 25.5 |
| | | 12 | 5.412 | 1.000 | | |
| | L7 | 13 | 14.782 | 1.700 | 1.60602 | 57.8 |
| | | 14 | −37.989* | variable | | |
| G3 | L8 | 15 | 19.235 | 1.560 | 1.51680 | 64.2 |
| | | 16 | −152.973 | variable | | |
| | P | 17 | ∞ | 2.260 | 1.51680 | 64.2 |
| | | 18 | ∞ | | | |

TABLE 5

| | Fourth Surface | Eighth Surface | Fourteenth Surface |
|---|---|---|---|
| κ | $-3.52447 \times 10^{-1}$ | $-9.16294 \times 10^{-2}$ | 0.0 |
| D | $-3.61595 \times 10^{-4}$ | $-1.41292 \times 10^{-4}$ | $7.70937 \times 10^{-5}$ |
| E | $-1.06755 \times 10^{-5}$ | $-5.99004 \times 10^{-7}$ | $-5.76775 \times 10^{-6}$ |
| F | $3.65593 \times 10^{-7}$ | $-2.10559 \times 10^{-7}$ | $1.61394 \times 10^{-6}$ |
| G | $-1.52518 \times 10^{-8}$ | $9.17323 \times 10^{-9}$ | $-1.34706 \times 10^{-7}$ |

TABLE 6

| Surface Spacing | Wide-angle End | Intermediate Position | Telescope End |
|---|---|---|---|
| $d_6$ | 17.174 | 6.932 | 1.025 |
| $d_{14}$ | 4.512 | 9.330 | 17.718 |
| $d_{16}$ | 1.400 | 1.446 | 1.493 |
| f | 5.300 | 9.180 | 15.900 |
| F value | 2.75 | 3.47 | 4.80 |
| 2ω | 63.86° | 38.84° | 22.80° |

Figure 7:
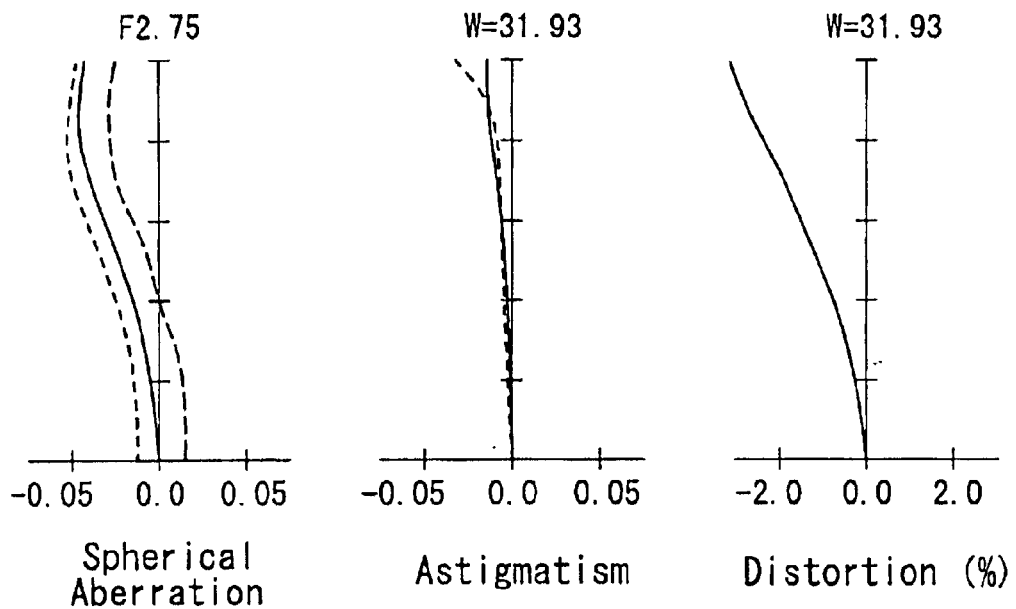
FIG. 7 shows aberration diagrams for the wide-angle end, in the standard state, of the zoom lens according to the second embodiment of the present invention.
Figure 8:
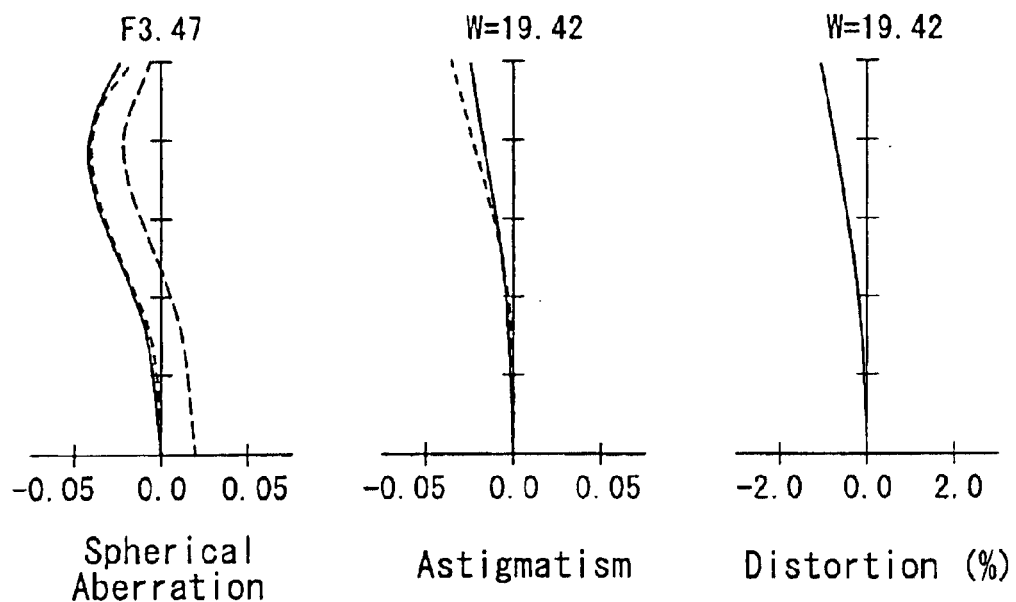
FIG. 8 shows aberration diagrams for the intermediate focal length (intermediate position), in the standard state, of the zoom lens according to the second embodiment of the present invention.
Figure 9:
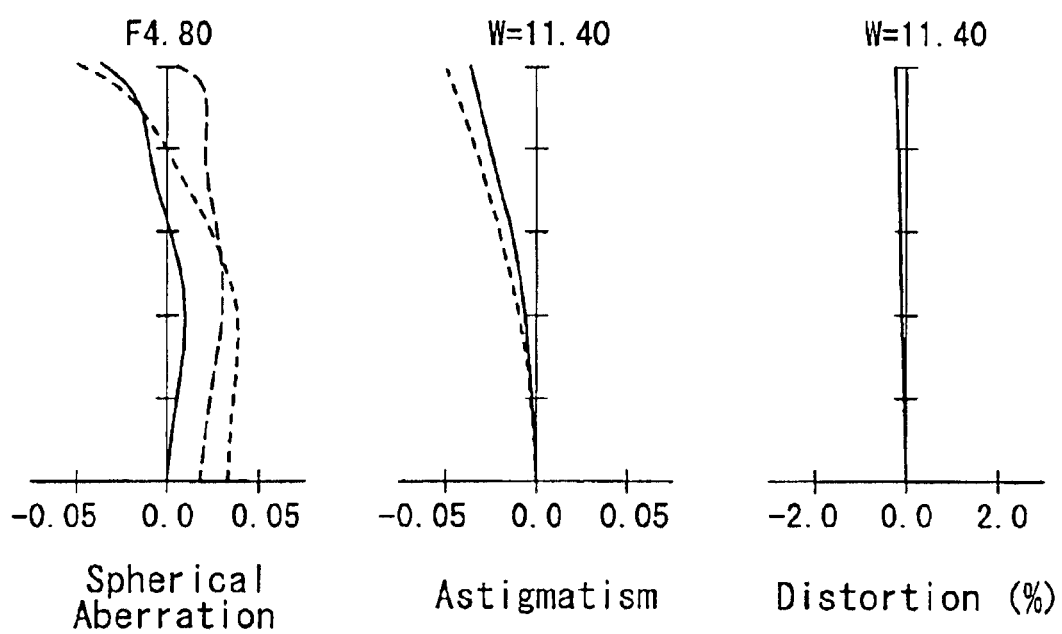
FIG. 9 shows aberration diagrams for the telescope end, in the standard state, of the zoom lens according to the second embodiment of the present invention.

FIGS. 7 to 9 are aberration diagrams (spherical aberration, astigmatism, and distortion) of the zoom lens shown in FIG. 6 when the shooting distance is ∞ and the aperture stop is open. FIG. 7 shows the case for the wide-angle end, FIG. 8 shows the case for the intermediate position, and FIG. 9 shows the case for the telescope end.

It is clear from the aberration diagrams shown in FIGS. 7 to 9 that the zoom lens of this embodiment demonstrates good aberration properties even if the zoom position is changed as the shooting distance changes.

Figure 10:
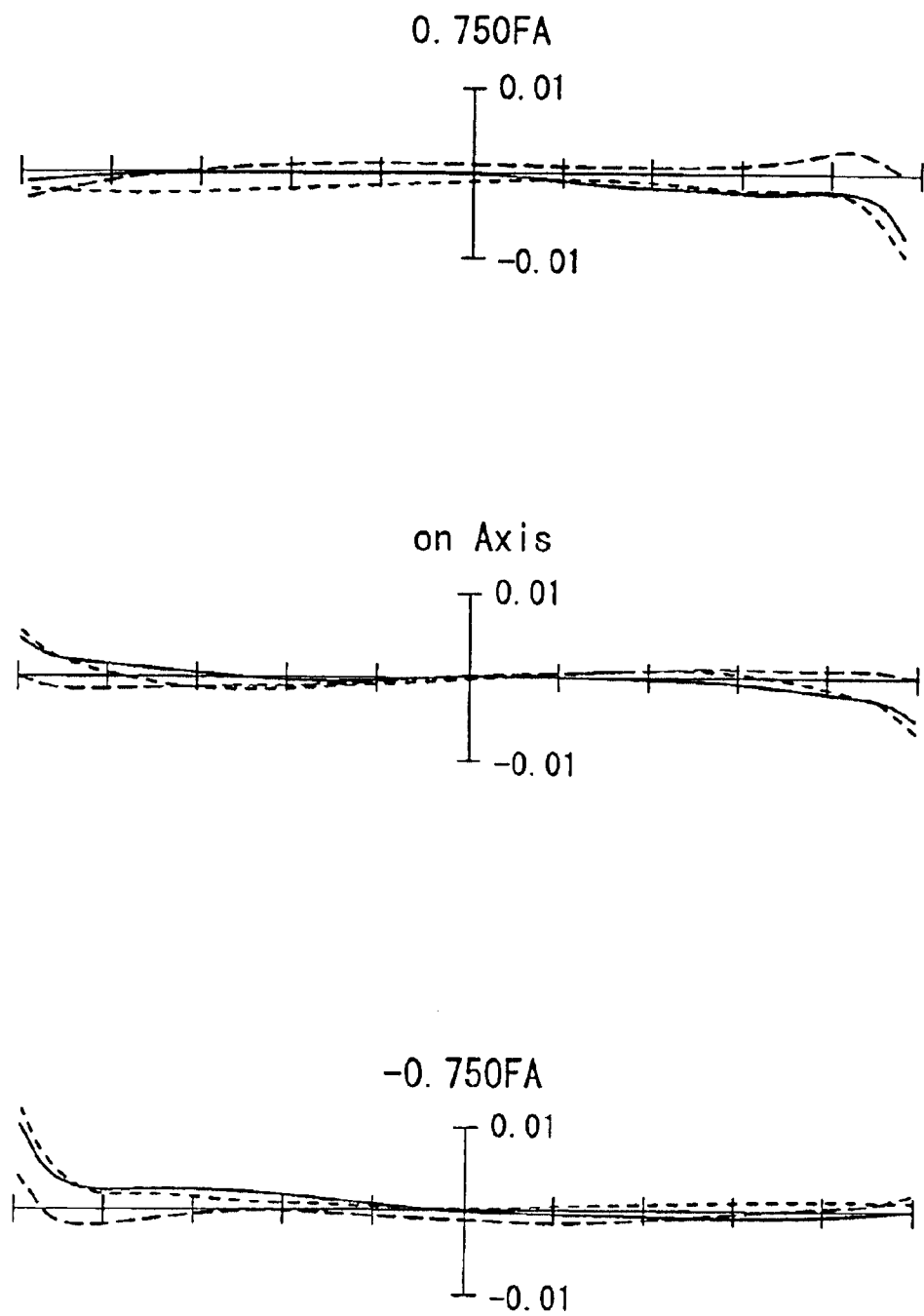
FIG. 10 shows aberration diagrams for the telescope end, in the state where camera shake is corrected, of the zoom lens according to the second embodiment of the present invention.

FIG. 10 shows the aberration diagrams during a camera shake correction at the telescope end. FIG. 10 shows the transverse aberration at an image point on the axis and at the image points of ±75% of the maximum image height in a case where the shooting distance is ∞, the aperture stop is open, and the seventh lens L7 of the second lens group G2 has been parallel displaced by 0.115 mm in the direction perpendicular to the optical axis. The conditions and denotations for FIG. 10 are the same as those of FIG. 5 of the first embodiment.

The amount of image decenter with a shooting distance of ∞, at the telescope end, in a case where the zoom lens is tilted 0.5° is equivalent to the amount of image decenter when the seventh lens L7 of the second lens group G2 is parallel displaced by 0.115 mm in a direction perpendicular to the optical axis.

It is clear from the aberration diagrams of FIG. 10 that, like in the first embodiment, sufficient camera shake correction is possible for camera shake angles of the zoom lens up to 0.5°.

The same solid-state imaging elements as those described above in the first embodiment can be used in the zoom lens shown in FIG. 6.

As described above, the zoom lens shown in FIG. 6, with a zoom ratio of 3.0 times and an angle of view at the wide-angle end of approximately 64°, has high resolution and a short overall optical length when not in use, and is moreover provided with a camera shake-correction function, and the image-forming properties when camera shake correction is performed are also good.

Third Embodiment

Figure 11:
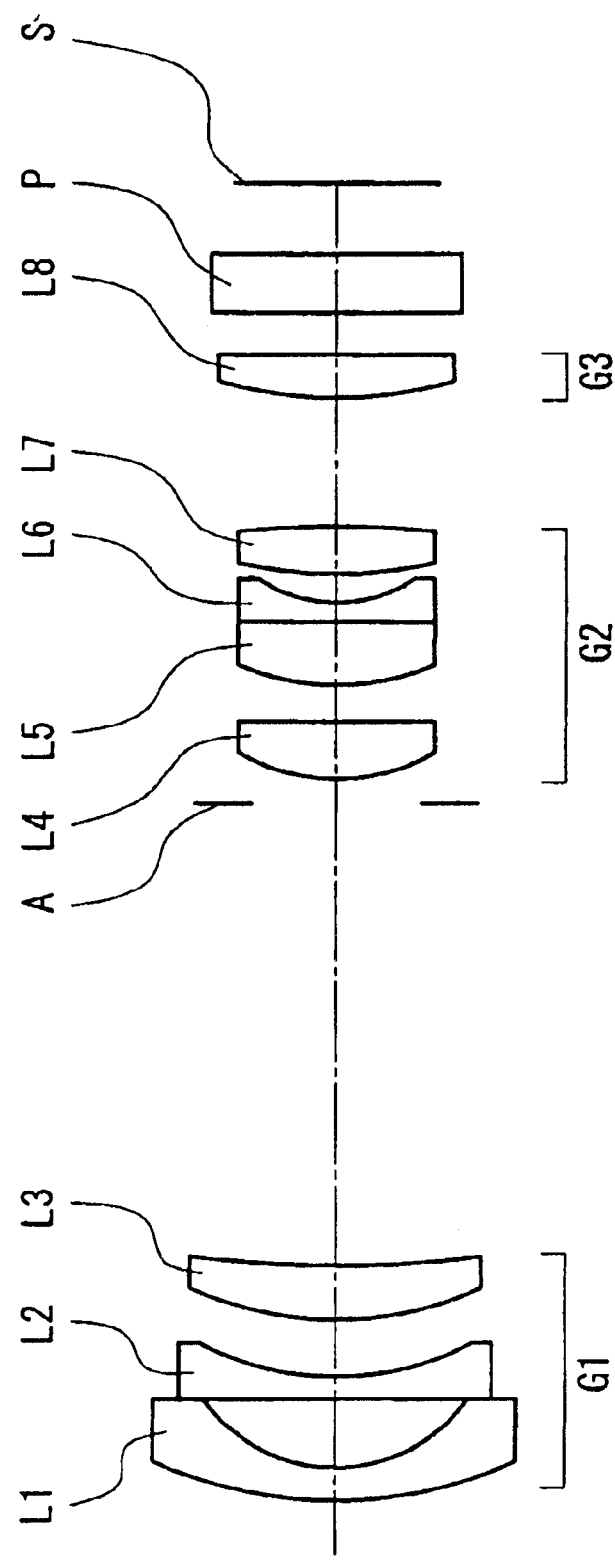
FIG. 11 is a layout drawing showing the configuration of a zoom lens according to a third embodiment of the present invention.

FIG. 11 is a layout drawing showing the configuration of a zoom lens according to a third embodiment of the present invention.

The zoom lens shown in FIG. 11 has the same configuration as the zoom lens detailed above in the second embodiment (see FIG. 6), and is different only in the manner in which the first lens group G1 is provided with aspherical surfaces. That is, in the first lens group G1 of the zoom lens shown in FIG. 6, the surface of the second lens L2 on the image plane S side is an aspherical surface, whereas in the first lens group G1 of the zoom lens according to this embodiment and shown in FIG. 11, the surface of the first lens L1 on the image plane S side is an aspherical surface. More specifically, the surface of the second lens L2 on the image plane S side is an aspherical surface whose local radius of curvature monotonically increases within the range from its center to the effective diameter.

It is preferable that the various conditions set forth in Conditional Expressions (13) to (20) are satisfied in this embodiment as well.

Table 7 below shows specific examples of the numerical values of the zoom lens shown in FIG. 11, Table 8 below shows the aspheric coefficients of the zoom lens, and Table 9 below shows the variable distance between surfaces (in mm) in a case where the shooting distance of the zoom lens is ∞.

TABLE 7

| Group | Element | Surface | r | d | $n_d$ | $v_d$ |
|---|---|---|---|---|---|---|
| G1 | L1 | 1 | 20.216 | 1.100 | 1.60602 | 57.8 |
| | | 2 | 6.009* | 2.232 | | |
| | L2 | 3 | 126.054 | 1.060 | 1.69680 | 55.5 |
| | | 4 | 10.493 | 2.358 | | |
| | L3 | 5 | 12.417 | 2.000 | 1.74077 | 27.8 |
| | | 6 | 39.817 | variable | | |
| G2 | Stop | 7 | ∞ | 1.000 | | |
| | L4 | 8 | 7.452* | 2.000 | 1.60602 | 57.8 |
| | | 9 | ∞ | 1.123 | | |
| | L5 | 10 | 10.278 | 1.800 | 1.69680 | 55.5 |
| | L6 | 11 | 33.095 | 0.910 | 1.80518 | 25.5 |
| | | 12 | 5.378 | 1.000 | | |
| | L7 | 13 | 15.186 | 1.700 | 1.60602 | 57.8 |
| | | 14 | −35.466* | variable | | |
| G3 | L8 | 15 | 19.169 | 1.560 | 1.51680 | 64.2 |
| | | 16 | −142.445 | variable | | |
| | P | 17 | ∞ | 2.260 | 1.51680 | 64.2 |
| | | 18 | ∞ | | | |

TABLE 8

| | Second Surface | Eighth Surface | Fourteenth Surface |
|---|---|---|---|
| κ | $-1.68190 \times 10^{-1}$ | $-8.22580 \times 10^{-2}$ | 0.0 |
| D | $-1.21997 \times 10^{-4}$ | $-1.97935 \times 10^{-4}$ | $7.30266 \times 10^{-5}$ |
| E | $-7.99844 \times 10^{-6}$ | $-4.64920 \times 10^{-7}$ | $3.24000 \times 10^{-6}$ |
| F | $2.62630 \times 10^{-7}$ | $-3.66489 \times 10^{-7}$ | $4.58094 \times 10^{-7}$ |
| G | $-9.14433 \times 10^{-9}$ | $1.76843 \times 10^{-8}$ | $-6.53756 \times 10^{-8}$ |

TABLE 9

| Surface Spacing | Wide-angle End | Intermediate Position | Telescope End |
|---|---|---|---|
| $d_6$ | 17.161 | 6.913 | 1.000 |
| $d_{14}$ | 4.701 | 9.502 | 17.851 |
| $d_{16}$ | 1.400 | 1.439 | 1.486 |
| f | 5.300 | 9.180 | 15.900 |
| F value | 2.79 | 3.55 | 4.91 |
| 2ω | 63.88° | 38.80° | 22.80° |

Figure 12:
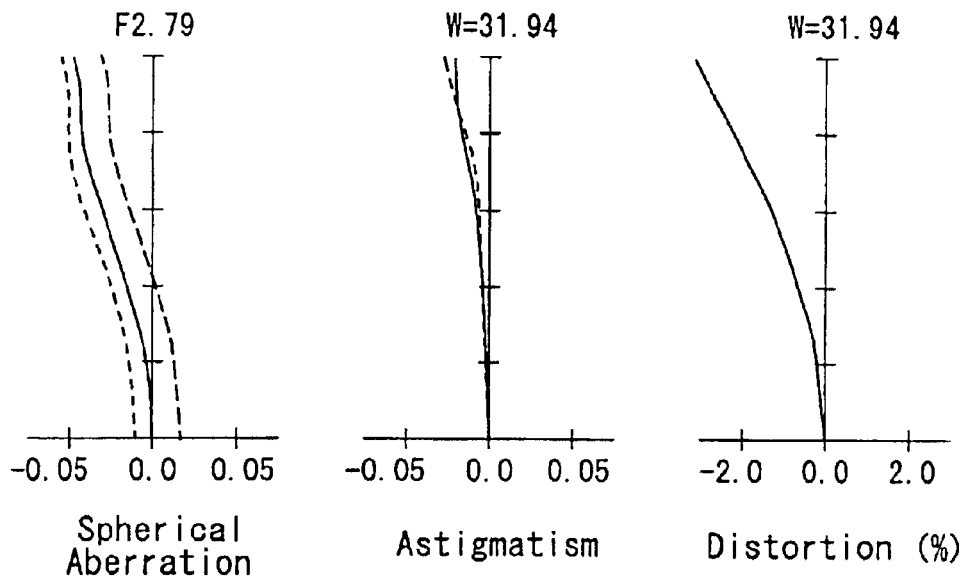
FIG. 12 shows aberration diagrams for the wide-angle end, in the standard state, of the zoom lens according to the third embodiment of the present invention.
Figure 13:
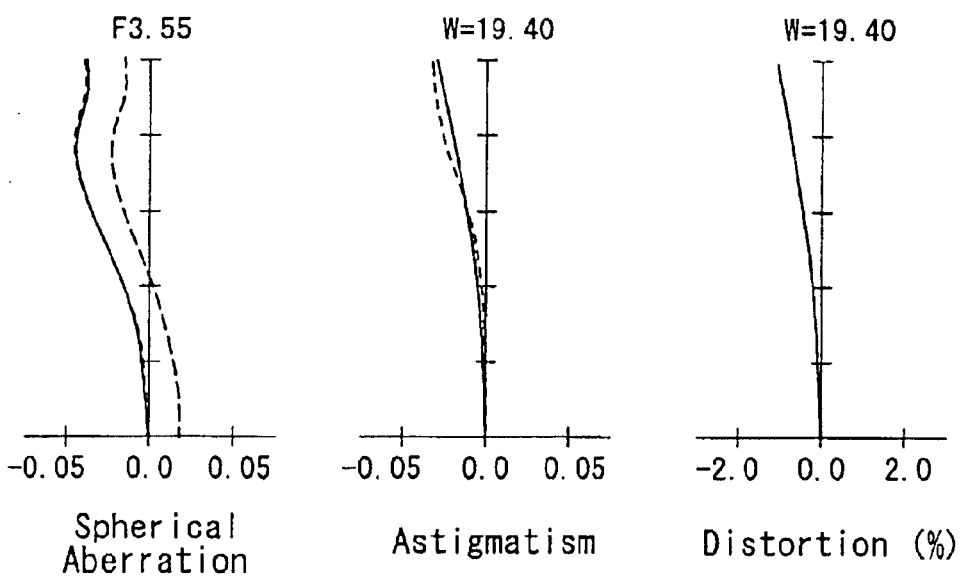
FIG. 13 shows aberration diagrams for the intermediate focal length (intermediate position), in the standard state, of the zoom lens according to the third embodiment of the present invention.
Figure 14:
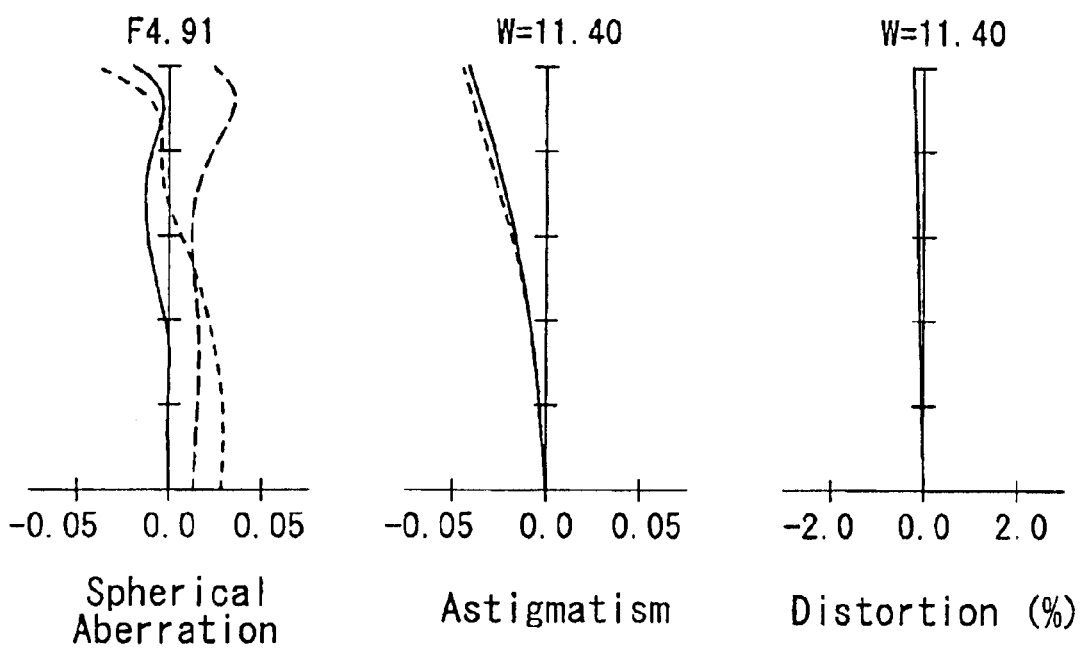
FIG. 14 shows aberration diagrams for the telescope end, in the standard state, of the zoom lens according to the third embodiment of the present invention.

FIGS. 12 to 14 are aberration diagrams (spherical aberration, astigmatism, and distortion) of the zoom lens shown in FIG. 11 when the shooting distance is ∞ and the aperture stop is open. FIG. 12 shows the case for the wide-angle end, FIG. 13 shows the case for the intermediate position, and FIG. 14 shows the case for the telescope end.

It is clear from the aberration diagrams shown in FIGS. 12 to 14 that the zoom lens of this embodiment demonstrates good aberration properties even if the zoom position is changed as the shooting distance changes.

Figure 15:
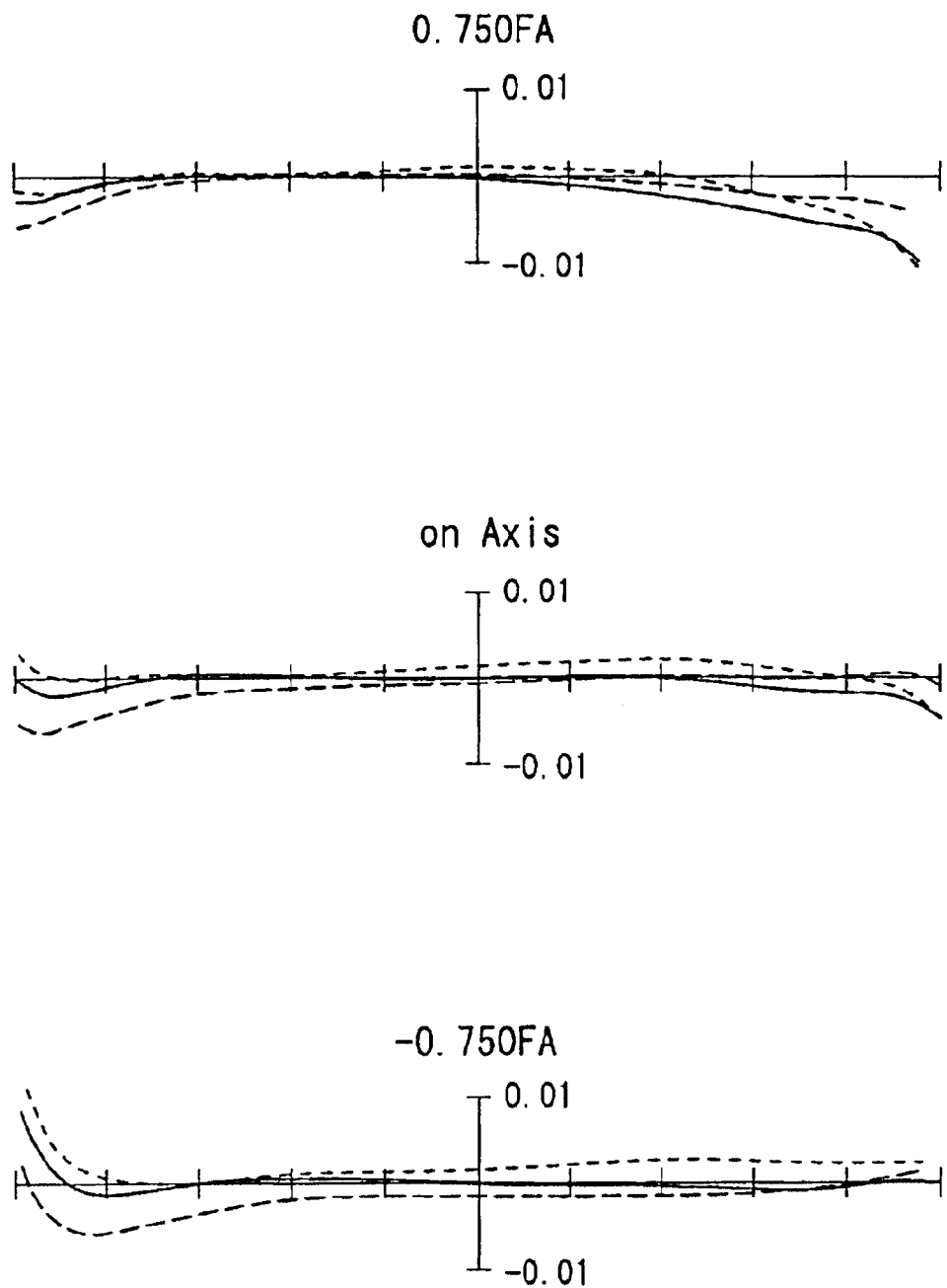
FIG. 15 shows aberration diagrams for the telescope end, in the state where camera shake is corrected, of the zoom lens according to the third embodiment of the present invention.

FIG. 15 shows the aberration diagrams during a camera shake correction at the telescope end. FIG. 15 shows the transverse aberration at an image point on the axis and at the image points of ±75% of the maximum image height in a case where the shooting distance is ∞, the aperture stop is open, and the seventh lens L7 of the second lens group G2 has been parallel displaced by 0.115 mm in the direction perpendicular to the optical axis. The conditions and denotations for FIG. 15 are the same as those of FIG. 5 of the first embodiment.

The amount of image decenter with a shooting distance of ∞, at the telescope end, in a case where the seventh lens L7 of the second lens group G2 is parallel displaced by a parallel displacement amount of 0.115 mm corresponds to the amount of image decenter when the zoom lens is tilted 0.5°.

It is clear from the aberration diagrams of FIG. 15 that, like in the first embodiment, sufficient camera shake correction is possible for camera shake angles of the zoom lens up to 0.5°.

The same solid-state imaging elements as those described above in the first embodiment can be used in the zoom lens shown in FIG. 11.

As described above, the zoom lens shown in FIG. 11, with a zoom ratio of 3.0 times and an angle of view at the wide-angle end of approximately 64° has high resolution and a short overall optical length when not in use, and is moreover provided with a camera shake-correction function, and the image-forming properties when camera shake correction is performed are also good.

Fourth Embodiment

Figure 16:
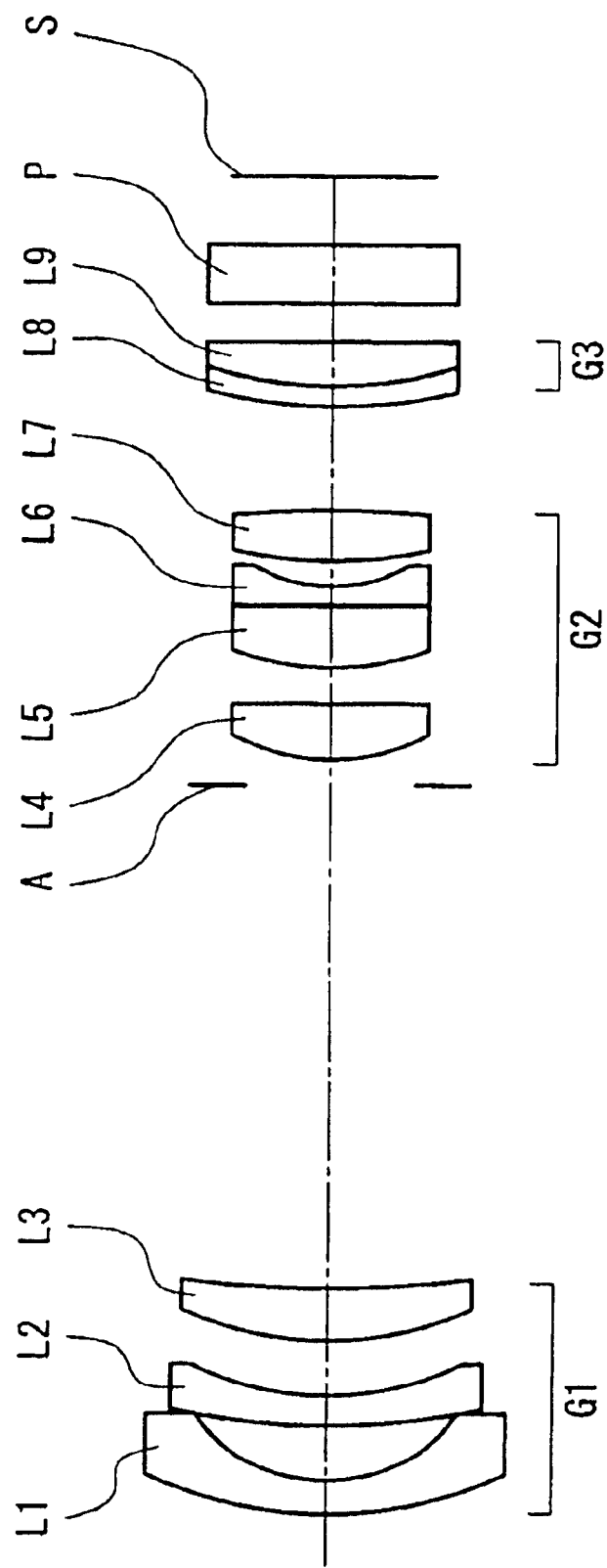
FIG. 16 is a layout drawing showing the configuration of a zoom lens according to a fourth embodiment of the present invention.

FIG. 16 is a layout drawing showing the configuration of a zoom lens according to a fourth embodiment of the present invention.

The zoom lens shown in FIG. 16 has a third lens group G3 with a configuration different than that in the zoom lens detailed in the first embodiment (see FIG. 1), however, it is the same in all other aspects. That is, in the shown in FIG. 1, the third lens group G3 is made of a single lens, the eighth lens L8, which is a positive lens, whereas in the zoom lens according to this embodiment and shown in FIG. 16, the third lens group G3 is made of a cemented lens in which an eighth lens L8 that is a negative meniscus lens and a ninth lens L9 that is a biconvex lens are cemented. Constituting the third lens group G3 by cementing a positive lens and a negative lens, it is possible to shorten the overall length of the third lens group G3 and by extension shorten the overall optical length when collapsed.

It is preferable that the various conditions set forth in Condition Expression (13) to (20) are satisfied in this embodiment as well.

Table 10 below shows specific examples of the numerical values of the zoom lens shows in FIG. 16, Table 11 below shows the aspheric coefficients of the zoom lens, and Table 12 below shows the variable distance between surfaces (in mm) in a case where the shooting distance of the zoom lens is ∞.

TABLE 10

| Group | Element | Surface | r | d | $n_d$ | $v_d$ |
|---|---|---|---|---|---|---|
| G1 | L1 | 1 | 17.504 | 1.200 | 1.77250 | 49.6 |
|  |  | 2 | 5.605 | 2.232 |  |  |
|  | L2 | 3 | 24.225 | 1.100 | 1.60602 | 57.8 |
|  |  | 4 | 9.563* | 2.361 |  |  |
|  | L3 | 5 | 14.726 | 2.200 | 1.74077 | 27.8 |
|  |  | 6 | 63.688 | variable |  |  |
| G2 | Stop | 7 | ∞ | 1.500 |  |  |
|  | L4 | 8 | 8.944* | 2.000 | 1.66549 | 55.4 |
|  |  | 9 | ∞ | 1.252 |  |  |
|  | L5 | 10 | 10.015 | 2.227 | 1.69680 | 55.5 |
|  | L6 | 11 | 37.148 | 0.980 | 1.80518 | 25.5 |
|  |  | 12 | 5.577 | 1.016 |  |  |
|  | L7 | 13 | 18.019* | 1.800 | 1.60602 | 57.8 |
|  |  | 14 | −38.568 | variable |  |  |
| G3 | L8 | 15 | 22.249 | 0.600 | 1.69895 | 30.1 |
|  | L9 | 16 | 11.476 | 1.900 | 1.69680 | 55.5 |
|  |  | 17 | −91.910 | variable |  |  |
|  | P | 18 | ∞ | 2.260 | 1.51680 | 64.2 |
|  |  | 19 | ∞ |  |  |  |

TABLE 11

| | Fourth Surface | Eighth Surface | Thirteenth Surface |
|---|---|---|---|
| κ | $-6.89155 \times 10^{-1}$ | $-2.75623 \times 10^{-1}$ | 0.0 |
| D | $-3.85337 \times 10^{-4}$ | $-9.39764 \times 10^{-5}$ | $-3.98965 \times 10^{-5}$ |
| E | $-1.18548 \times 10^{-5}$ | $6.06321 \times 10^{-7}$ | $1.91400 \times 10^{-6}$ |
| F | $3.37090 \times 10^{-7}$ | $-1.07678 \times 10^{-7}$ | $-4.94309 \times 10^{-7}$ |
| G | $-1.71152 \times 10^{-8}$ | $1.37704 \times 10^{-9}$ | $6.45013 \times 10^{-8}$ |

TABLE 12

| Surface Spacing | Wide-angle End | Intermediate Position | Telescope End |
|---|---|---|---|
| $d_6$ | 16.998 | 6.722 | 0.800 |
| $d_{14}$ | 4.650 | 9.969 | 19.257 |
| $d_{16}$ | 1.200 | 1.278 | 1.365 |
| f | 5.300 | 9.180 | 15.900 |
| F value | 2.75 | 3.53 | 4.93 |
| 2ω | 63.84° | 38.82° | 22.80° |

In the third lens group G3, to favorably correct the curvature of field and chromatic aberration, it is possible to lower the refractive index of the eighth lens L8 so as to reduce its Abbe number, or to raise the refractive index of the ninth lens L9 so as to increase its Abbe number. However, if the ratio of the Abbe number of the eighth lens L8 to the Abbe number of the ninth lens L9 is large, then the center thickness of the ninth lens L9 becomes thick in order to secure thickness at the edges, and attention must be paid to the weight of the third lens group G3.

Figure 17:
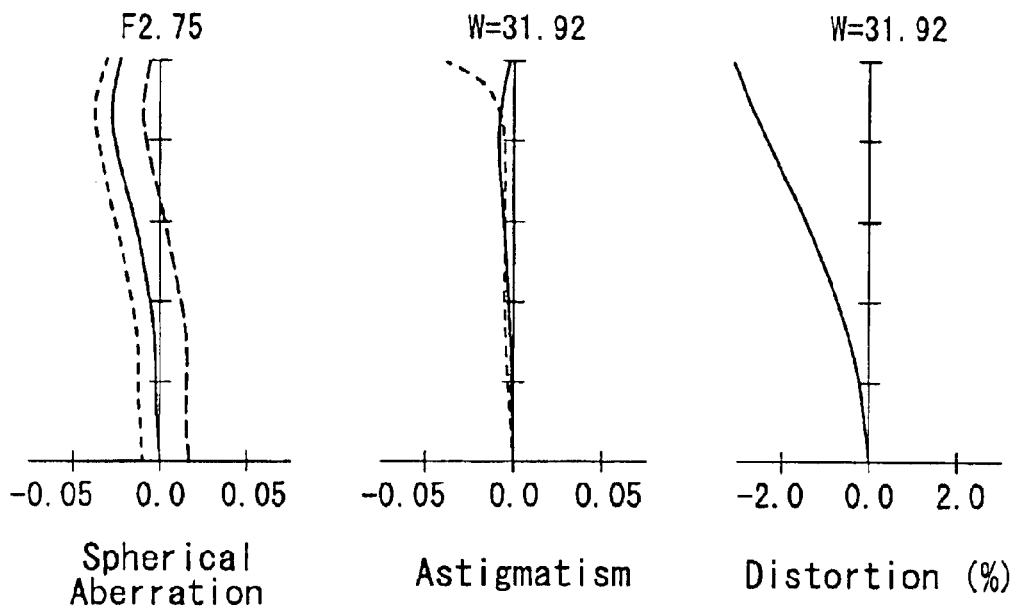
FIG. 17 shows aberration diagrams for the wide-angle end, in the standard state, of the zoom lens according to the fourth embodiment of the present invention.
Figure 18:
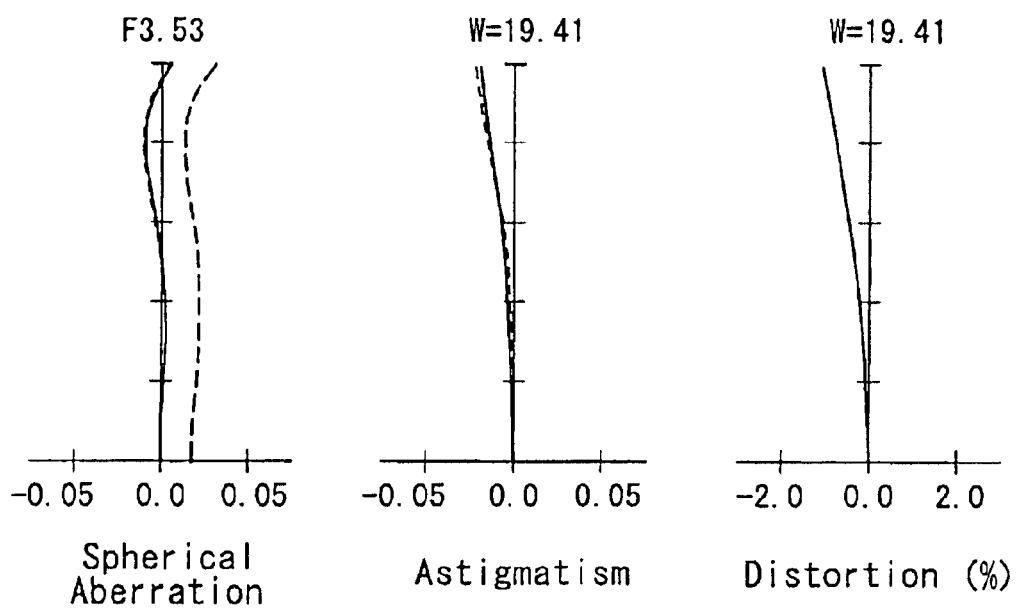
FIG. 18 shows aberration diagrams for the intermediate focal length (intermediate position), in the standard state, of the zoom lens according to the fourth embodiment of the present invention.
Figure 19:
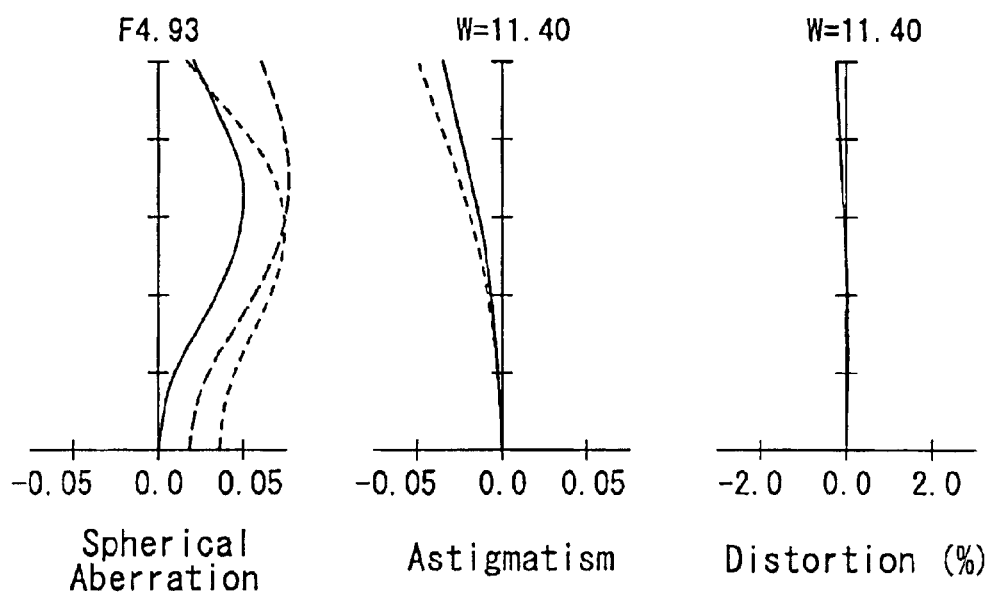
FIG. 19 shows aberration diagrams for the telescope end, in the standard state, of the zoom lens according to the fourth embodiment of the present invention.

FIGS. 17 to 19 are aberration diagrams (spherical aberration, astigmatism, and distortion) of the zoom lens shown in FIG. 16 when the shooting distance is ∞ and the aperture stop is open. FIG. 17 shows the case for the wide-angle end, FIG. 18 shows the case for the intermediate position, and FIG. 19 shows the case for the telescope end.

It is clear from the aberration diagrams shown in FIGS. 17 to 19 that the zoom lens of this embodiment demonstrates good aberration properties even if the zoom position is changed as the shooting distance changes.

Figure 20:
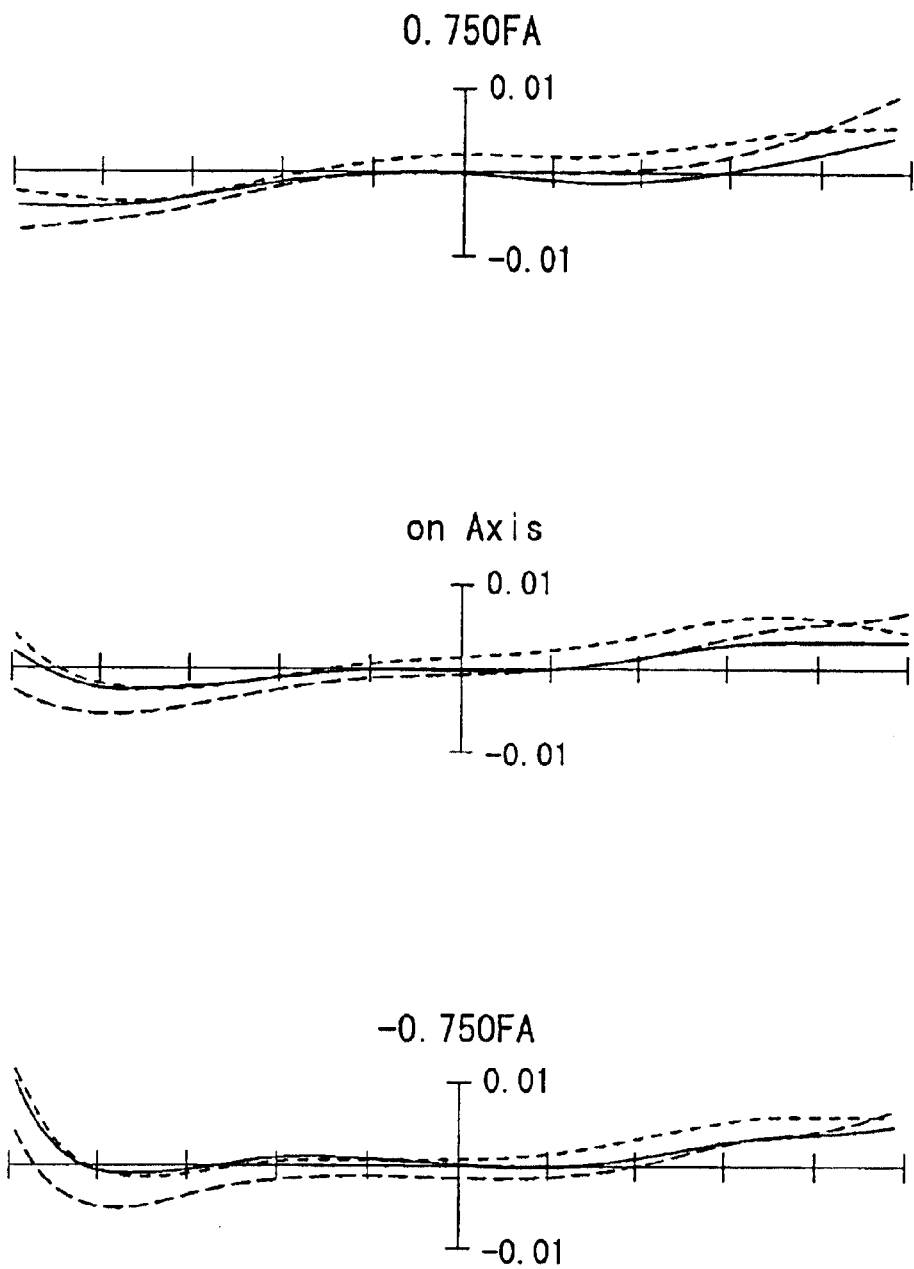
FIG. 20 shows aberration diagrams for the telescope end, in the state where camera shake is corrected, of the zoom lens according to the fourth embodiment of the present invention.

FIG. 20 shows the aberration diagrams during a camera shake correction at the telescope end. FIG. 20 shows the transverse aberration at an image point on the axis and at the image points of ±75% of the maximum image height in a case where the shooting distance is ∞, the aperture stop is open, and the seventh lens L7 of the second lens group G2 has been parallel displaced by 0.131 mm in the direction perpendicular to the optical axis. The conditions and denotations for FIG. 20 are the same as those of FIG. 6 of the first embodiment.

The amount of image decenter at a shooting distance of ∞, at the telescope end, in a case where the seventh lens L7 of the second lens group G2 is parallel displaced by a parallel displacement amount of 0.131 mm corresponds to the amount of image decenter when the zoom lens is tilted 0.5°.

It is clear from the aberration diagrams of FIG. 20 that, like in the first embodiment, sufficient camera shake correction is possible for camera shake angles of the zoom lens up to 0.5°.

The same solid-state imaging elements as those described above in the first embodiment can be used in the zoom lens shown in FIG. 16.

As described above, the zoom lens shown in FIG. 16, with a zoom ratio of 3.0 times and an angle of view at the wide-angle end of approximately 64°, has high resolution and a short overall optical length when not in use, and is moreover provided with a camera shake-correction function, and the image-forming properties when camera shake correction is performed are also good.

Table 13 below shows the main parameters and the numerical values of the conditional expressions detailed above for the first through fourth embodiments described above.

TABLE 13

| Conditional Expression | Embodiments | | | |
| --- | --- | --- | --- | --- |
|  | 1 | 2 | 3 | 4 |
| $f_{G2}/f_w$ | 2.416 | 2.389 | 2.385 | 2.516 |
| $f_{G3}/f_w$ | 6.257 | 6.257 | 6.189 | 4.906 |
| $d_{16}/f_{G2}$ | 0.078 | 0.079 | 0.079 | 0.076 |
| $f_4/f_{G2}$ | 1.066 | 1.081 | 0.973 | 1.008 |
| $f_7/f_{G2}$ | 1.388 | 1.404 | 1.406 | 1.539 |
| $(1 - m_{DT})m_{G3T}$ | 1.226 | 1.202 | 1.206 | 1.059 |
| $B_7$ | −1.205 | −1.339 | −1.423 | −0.782 |
| $v_7$ | 57.8 | 57.8 | 57.8 | 57.8 |

Fifth Embodiment

Figure 21:
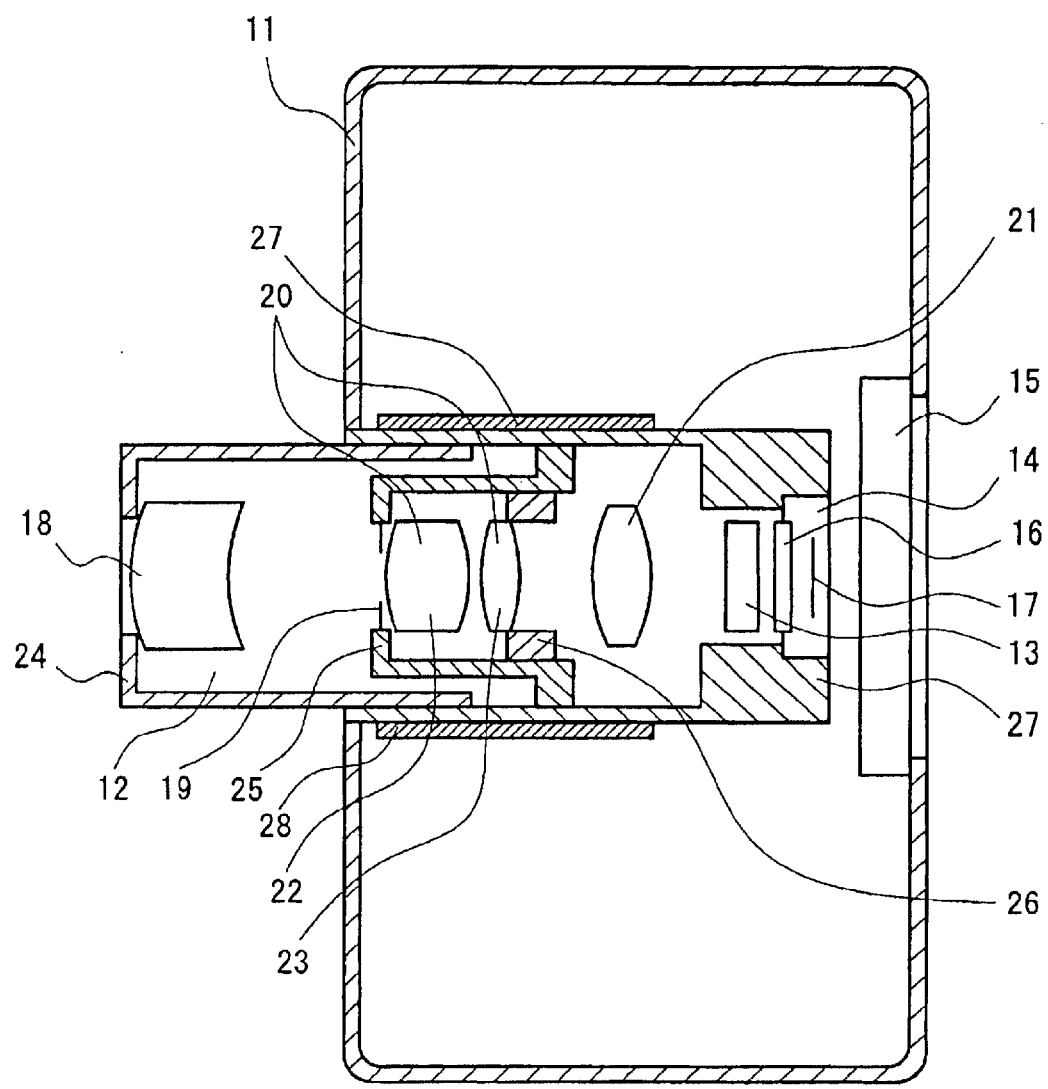
FIG. 21 diagrammatically shows the configuration of an electronic still camera according to a fifth embodiment of the present invention.

FIG. 21 is a diagrammatic structural diagram showing the electronic still camera according to a fifth embodiment of the present invention.

In FIG. 21, the reference numeral 12 denotes a zoom lens, 14 denotes a solid-state imaging element, 15 denotes a liquid crystal monitor, 18 denotes a first lens group, 19 denotes an aperture stop, 20 denotes a second lens group, 21 denotes a third lens group, and 23 denotes a parallel displaced lens.

The zoom lens 12 is arranged on the front side of a housing 11, and to the rear of the zoom lens 12 are arranged an optical low-pass filter 13 and the solid-state imaging element 14 in that order from the object side to the image plane side. The liquid crystal monitor 15 is arranged at the rear side of the housing 11, and the solid-state imaging element 14 and the liquid crystal monitor 15 are near one another.

The optical low-pass filter 13 has a configuration in which a first quartz plate, a second quartz plate, and a third quartz plate are cemented by a transparent adhesive and arranged in that order from the object side to the image plane side. The three quartz plates are parallel flat plates and the optic axes of the quartz plates are tilted 45° with respect to the optical axis. Also, seen from the zoom lens 12, the directions in which the optic axes of the quartz plates are projected onto a light-receiving surface 17 of the solid-state imaging element 14 are for the first quartz plate a direction rotated 45° to the left from the image horizontal direction, for the second quartz plate a direction rotated 45° to the right from the image horizontal direction, and for the third quartz plate the image horizontal direction. The optical low-pass filter 13 prevents error signals such as moire due to the pixel structure of the solid-state imaging element 14. An optical multilayer film that reflects infrared light but allows light in the visible spectrum to pass is vapor deposited onto the object-side surface of the low-pass filter 13.

The solid-state imaging element 14 has an effective pixel number of 1600 (horizontal)×1200 (vertical), a pixel pitch of 3.2 μm (horizontal)×3.2 μm (vertical), and an effective image size of 5.12 mm (horizontal)×3.84 mm (vertical), and each pixel is provided with a miniature positive lens. A cover glass 16 is provided on the object-side of the solid-state imaging element 14. The image of the subject obtained by the zoom lens 12 is formed on the light-receiving surface 17.

In this embodiment, the zoom lens shown in FIG. 1 is used as the zoom lens 12. The zoom lens 12 is made of a first lens group 18, an aperture stop 19, a second lens group 20, and a third lens group 21, arranged in that order from the object side to the image plane side. The second lens group 20 is made of a lens group 22 that is not parallel displaced in the direction perpendicular to the optical axis and a parallel displaced lens 23 that is arranged on the image plane side of the lens group 22 and that can be parallel displaced.

The first lens group 18 is attached to a moving lens barrel 24. The lens group 22, which is not parallel displaced, of the second lens group 20 is attached to a member 25 that can be moved in the direction of the optical axis. The parallel displaced lens 23 is attached to a member 26 that can be parallel displaced in the direction perpendicular to the optical axis, and the member 26 is attached to the member 25. The aperture stop 19 is attached to the object-side of the member 25. By adopting this configuration, the aperture stop 19 can be shifted in the optical axis direction as a single unit with the second lens group 20, and during camera shake correction it is possible to parallel displace only the parallel displaced lens 23 in the direction perpendicular to the optical axis.

The moving lens barrel 24 and the member 25 are incorporated into a main lens barrel 27, and can be moved in the direction of the optical axis. The moving lens barrel 24 and the member 25 can be moved in the direction of the optical axis in such a manner that their position with respect to the solid-state imaging element 14 satisfies a predetermined relationship by rotating a cylindrical cam 28 that is attached to the outside of the main lens barrel 27, thereby allowing the combined focal length of the overall lens system to be changed. In the case of changing from the wide-angle end to the telescope end, the first lens group 18 projects toward the object after it has been retreated toward the image plane, and the second lens group 20 is monotonically moved from the image plane side to the object side.

The third lens group 21 can be moved in the direction of the optical axis by a motor. By detecting the position at which high-frequency components of the captured image become a peak while moving the third lens group 21 in the direction of the optical axis by the motor and then moving the third lens group 21 to that position, it is possible to carry out automatic focus adjustment.

By adopting a collapsed configuration in which the first lens group 18, the member 25, and the third lens group 21 are each drawn toward the image plane (toward the solid-state imaging element 14) when not in use, it is possible to shorten the overall optical length of the zoom lens when not in use (when collapsed). A mechanism for drawing the first lens group 18 and the member 25 toward the image plane can be achieved by extending the cam grooves of the cylindrical cam 27.

If the zoom lens is tilted due to camera shake, then by parallel displacing the parallel displaced lens 23 by a predetermined amount using an actuator of shifting in the image horizontal direction and an actuator for shifting in the image vertical direction, it is possible perform camera shake correction. For example, if the zoom lens is tilted due to camera shake so that its object side drops, then camera shake correction can be performed by parallel displacing the parallel displaced lens 23 upward by a predetermined amount using the actuator for parallel displacing in the image vertical direction. To perform camera shake correction requires means for detecting the camera shake angle of the zoom lens in the image horizontal direction, the camera shake angle in the image vertical direction, the magnification of the parallel displaced lens 23, and the magnification of the third lens group 21. Two angle velocity sensors (camera shake detection means) can be used to detect the two camera shake angles, and a position detection sensor for determining the positions of the second lens group 20 and the third lens group 21 with respect to the solid-state imaging element 14 can be used to detect the magnification of the parallel displaced lens 23 and the magnification of the third lens group 21. In this case, it is possible to calculate by microcomputer the camera shake angles of the two directions, the magnification of the parallel displaced lens 23, and the magnification of the third lens group 21 based on the output of these sensors, generate the required control signals, and input these control signals to the actuators.

As described above, it is possible to provide an electronic still camera whose zoom ratio is ×2.5 to ×3.2, whose angle of view at the wide-angle end is approximately 60°, and which has high resolution and is thin in the depth direction when not in use.

The electronic still camera described above can be provided with an electronic zoom function for using a signal processing circuit to magnify to the entire picture the image that is formed in the center of the solid-state imaging element, and when the electronic zoom function is used the effects due to the camera shake correction function can be noticeably obtained, as described below.

The extent of blurring due to camera shake when the zoom lens is tilted due to camera shake can be assessed using the ratio of the amount of image decenter to the diagonal length of the solid-state imaging element (the image decenter amount ratio). This ratio is constant regardless of the size at which printing is performed from signals of the captured image. The diagonal length of the captured image if the electronic zoom function is not used matches the diagonal length of the effective region of the solid-state imaging element, but the diagonal length of the captured image when the electronic zoom function is used is smaller than the diagonal length of the solid-state imaging element. Consequently, when the electronic zoom function is used in a case where the image decenter amount is constant, the image decenter amount ratio increases, raising the extent of the camera shake blurriness.

When the camera shake correction function is used the image decenter amount becomes extremely small, so that the image decenter amount ratio becomes smaller and blurriness due to camera shake is significantly improved even if the electronic zoom function is used.

It should be noted that the zoom lens according to the first embodiment was used in the electronic still camera shown in FIG. 21, however, any of the zoom lenses according to the second through fourth embodiments may be used in place of the zoom lens of the first embodiment. Also, an electronic still camera without the camera shake correction function is also extremely useful as an electronic still camera.

The optical system of the electronic still camera shown in FIG. 21 can also be used in video cameras designed for moving pictures. In this case, it is possible to capture not only moving pictures but also still pictures at high resolution.

Sixth Embodiment

Figure 22:
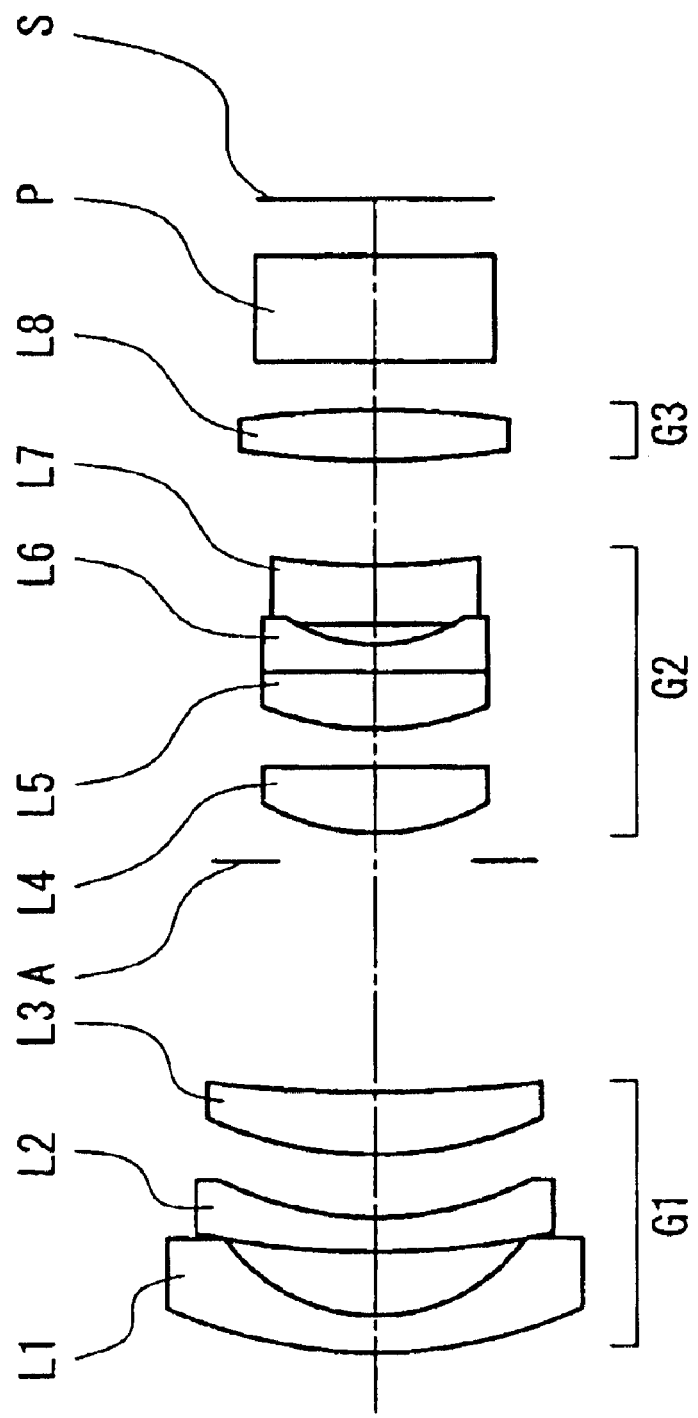
FIG. 22 is a layout drawing showing the configuration of a zoom lens according to a sixth embodiment of the present invention.

FIG. 22 is a layout drawing showing the configuration of a zoom lens according to a sixth embodiment of the present invention.

As shown in FIG. 22, the zoom lens of this embodiment is made of a first lens group G1 having a negative power, an aperture stop A, a second lens group G2 having a positive power, and a third lens group G3 having a positive power, arranged in that order from the object side (left side in FIG. 22) toward the image plane S side (right side in FIG. 22), and includes eight lenses.

The first lens group G1 is made of a first lens L1 that is a negative meniscus lens whose surface with strong curvature is facing the image plane S, a second lens L2 that is a negative meniscus lens whose surface with strong curvature is facing the image plane S, and a third lens L3 that is a positive lens whose surface with strong curvature is facing the object, arranged in that order from the object side.

The second lens group G2 is made of a fourth lens L4 that is a plano-convex lens (positive lens) whose convex surface is facing the object, a fifth lens L5 that is a positive lens, a sixth lens L6 that is a negative lens, and a seventh lens L7 that is a positive lens, arranged in that order from the object side. Here, the fifth lens L5 and the sixth lens L6 are cemented. By cementing the fifth lens L5 and the sixth lens L6, the overall length of the second lens group G2 can be shortened and there is less decenter with regard to these two lenses during assembly. Also, the sixth lens L6 and the seventh lens L7 are in contact at the outer periphery of their effective diameter.

The third lens group G3 is made of a single eighth lens L8 that is a positive lens. Constituting the third lens group G3 by only a single lens allows the overall length of the third lens group G3 to be shortened and as a result the overall optical length when collapsed can be shortened.

The surface of the second lens L2 on the image plane S side is an aspherical surface whose local curvature of radius is monotonically increased as distance from the center increases. The surface of the fourth lens L4 on the object side is an aspherical surface whose local curvature of radius is monotonically increased as distance from the center increases. The surface of the seventh lens L7 on the image plane S side is an aspherical surface whose local curvature of radius is monotonically decreased as distance from the center increases. The surface of the fourth lens L4 on the image plane S side is a flat surface.

On the image plane S side of the zoom lens, an infrared cut filter, an optical low-pass filter constituted by a quartz plate, and a solid-state imaging element are arranged in that order from the object side, and a cover glass for protection is attached to the solid-state imaging element. In FIG. 22, the infrared cut filter, the optical low-pass filter, and the cover glass are expressed as a single equivalent parallel plate element P. An image of the subject captured by the zoom lens is formed on the light-receiving surface (image plane) S of the solid-state imaging element.

The first lens group G1 and the second lens group G2 can be moved in the direction of the optical axis in order to change the combined focal length of the overall lens system, and the third lens group G3 can be moved in the direction of the optical axis for focus adjustment. The aperture stop A can be moved as a single unit with the second lens group G2 in the direction of the optical axis. Also, the second lens group G2 can be parallel displaced in a direction perpendicular to the optical axis for camera shake correction. It should be noted that parallel displacement of the aperture stop A in the direction perpendicular to the optical axis does not occur even if there is parallel displacement of the second lens group G2 in the direction perpendicular to the optical axis.

When zooming from the wide-angle end to the telescope end, the air gap between the first lens group G1 and the second lens group G2 is reduced and the air gap from the second lens L2 to the third lens group G3 is increased. Cylindrical cams are used to move the first lens group G1 and the second lens group G2 to a predetermined position with the light-receiving surface (image plane) S of the solid-state imaging element serving as a reference.

Focus adjustment is performed by keeping the first lens group G1 and the second lens group G2 stationary and shifting only the third lens group G3 in the direction of the optical axis. In this case, the third lens group G3 is moved toward the object as the shooting distance becomes shorter. Because the third lens group G3 is made of a single lens and the shifted portion, which includes other mechanism components that are shifted, is light in weight, the third lens G3 can be moved at high speeds using a compact low-power motor.

Giving the zoom lens shown in FIG. 22 a collapsing structure in which the first lens group G1, the second lens group G2, and the third lens group G3 are drawn toward the solid-state imaging element when not in use allows the overall optical length after collapsing to be shortened. A collapsing structure can be achieved by adding cam grooves to the cylindrical cams for shifting the first lens group G1 and the second lens group G2 in the direction of the optical axis.

The zoom lens of this embodiment is configured so that the zoom ratio at a shooting distance of ∞ is x2.5 to x3.2.

With the zoom lens of this embodiment, when the shooting distance is ∞, $f_W$ is the combined focal length of the overall lens system at the wide-angle end, $f_{G2}$ is the combined focal length of the second lens group G2, $f_{G3}$ is the combined focal length of the third lens group G3, and $d_{L6}$ is the air gap between the sixth lens L6 and the seventh lens L7, then it is preferable that the conditional expressions $$2.0 < f_{G2}/f_W < 3.0 \tag{1}$$

$$4.0 < f_{G3}/f_W < 7.0 \tag{2}$$

$$0.02 < d_{L6}/f_{G2} < 0.1 \tag{3}$$

are satisfied.

Also, in this case, when $f_4$ is the focal length of the fourth lens L4 and $f_7$ is the focal length of the seventh lens L7, then it is preferable that the conditional expressions $$0.8 < f_4/f_{G2} < 1.2 \tag{4}$$

$$1.6 < f_7/f_{G2} < 3.0 \tag{5}$$

are satisfied.

In the zoom lens according to this embodiment, it is preferable that the conditional expressions $$2.2 < f_{G2}/f_W < 2.8 \tag{7}$$

$$4.0 < f_{G3}/f_W < 7.0 \tag{8}$$

$$0.02 < d_{L6}/f_{G2} < 0.1 \tag{9}$$

are satisfied.

In this case, it is preferable that the conditional expressions $$0.9 < f_4/f_{G2} < 1.2 \tag{10}$$

$$1.5 < f_7/f_{G2} < 3.0 \tag{11}$$

are satisfied.

In the zoom lens of this embodiment, if $m_{G2T}$ is the magnification of the second lens group G2 at the telescope end with a shooting distance of ∞ and $m_{G3T}$ is the magnification of the third lens group G3 at the telescope end with a shooting distance of ∞, and σ is defined as $\sigma = (1 - m_{G2T}) m_{G3T}$, then it is preferable that the condition $$1.7 < |\sigma| < 2.1 \tag{6}$$

is satisfied.

Also, with the zoom lens of this embodiment, when $n_7$ is the reflecting index of the seventh lens L7, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end with the shooting distance of ∞, then it is preferable that $B_7$ in Expression 7 below satisfies the below conditions.

$$-5 < B_7 < -15 \tag{12}$$

$$B_7 = (n_7 - 1)\left(\frac{\kappa_{7F}}{r_{7F}^3} + 8D_{7F} - \frac{\kappa_{7R}}{r_{7R}^3} - 8D_{7R}\right)f_T^3 \quad \text{Expression 7}$$

Table 14 below shows specific examples of the numerical values of the zoom lens shows in FIG. 22.

TABLE 14

| Group | Element | Surface | r | d | $n_d$ | $v_d$ |
|---|---|---|---|---|---|---|
| G1 | L1 | 1 | 15.215 | 1.024 | 1.77250 | 49.6 |
| | | 2 | 5.875 | 2.195 | | |
| | L2 | 3 | 39.590 | 1.050 | 1.60602 | 57.8 |
| | | 4 | 8.509* | 2.423 | | |
| | L3 | 5 | 13.275 | 1.920 | 1.74077 | 27.8 |
| | | 6 | 56.498 | variable | | |

TABLE 14-continued

| Group | Element | Surface | r | d | $n_d$ | $v_d$ |
|---|---|---|---|---|---|---|
| G2 | Stop | 7 | ∞ | 0.896 | | |
| | L4 | 8 | 7.399* | 2.176 | 1.60602 | 57.8 |
| | | 9 | ∞ | 1.168 | | |
| | L5 | 10 | 11.355 | 1.920 | 1.69680 | 55.5 |
| | L6 | 11 | −89.845 | 0.896 | 1.80518 | 25.5 |
| | | 12 | 6.983 | 0.479 | | |
| | L7 | 13 | 19.623 | 2.048 | 1.60602 | 57.8 |
| | | 14 | 1279.999* | variable | | |
| G3 | L8 | 15 | 33.561 | 1.536 | 1.51680 | 64.2 |
| | | 16 | −33.561 | variable | | |
| | P | 17 | ∞ | 3.370 | 1.51680 | 64.2 |
| | | 18 | ∞ | | | |

Table 15 below shows the aspheric coefficients of the zoom lens shown in FIG. 22.

TABLE 15

| | Fourth Surface | Eighth Surface | Fourteenth Surface |
|---|---|---|---|
| κ | −4.65564 × 10⁻¹ | −6.37138 × 10⁻² | 0.0 |
| D | −3.51504 × 10⁻⁴ | 1.45258 × 10⁻⁴ | 7.49376 × 10⁻⁴ |
| E | −5.53578 × 10⁻⁶ | −2.69365 × 10⁻⁶ | 1.30216 × 10⁻⁵ |
| F | 7.44150 × 10⁻⁸ | −1.33203 × 10⁻⁷ | 2.17091 × 10⁻⁶ |
| G | −7.19935 × 10⁻⁹ | −6.58408 × 10⁻⁹ | −7.28146 × 10⁻⁸ |

Table 16 below shows the variable distance between surfaces (in mm) in a case where the shooting distance of the zoom lens shown in FIG. 22 is ∞.

TABLE 16

| Surface Spacing | Wide-angle End | Intermediate Position | Telescope End |
|---|---|---|---|
| $d_6$ | 18.499 | 7.977 | 1.893 |
| $d_{14}$ | 3.411 | 8.059 | 16.078 |
| $d_{16}$ | 1.808 | 1.808 | 1.808 |
| F | 5.120 | 8.868 | 15.360 |
| F value | 2.72 | 3.48 | 4.81 |
| 2ω | 65.48° | 39.94° | 23.56° |

Figure 23:
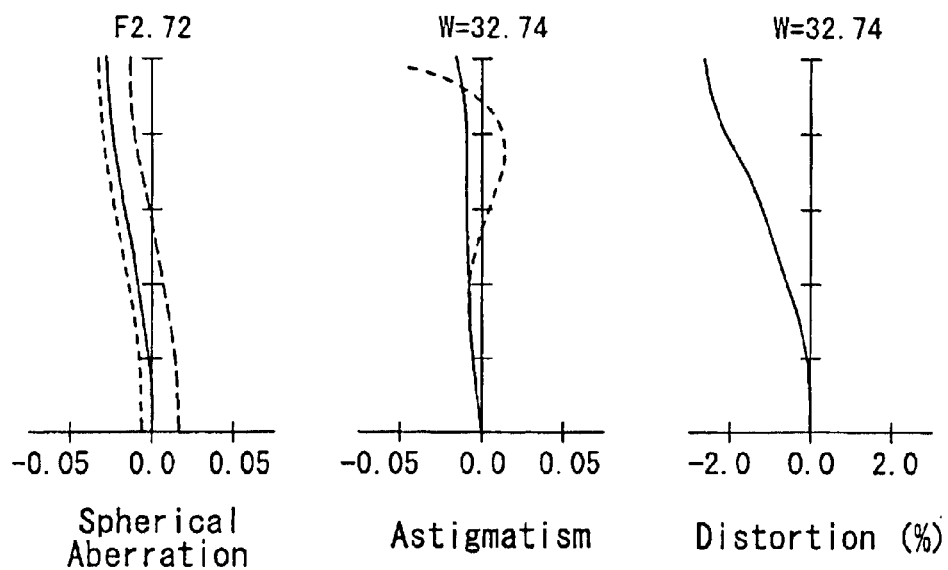
FIG. 23 shows aberration diagrams for the wide-angle end, in the standard state, of the zoom lens according to the sixth embodiment of the present invention.
Figure 24:
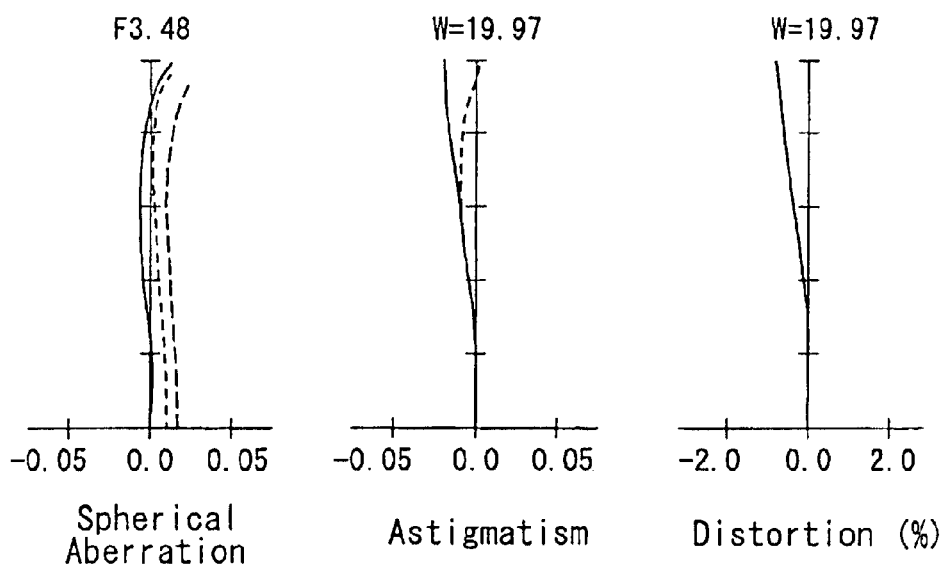
FIG. 24 shows aberration diagrams for the intermediate focal length (intermediate position), in the standard state, of the zoom lens according to the sixth embodiment of the present invention.
Figure 25:
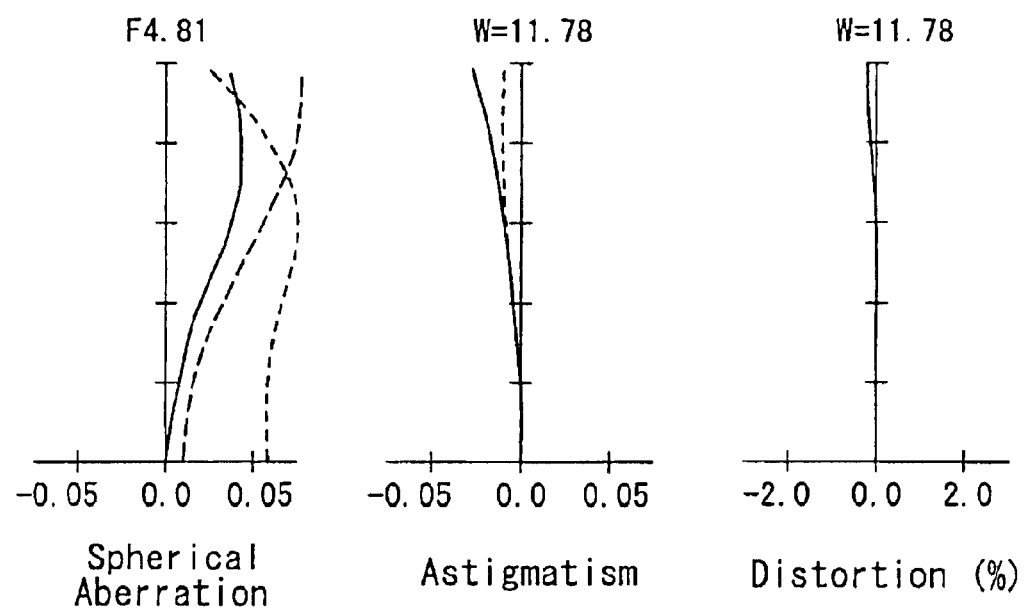
FIG. 25 shows aberration diagrams for the telescope end, in the standard state, of the zoom lens according to the sixth embodiment of the present invention.

FIGS. 23 to 25 are aberration diagrams (spherical aberration, astigmatism, and distortion) of the zoom lens shown in FIG. 22 when the aperture stop is open and the shooting distance is ∞. FIG. 23 is the case for the wide-angle end, FIG. 24 is the case for the intermediate focal length (intermediate position), and FIG. 25 is the case for the telescope end.

It is clear from the aberration diagrams shown in FIGS. 23 to 25 that the zoom lens of this embodiment demonstrates good aberration properties even if the zoom position is changed as the shooting distance changes.

Figure 26:
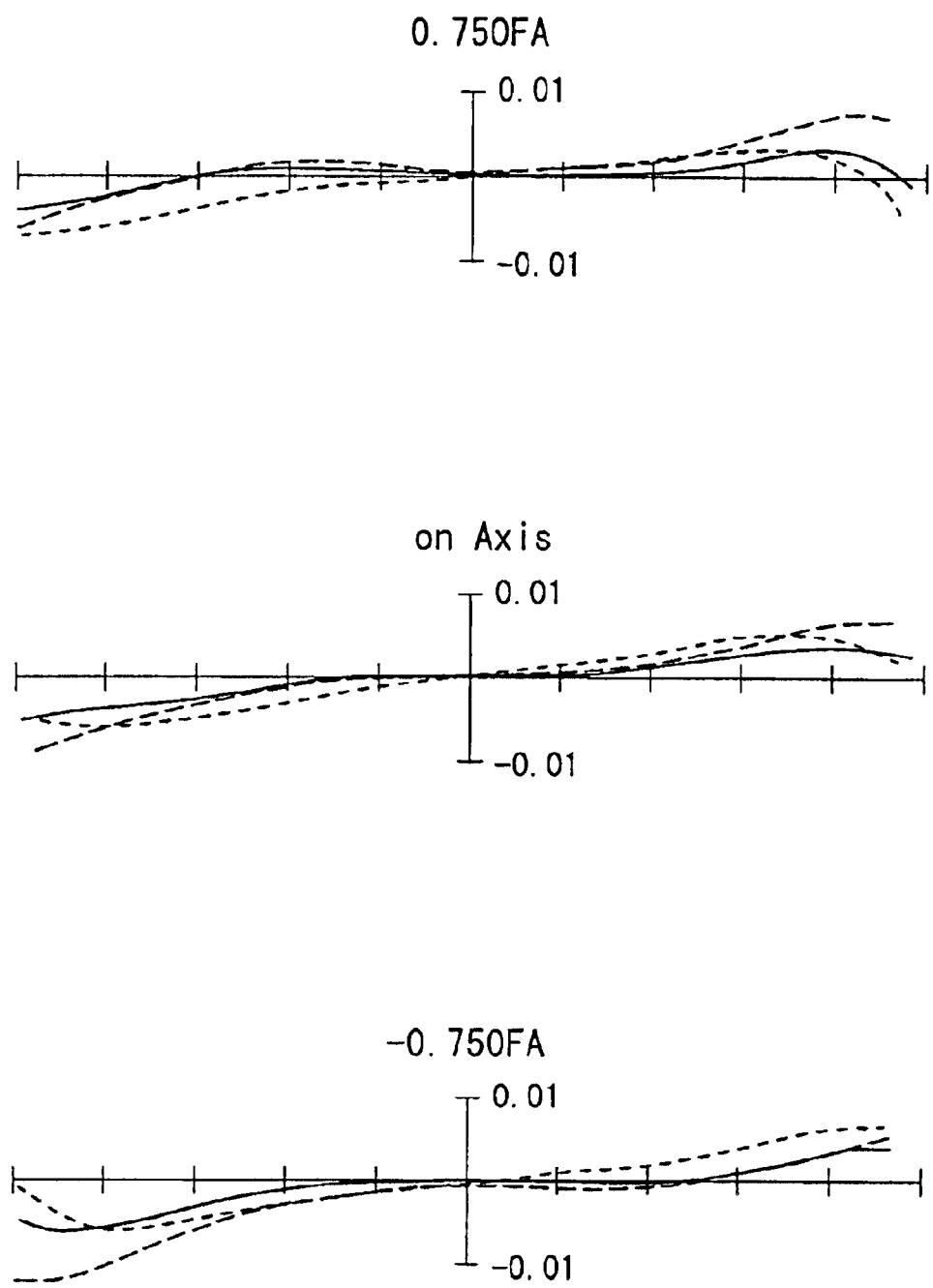
FIG. 26 shows aberration diagrams for the telescope end, in the state where camera shake is corrected, of the zoom lens according to the sixth embodiment of the present invention.

FIG. 26 shows the aberration diagrams during a camera shake correction at the telescope end. FIG. 26 shows the transverse aberration at an image point on the axis and at the image points of ±75% of the maximum image height in a case where the shooting distance is ∞, the aperture stop is open, and the second lens group G2 has been parallel displaced by 0.0665 mm in the direction perpendicular to the optical axis. Here, the solid line indicates values at the d-line, the short broken line indicates values at the F-line, and the long broken line indicates values at the C-line. It should be noted that in FIG. 26, the meridional plane is the plane that includes the optical axis of the first lens group G1 and the optical axis of the second lens group G2.

The amount of image decenter at the telescope end with a shooting distance of ∞ in a case where the zoom lens is tilted 0.5° is equivalent to the amount of image decenter when the second lens group G2 is parallel displaced by 0.0665 mm in the direction perpendicular to the optical axis.

It is clear from the aberration diagrams of FIG. 26 that there is good symmetry of the transverse aberration at the image point on the axis. Comparing the transverse aberration at the image point of 75% of the maximum image height and the transverse aberration at the image point of −75% of the maximum image height, from the fact that they both have a small degree of curvature and the slopes of their aberration curves are substantially equal, it is clear that there is little decentered coma and decentered astigmatism. This means that sufficient image-forming properties can be obtained even when the decenter has been corrected. Also, if the camera shake angle of the zoom lens is the same, then the amount of parallel displacement of the second lens group G2 that is required for camera shake correction is reduced as the combined focal length of the overall lens system becomes shorter. Consequently, regardless of the zoom position, sufficient camera shake correction is possible for camera shake angles up to 0.5°.

The same solid-state imaging elements as those described above in the first embodiment can be used in the zoom lens shown in FIG. 22.

The four lenses in the second lens group G2 from the fourth lens L4 to the seventh lens L7 are highly sensitive to decenter, and the fourth lens L4 and the seventh lens L7 have particularly high sensitivity to decenter. Accordingly, the fifth lens L5 and the sixth lens L6 are cemented and the sixth lens L6 and the seventh lens L7 are in contact at their circumference portions (outside their effective diameters). Additionally, the surface of the fourth lens L4 on the image plane S side is a flat surface, so that the fourth lens L4 can be easily positioned during assembly. That is, assembly of the second lens group G2 is carried out in such a manner that the decenter of the second lens group G2 is made small by first incorporating the fifth lens L5 to the seventh lens L7 in a lens barrel and then adjusting the position of the fourth lens L4 using an decenter measuring device. At this time, the fourth lens L4 can be parallel displaced without being tilted if the surface of the fourth lens L4 on the image plane S side is a flat surface.

As described above, the zoom lens shown in FIG. 22, with a zoom ratio of ×2.5 to ×3.2 and an angle of view at the wide-angle end of approximately 60°, has high resolution and a short overall optical length when not in use, and is moreover provided with a camera shake-correction function, and the image-forming properties when camera shake correction is performed are also good.

It goes without saying that a zoom lens with the configuration shown in FIG. 22 in which the second lens group G2 is not parallel displaced in the direction perpendicular to the optical axis is also effective. Using common components for most of the components making up the lens unit, it is possible to achieve a zoom lens that has been configured so that the second lens group G2 is parallel displaced in the direction perpendicular to the optical axis and a zoom lens in which the second lens group G2 is not parallel displaced in the direction perpendicular to the optical axis.

Seventh Embodiment

Figure 27:
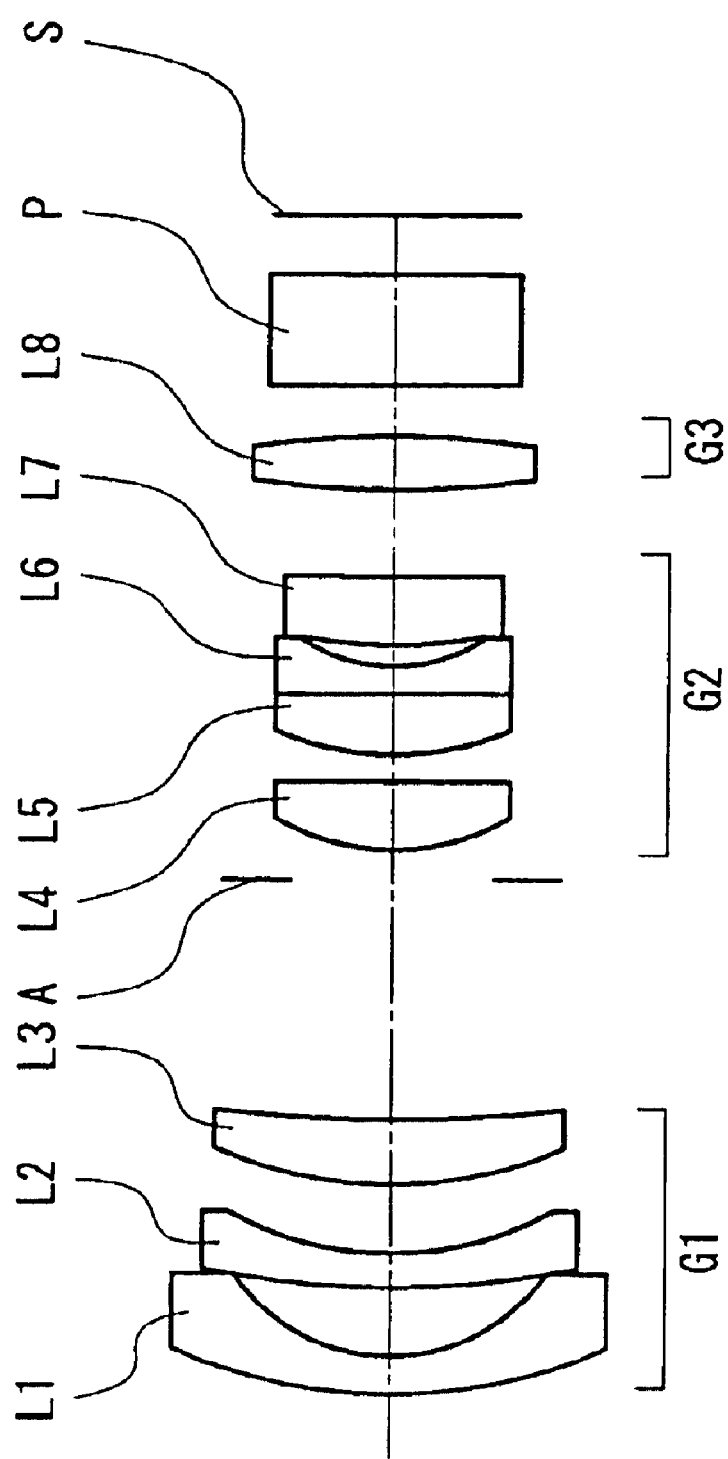
FIG. 27 is a layout drawing showing the configuration of a zoom lens according to a seventh embodiment of the present invention.

FIG. 27 is a layout drawing showing the configuration of a zoom lens according to a seventh embodiment of the present invention.

As shown in FIG. 27, the zoom lens of this embodiment is made of a first lens group G1, an aperture stop A, a second lens group G2, and a third lens group G3, arranged in that order from the object side (left side in FIG. 27) toward the image plane S side (right side in FIG. 27), and includes eight lenses.

The zoom lens shown in FIG. 27 has the same configuration as the zoom lens detailed above in the sixth embodiment (see FIG. 22), and is different only in the manner in which the seventh lens L7 is provided with an aspherical surface. That is, in the zoom lens shown in FIG. 22, the surface of the seventh lens L7 that is on the image plane S side is an aspherical surface, whereas in the zoom lens according to this embodiment and shown in FIG. 27, the surface of the seventh lens L7 that is on the object side is an aspherical surface. More specifically, the surface of the seventh lens L7 on the object side is an aspherical surface whose local radius of curvature monotonically increases as distance from the center increases.

It is preferable that the various conditions set forth in Conditions Expressions (1) to (12) are satisfied in this embodiment as well.

Table 17 below specific examples of the numerical values of the zoom lens shown in FIG. 27, Table 18 below shows the aspheric coefficient of the zoom lens, and Table 19 below shows the variable distance between surfaces (in mm) in a case where the shooting distance of the zoom lens is ∞.

TABLE 17

| Group | Element | Surface | R | D | $n_d$ | $v_d$ |
|---|---|---|---|---|---|---|
| G1 | L1 | 1 | 15.549 | 1.030 | 1.77250 | 49.6 |
|  |  | 2 | 5.881 | 2.178 |  |  |
|  | L2 | 3 | 37.790 | 1.040 | 1.60602 | 57.8 |
|  |  | 4 | 9.029* | 2.278 |  |  |
|  | L3 | 5 | 13.155 | 1.920 | 1.74077 | 27.8 |
|  |  | 6 | 54.940 | variable |  |  |
| G2 | Stop | 7 | ∞ | 0.896 |  |  |
|  | L4 | 8 | 6.805* | 2.170 | 1.60602 | 57.8 |
|  |  | 9 | ∞ | 0.962 |  |  |
|  | L5 | 10 | 11.672 | 1.920 | 1.69680 | 55.5 |
|  | L6 | 11 | 159.321 | 0.890 | 1.80518 | 25.5 |
|  |  | 12 | 5.773 | 0.677 |  |  |
|  | L7 | 13 | 15.441* | 2.000 | 1.60602 | 57.8 |
|  |  | 14 | −157.952 | variable |  |  |
| G3 | L8 | 15 | 33.561 | 1.530 | 1.51680 | 64.2 |
|  |  | 16 | −33.561 | variable |  |  |
|  | P | 17 | ∞ | 3.370 | 1.51680 | 64.2 |
|  |  | 18 | ∞ |  |  |  |

TABLE 18

|  | Fourth Surface | Eighth Surface | Thirteenth Surface |
|---|---|---|---|
| κ | $-3.90916 \times 10^{-1}$ | $-9.46819 \times 10^{-2}$ | 0.0 |
| D | $-3.33119 \times 10^{-4}$ | $-1.82568 \times 10^{-4}$ | $-5.99418 \times 10^{-4}$ |
| E | $-7.91113 \times 10^{-6}$ | $-1.25225 \times 10^{-6}$ | $-2.53415 \times 10^{-5}$ |
| F | $2.10942 \times 10^{-7}$ | $-3.68305 \times 10^{-8}$ | $-1.58225 \times 10^{-7}$ |
| G | $-1.05499 \times 10^{-10}$ | $-1.18383 \times 10^{-9}$ | $-1.36821 \times 10^{-7}$ |

TABLE 19

| Surface Spacing | Wide-angle End | Intermediate Position | Telescope End |
|---|---|---|---|
| $d_6$ | 19.218 | 8.221 | 1.873 |
| $d_{14}$ | 2.763 | 7.191 | 14.860 |
| $d_{16}$ | 1.990 | 1.990 | 1.990 |
| F | 5.100 | 8.834 | 15.300 |
| F value | 2.75 | 3.46 | 4.77 |
| 2ω | 65.68° | 40.16° | 23.68° |

Figure 28:
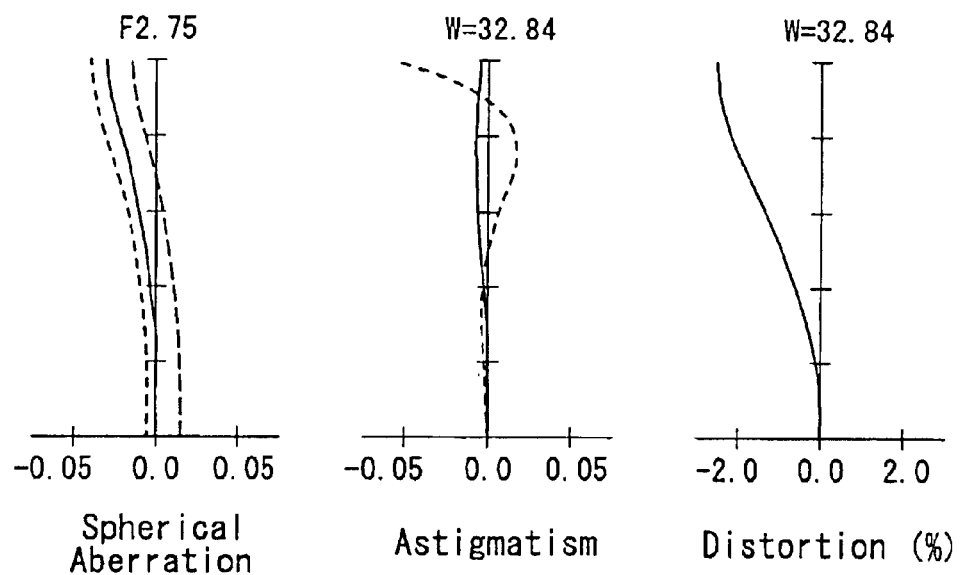
FIG. 28 shows aberration diagrams for the wide-angle end, in the standard state, of the zoom lens according to the seventh embodiment of the present invention.
Figure 29:
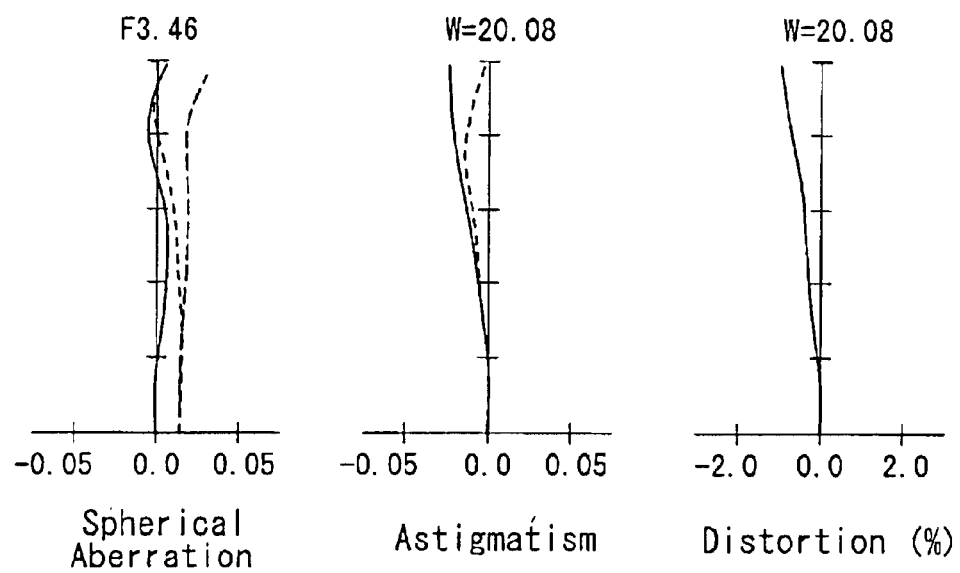
FIG. 29 shows aberration diagrams for the intermediate focal length (intermediate position), in the standard state, of the zoom lens according to the seventh embodiment of the present invention.
Figure 30:
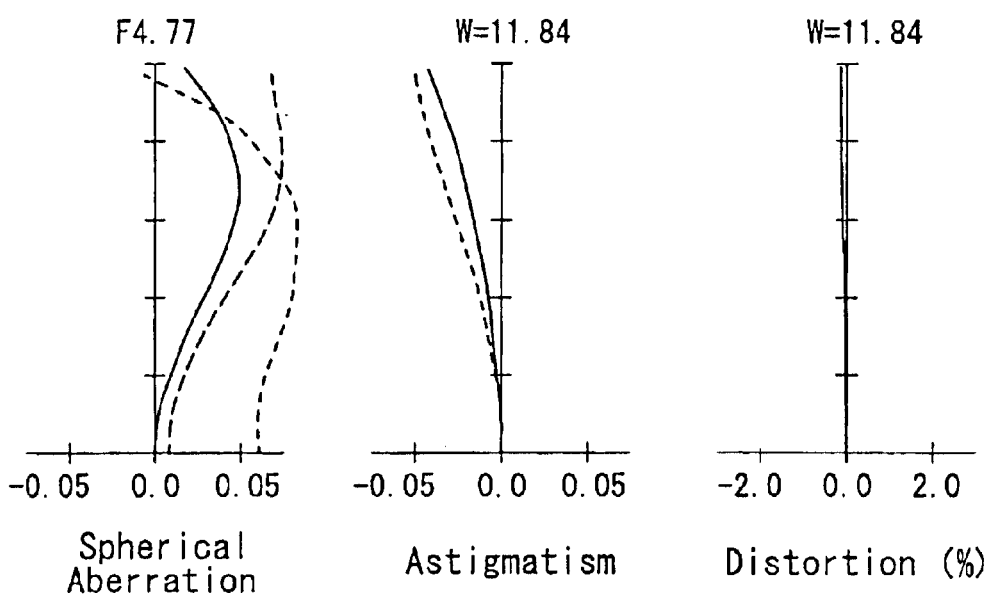
FIG. 30 shows aberration diagrams for the telescope end, in the standard state, of the zoom lens according to the seventh embodiment of the present invention.

FIGS. 28 to 30 are aberration diagrams (spherical aberration, astigmatism, and distortion) of the zoom lens shown in FIG. 27 when the shooting distance is ∞ and the aperture stop is open. FIG. 28 shows the case for the wide-angle end, FIG. 29 shows the case for the intermediate position, and FIG. 30 shows the case for the telescope end.

It is clear from the aberration diagrams shown in FIGS. 28 to 30 that the zoom lens of this embodiment demonstrates good aberration properties even if the zoom position is changed as the shooting distance changes.

Figure 31:
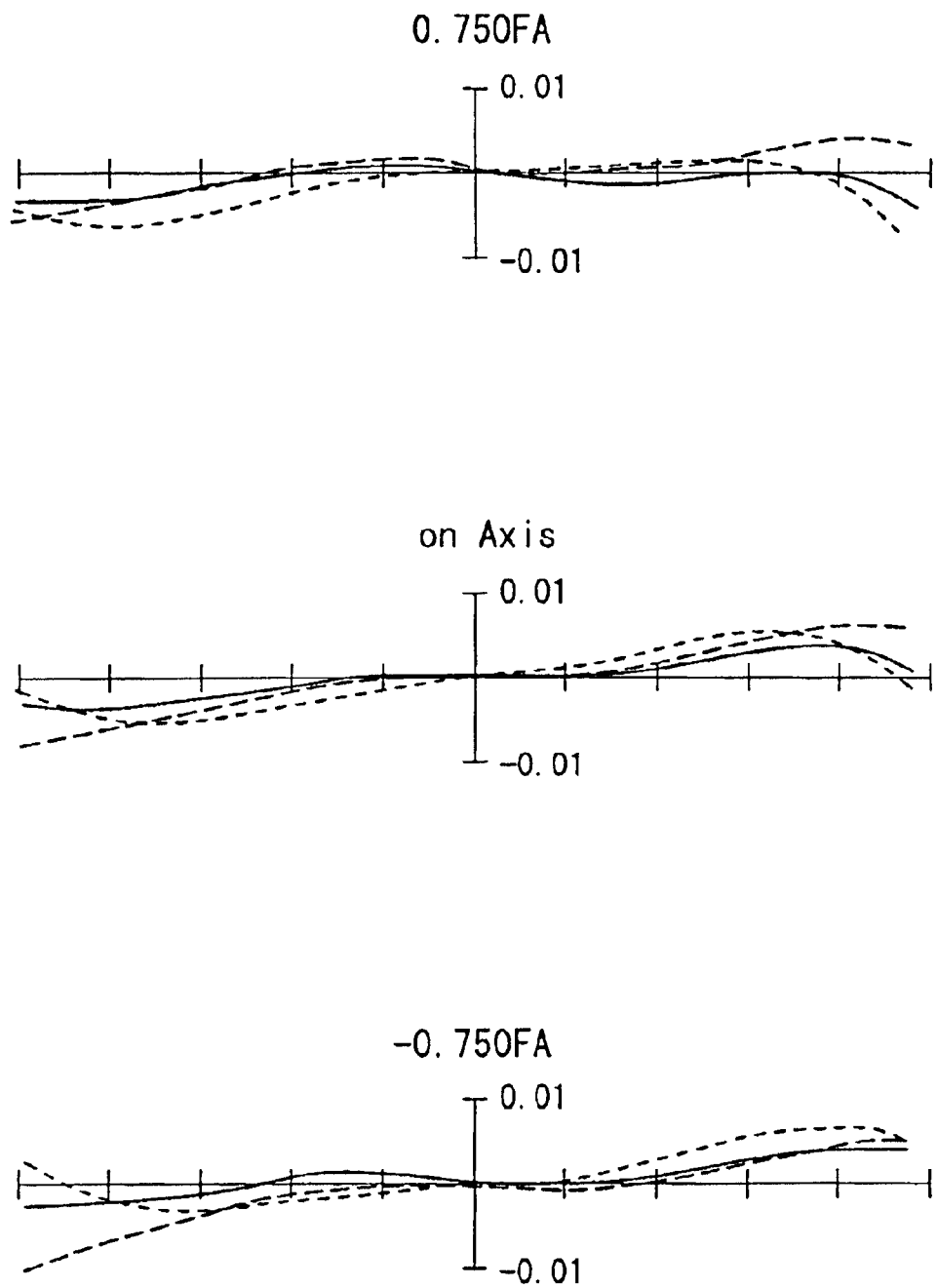
FIG. 31 shows aberration diagrams for the telescope end, in the state where camera shake is corrected, of the zoom lens according to the seventh embodiment of the present invention.

FIG. 31 shows the aberration diagrams during a camera shake correction at the telescope end. FIG. 31 shows the transverse aberration at an image point on the axis and at the image points of ±75% of the maximum image height in a case where the shooting distance is ∞, the aperture stop is open, and the second lens group G2 has been parallel displaced by 0.0683 mm in the direction perpendicular to the optical axis. The conditions and denotations for FIG. 31 are the same as those of FIG. 26 of the sixth embodiment. The amount 0.0683 mm that the second lens group G2 is parallel displaced corresponds to a case where the shooting distance is ∞, at the telescope end, in which the zoom lens is tilted by 0.5°.

It is clear from the aberration diagrams of FIG. 31 that, like in the sixth embodiment, sufficient camera shake correction is possible for camera shake angles of the zoom lens up to 0.5°.

The same solid-state imaging elements as those described above in the first embodiment can be used in the zoom lens shown in FIG. 27.

As described above, the zoom lens shown in FIG. 27, with a zoom ratio of ×2.5 to ×3.2 and an angle of view at the wide-angle end of about 60°, has high resolution and a short overall optical length when not in use, and is moreover provided with a camera shake-correction function, and the image-forming properties when camera shake correction is performed are also good.

Eighth Embodiment

Figure 32:
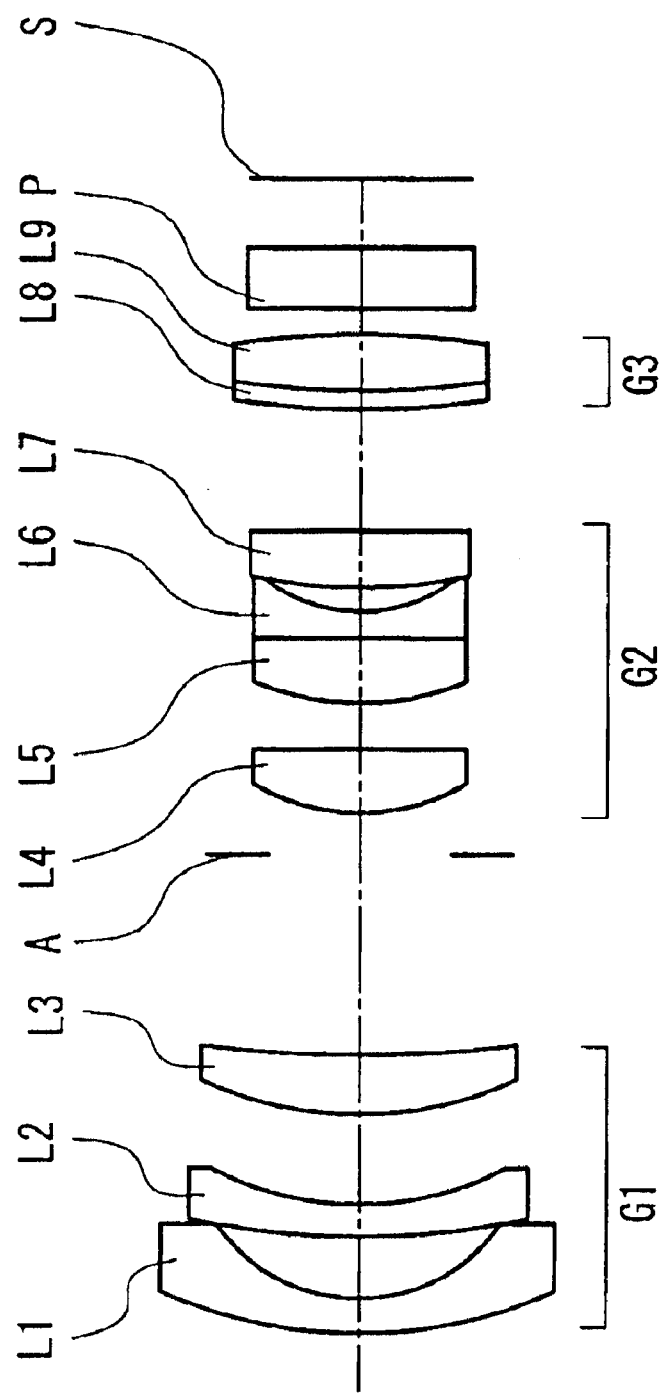
FIG. 32 is a layout drawing showing the configuration of a zoom lens according to an eighth embodiment of the present invention.

FIG. 32 is a layout drawing showing the configuration of a zoom lens according to an eighth embodiment of the present invention.

The zoom lens shown in FIG. 32 has a third lens group G3 with a configuration different than that in the zoom lens detailed above in the sixth embodiment (see FIG. 22), however, it is the same in all other aspects. That is, in the zoom lens shown in FIG. 22, the third lens group G3 is made of a single lens, the eighth lens L8, which is a positive lens, whereas in the zoom lens according to this embodiment and shown in FIG. 32, the third lens group G3 is made of a cemented lens of an eighth lens L8 that is a negative meniscus lens and a ninth lens L9 that is a biconvex lens (positive lens).

It is preferable that the various conditions set forth in Conditional Expressions (1) to (12) are satisfied in this embodiment as well.

Table 20 below shows specific examples of the numerical values of the zoom lens shown in FIG. 32, Table 21 below shows the aspheric coefficients of the zoom lens, and Table 22 below shows the variable distance between surfaces (in mm) in a case where the shooting distance of the zoom lens is ∞.

TABLE 20

| Group | Element | Surface | r | D | $n_d$ | $v_d$ |
|---|---|---|---|---|---|---|
| G1 | L1 | 1 | 17.699 | 1.270 | 1.77250 | 49.6 |
|  |  | 2 | 6.110 | 2.591 |  |  |
|  | L2 | 3 | 29.594 | 1.150 | 1.60602 | 57.8 |
|  |  | 4 | 9.474* | 2.875 |  |  |
|  | L3 | 5 | 14.979 | 2.146 | 1.74077 | 27.8 |
|  |  | 6 | 56.178 | variable |  |  |

TABLE 20-continued

| Group | Element | Surface | r | D | $n_d$ | $v_d$ |
|---|---|---|---|---|---|---|
| G2 | Stop | 7 | ∞ | 1.500 | | |
| | L4 | 8 | 9.513* | 2.240 | 1.66549 | 55.4 |
| | | 9 | −1034.853 | 1.634 | | |
| | L5 | 10 | 8.973 | 2.200 | 1.69680 | 55.5 |
| | L6 | 11 | 84.439 | 0.980 | 1.80518 | 25.5 |
| | | 12 | 5.875 | 0.770 | | |
| | L7 | 13 | 18.554 | 2.000 | 1.60602 | 57.8 |
| | | 14 | 1430.966* | variable | | |
| G3 | L8 | 15 | 33.298 | 0.600 | 1.69895 | 30.1 |
| | L9 | 16 | 18.150 | 1.900 | 1.69680 | 55.5 |
| | | 17 | −33.298 | variable | | |
| | P | 18 | ∞ | 2.220 | 1.51680 | 64.2 |
| | | 19 | ∞ | | | |

TABLE 21

| | Fourth Surface | Eighth Surface | Fourteenth Surface |
|---|---|---|---|
| K | $-3.79249 \times 10^{-1}$ | $-1.68387 \times 10^{-1}$ | 0.0 |
| D | $-3.22644 \times 10^{-4}$ | $-7.43394 \times 10^{-5}$ | $3.23678 \times 10^{-4}$ |
| E | $-7.65536 \times 10^{-6}$ | $1.92885 \times 10^{-6}$ | $-1.82572 \times 10^{-7}$ |
| F | $2.11381 \times 10^{-7}$ | $-3.03006 \times 10^{-7}$ | $1.89247 \times 10^{-6}$ |
| G | $-8.71533 \times 10^{-9}$ | $1.11126 \times 10^{-8}$ | $-1.27875 \times 10^{-7}$ |

TABLE 22

| Surface Spacing | Wide-angle End | Intermediate Position | Telescope End |
|---|---|---|---|
| $d_6$ | 18.440 | 7.518 | 1.213 |
| $d_{14}$ | 4.384 | 9.565 | 18.539 |
| $d_{16}$ | 1.007 | 1.007 | 1.007 |
| F | 5.300 | 9.180 | 15.900 |
| F value | 2.75 | 3.55 | 4.95 |
| 2ω | 63.90° | 38.72° | 22.80° |

Figure 33:
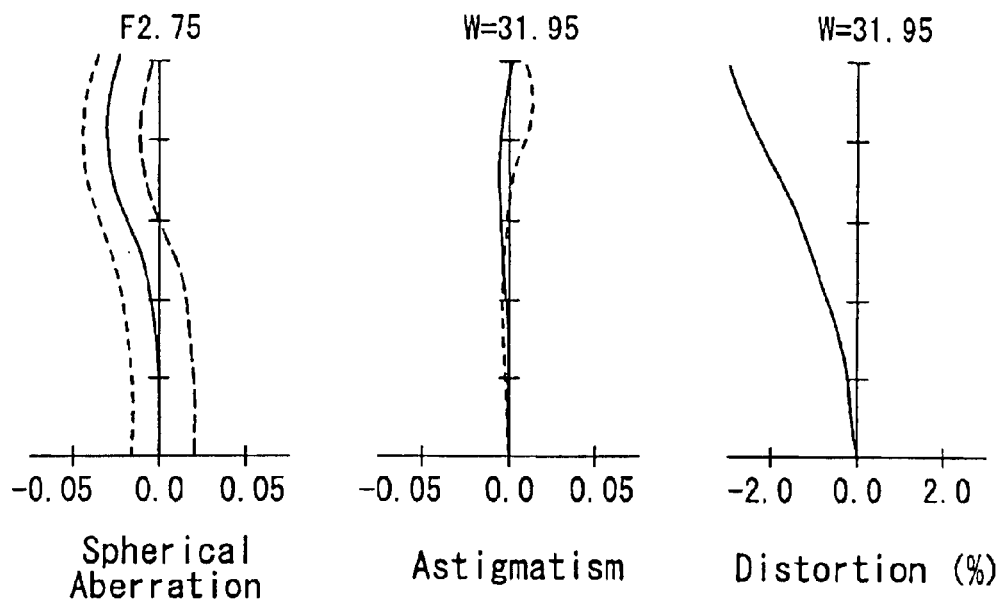
FIG. 33 shows aberration diagrams for the wide-angle end, in the standard state, of the zoom lens according to the eighth embodiment of the present invention.
Figure 34:
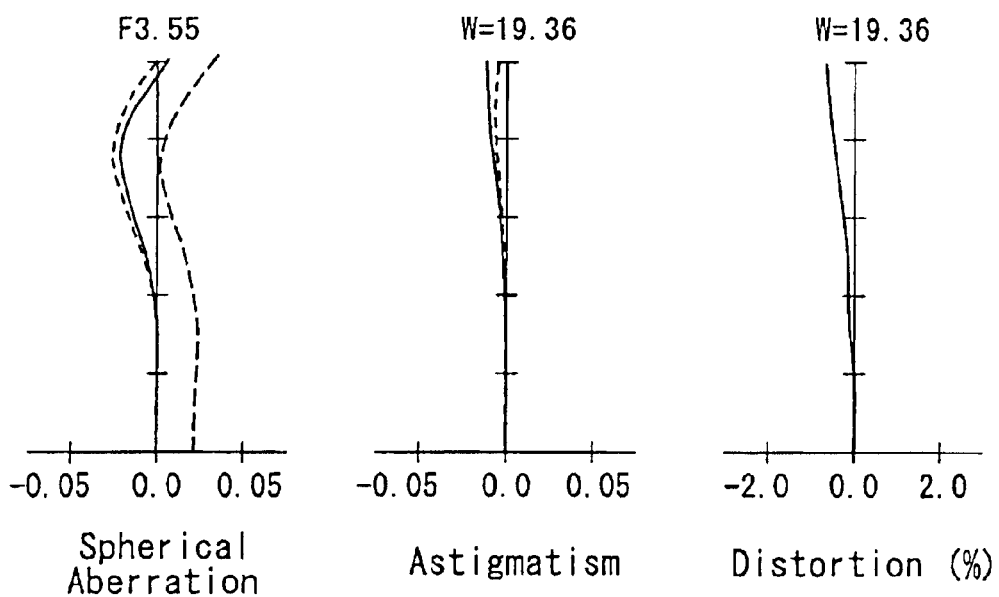
FIG. 34 shows aberration diagrams for the intermediate focal length (intermediate position), in the standard state, of the zoom lens according to the eighth embodiment of the present invention.
Figure 35:
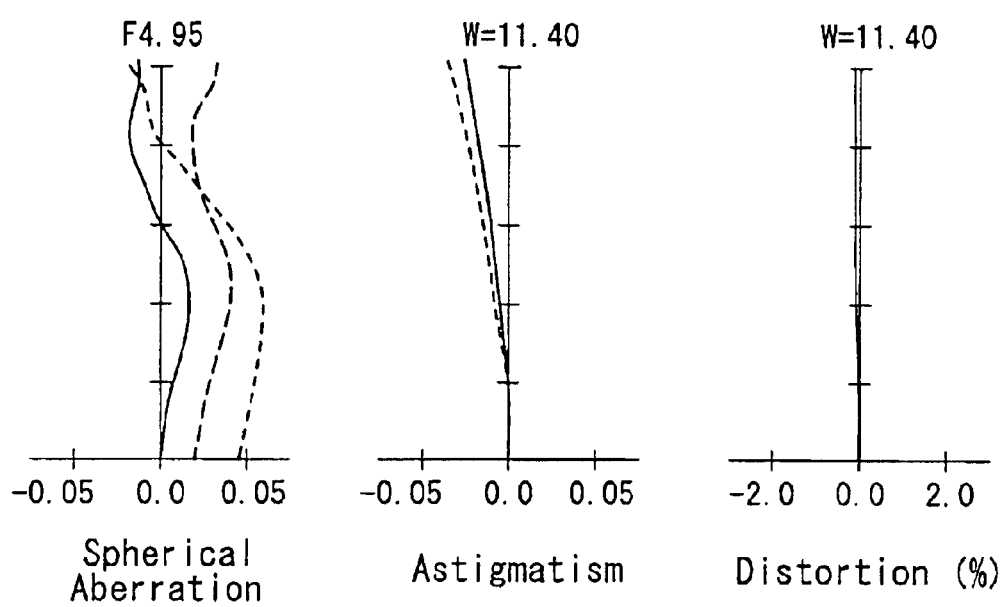
FIG. 35 shows aberration diagrams for the telescope end, in the standard state, of the zoom lens according to the eighth embodiment of the present invention.

FIGS. 33 to 35 are aberration diagrams (spherical aberration, astigmatism, and distortion) of the zoom lens shown in FIG. 32 when the shooting distance is ∞ and the aperture stop is open. FIG. 33 shows the case for the wide-angle end, FIG. 34 shows the case for the intermediate position, and FIG. 35 shows the case for the telescope end.

It is clear from the aberration diagrams shown in FIGS. 33 to 36 that the zoom lens of this embodiment demonstrates good aberration properties even if the zoom position is changed as the shooting distance changes.

Figure 36:
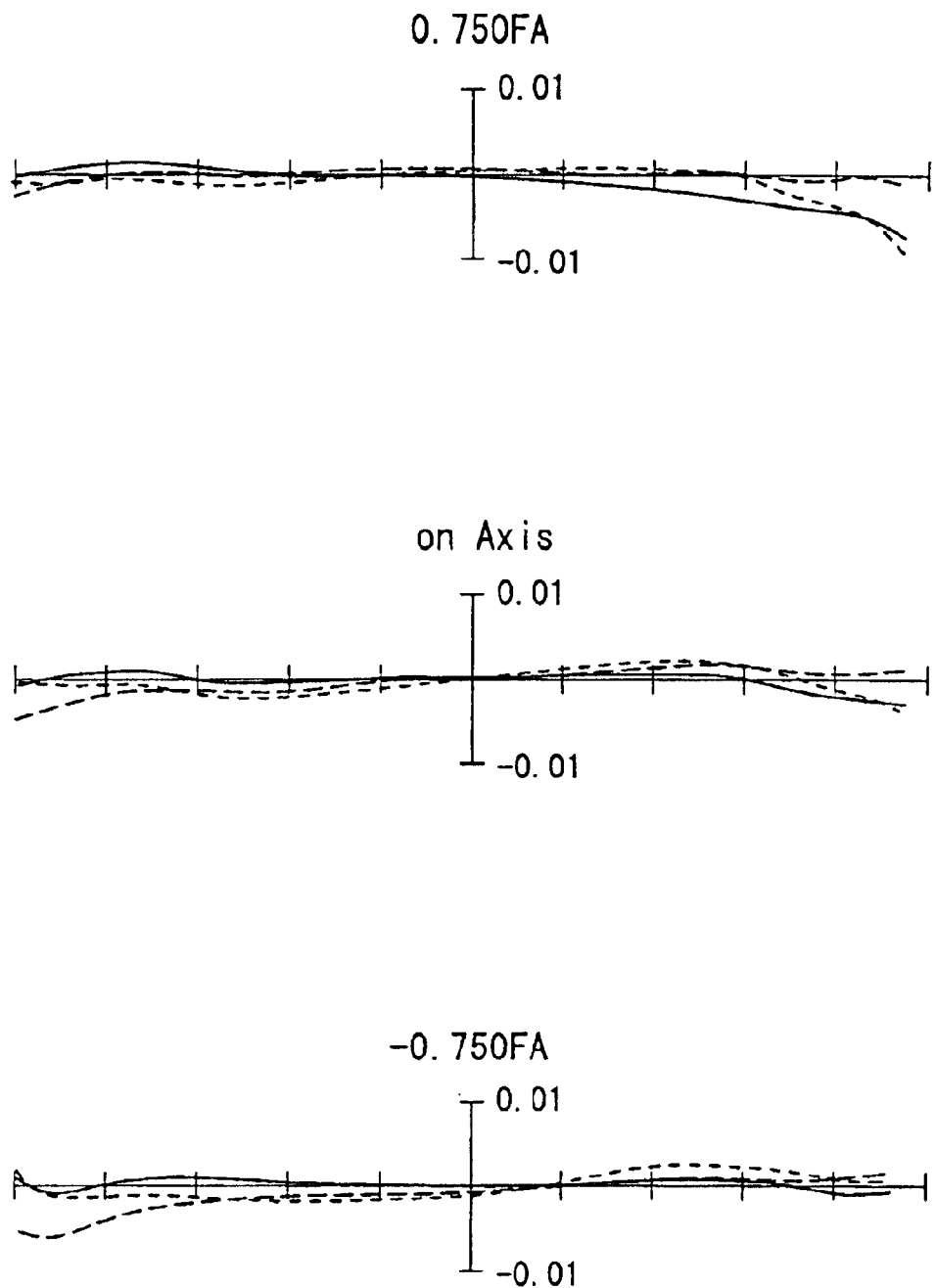
FIG. 36 shows aberration diagrams for the telescope end, in the state where camera shake is corrected, of the zoom lens according to the eighth embodiment of the present invention.

FIG. 36 shows the aberration diagrams during a camera shake correction at the telescope end. FIG. 36 shows the transverse aberration at an image point on the axis and at the image points of ±75% of the maximum image height in a case where the shooting distance is ∞, the aperture stop is open, and the second lens group G2 has been parallel displaced by 0.0708 mm in the direction perpendicular to the optical axis. The conditions and denotations for FIG. 36 are the same as those of FIG. 26 of the sixth embodiment. The amount 0.0708 mm by which the second lens group G2 is parallel displaced corresponds to a case where the shooting distance is ∞, at the telescope end, in which the zoom lens is tilted by 0.5°.

It is clear from the aberration diagrams of FIG. 36 that, like in the sixth embodiment, sufficient camera shake correction is possible for camera shake angles of the zoom lens up to 0.5°.

The same solid-state imaging elements as those described above in the first embodiment can be used in the zoom lens shown in FIG. 32.

In the third lens group G3, to favorably correct the curvature of field and chromatic aberration, it is preferable that the refractive index of the eighth lens L8 is lowered to reduce its Abbe number and that the refractive index of the ninth lens L9 is increased to raise its Abbe number. However, if the ratio of the Abbe number of the eighth lens L8 to the Abbe number of the ninth lens L9 is large, then the center thickness of the ninth lens L9 must be made thick in order to secure thickness at the edges, and thus attention must be paid to the weight of the third lens group G3.

As described above, the zoom lens shown in FIG. 32, with a zoom ratio of ×2.5 to ×3.2 and an angle of view at the wide-angle end of about 60°, has high resolution and a short overall optical length when not in use, and is moreover provided with a camera shake-correction function, and the image-forming properties during camera shake correction as well are also good.

Ninth Embodiment

Figure 37:
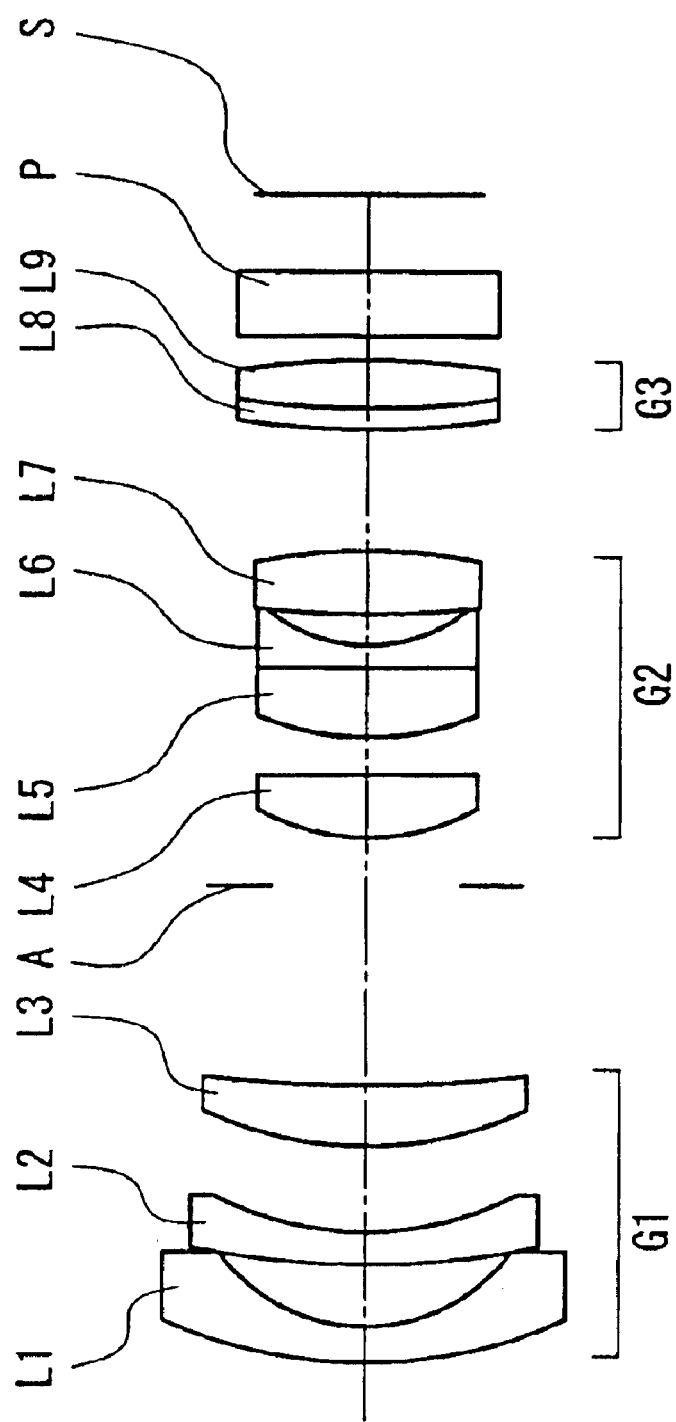
FIG. 37 is a layout drawing showing the configuration of a zoom lens according to a ninth embodiment of the present invention.

FIG. 37 is a layout drawing showing the configuration of a zoom lens according to a ninth embodiment of the present invention.

The zoom lens shown in FIG. 37 has a third lens group G3 with a configuration different than that in the zoom lens detailed above in the seventh embodiment (see FIG. 27), however, it is the same in all other aspects. That is, in the zoom lens shown in FIG. 27, the third lens group G3 is made of a single lens, the eighth lens L8, which is a positive lens, whereas in the zoom lens according to this embodiment and shown in FIG. 37, the third lens group G3 is made of a cemented lens constituted by an eighth lens L8 that is a negative meniscus lens and a ninth lens L9 that is a biconvex lens.

It is preferable that the various conditions set forth in Conditional Expressions (1) to (12) are satisfied in this embodiment as well.

Table 23 below shows specific examples of the numerical values of the zoom lens shown in FIG. 37, Table 24 below shows the aspheric coefficients of the zoom lens, and Table 25 below shows the variable distance between surfaces (in mm) in a case where the shooting distance of the zoom lens is ∞.

TABLE 23

| Group | Element | Surface | r | d | $n_d$ | $v_d$ |
|---|---|---|---|---|---|---|
| G1 | L1 | 1 | 17.499 | 1.270 | 1.77250 | 49.6 |
| | | 2 | 6.218 | 2.503 | | |
| | L2 | 3 | 30.438 | 1.150 | 1.60602 | 57.8 |
| | | 4 | 9.764* | 2.690 | | |
| | L3 | 5 | 14.544 | 2.146 | 1.74077 | 27.8 |
| | | 6 | 49.311 | variable | | |
| G2 | Stop | 7 | ∞ | 1.500 | | |
| | L4 | 8 | 9.532* | 2.240 | 1.66549 | 55.4 |
| | | 9 | −683.506 | 1.475 | | |
| | L5 | 10 | 8.561 | 2.200 | 1.69680 | 55.5 |
| | L6 | 11 | 79.560 | 0.980 | 1.80518 | 25.5 |
| | | 12 | 5.817 | 1.016 | | |
| | L7 | 13 | 40.428* | 2.000 | 1.60602 | 57.8 |
| | | 14 | −37.348 | variable | | |
| G3 | L8 | 15 | 29.084 | 0.600 | 1.69895 | 30.1 |
| | | 16 | 14.481 | 1.900 | 1.69680 | 55.5 |
| | | 17 | −38.926 | variable | | |
| | P | 18 | ∞ | 2.220 | 1.51680 | 64.2 |
| | | 19 | ∞ | | | |

TABLE 24

| | Fourth Surface | Eighth Surface | Thirteenth Surface |
|---|---|---|---|
| K | $-2.77751 \times 10^{-1}$ | $-1.59505 \times 10^{-1}$ | 0.0 |
| D | $-3.03240 \times 10^{-4}$ | $-7.09646 \times 10^{-5}$ | $-3.17391 \times 10^{-4}$ |
| E | $-6.90554 \times 10^{-6}$ | $2.70978 \times 10^{-6}$ | $-1.28932 \times 10^{-5}$ |
| F | $1.54388 \times 10^{-7}$ | $-4.13914 \times 10^{-7}$ | $4.70645 \times 10^{-8}$ |
| G | $-6.46978 \times 10^{-9}$ | $1.78588 \times 10^{-8}$ | $-1.08728 \times 10^{-9}$ |

TABLE 25

| Surface Spacing | Wide-angle End | Intermediate Position | Telescope End |
|---|---|---|---|
| $d_6$ | 18.418 | 7.232 | 0.800 |
| $d_{14}$ | 3.959 | 8.990 | 17.690 |
| $d_{16}$ | 0.985 | 0.985 | 0.985 |
| F | 5.298 | 9.194 | 15.932 |
| F value | 2.66 | 3.40 | 4.70 |
| $2\omega$ | 63.88° | 38.68° | 22.74° |

Figure 38:
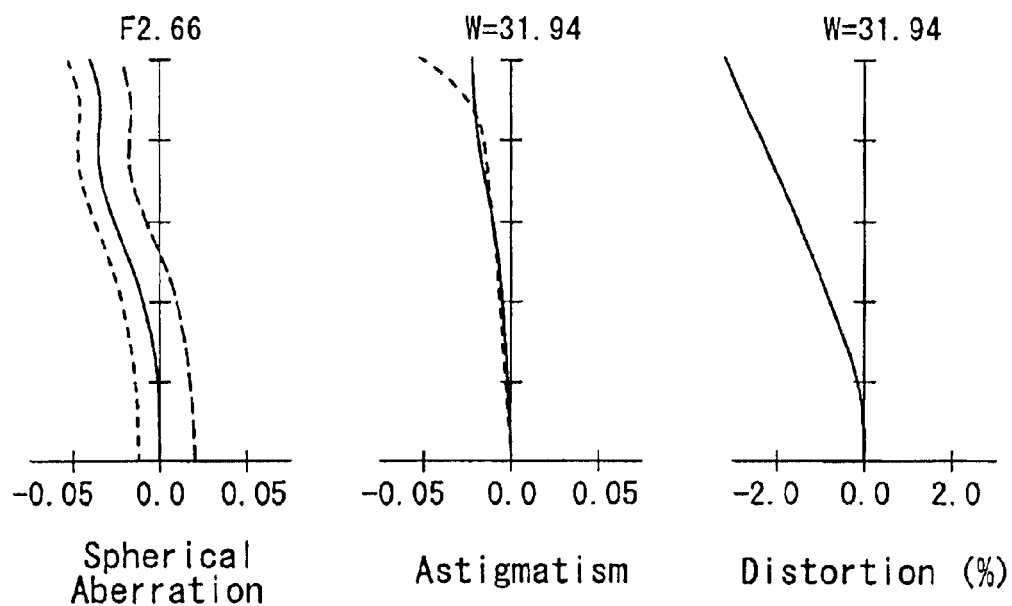
FIG. 38 shows aberration diagrams for the wide-angle end, in the standard state, of the zoom lens according to the ninth embodiment of the present invention.
Figure 39:
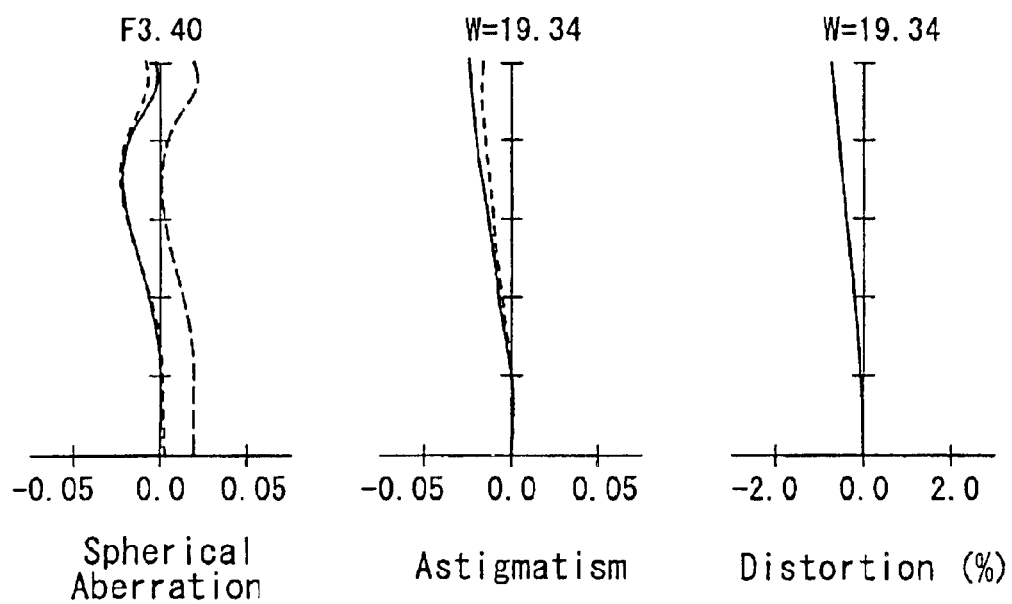
FIG. 39 shows aberration diagrams for the intermediate focal length (intermediate position), in the standard state, of the zoom lens according to the ninth embodiment of the present invention.
Figure 40:
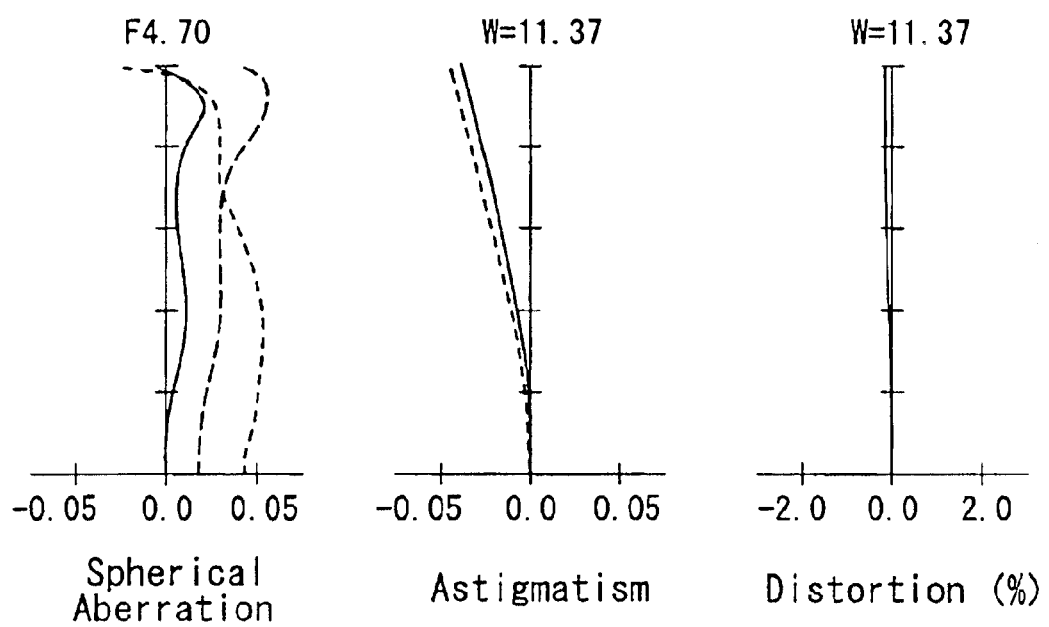
FIG. 40 shows aberration diagrams for the telescope end, in the standard state, of the zoom lens according to the ninth embodiment of the present invention.

FIGS. 38 to 40 are aberration diagrams (spherical aberration, astigmatism, and distortion) of the zoom lens shown in FIG. 37 when the shooting distance is ∞ and the aperture stop is open. FIG. 38 shows the case for the wide-angle end, FIG. 39 shows the case for the intermediate position, and FIG. 40 shows the case for the telescope end.

It is clear from the aberration diagrams shown in FIGS. 38 to 40 that the zoom lens of this embodiment demonstrates good aberration properties even if the zoom position is changed as the shooting distance changes.

Figure 41:
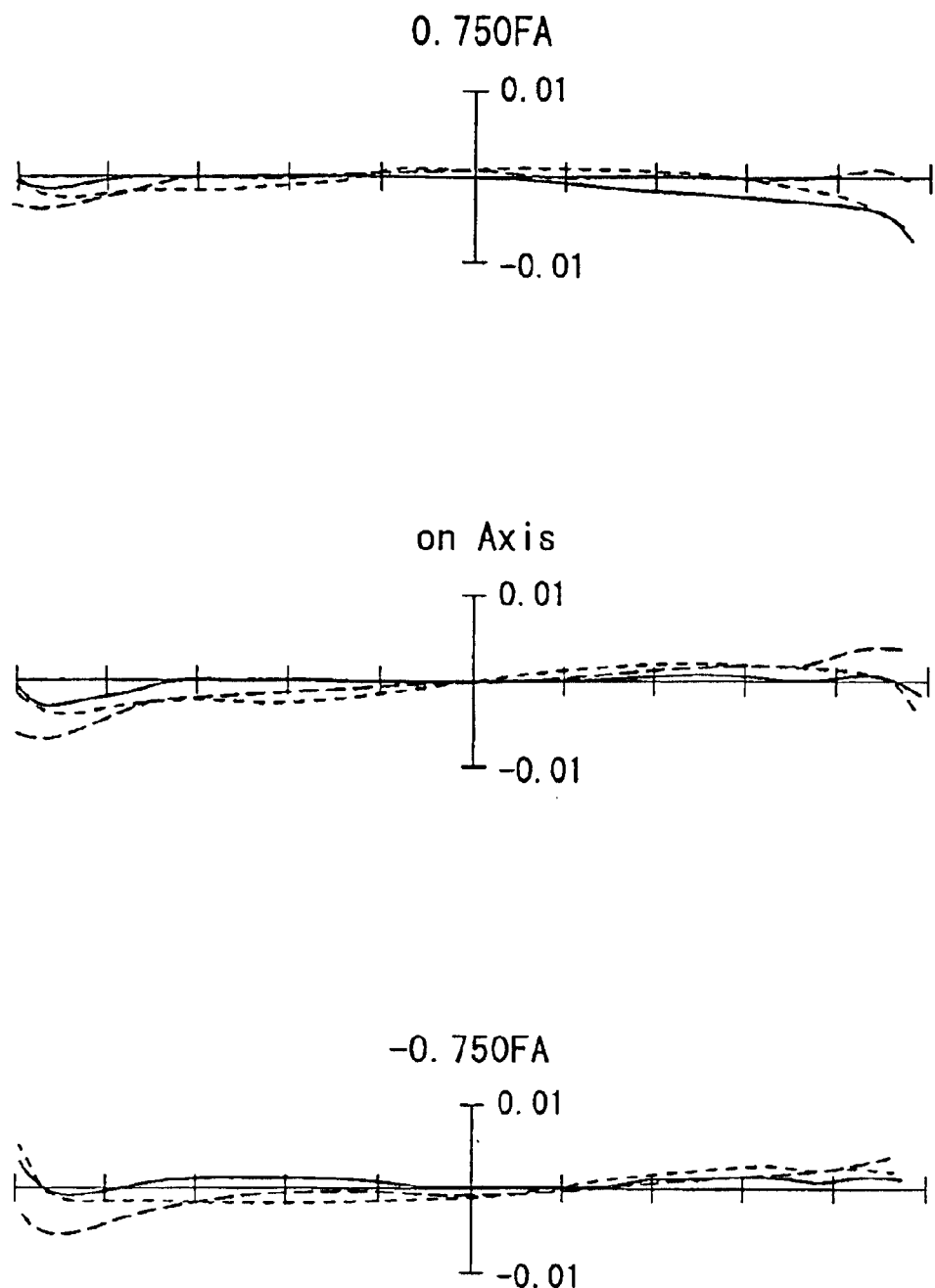
FIG. 41 shows aberration diagrams for the telescope end, in the state where camera shake is corrected, of the zoom lens according to the ninth embodiment of the present invention.

FIG. 41 shows the aberration diagrams during a camera shake correction at the telescope end. FIG. 41 shows the transverse aberration at an image point on the axis and at the image points of ±75% of the maximum image height in a case where the shooting distance is ∞, the aperture stop is open, and the second lens group G2 has been parallel displaced by 0.0725 mm in the direction perpendicular to the optical axis. The conditions and denotations for FIG. 41 are the same as those of FIG. 26 of the sixth embodiment. The amount 0.0725 mm by which the second lens group G2 is parallel displaced corresponds to a case where the shooting distance is ∞, at the telescope end, in which the zoom lens is tilted by 0.5°.

It is clear from the aberration diagrams of FIG. 41 that, like in the sixth embodiment, sufficient camera shake correction is possible for camera shake angles of the zoom lens up to 0.5°.

The same solid-state imaging elements as those described above in the first embodiment can be used in the zoom lens shown in FIG. 37.

As described above, the zoom lens shown in FIG. 37, with a zoom ratio of ×2.5 to ×3.2 and an angle of view at the wide-angle end of about 60°, has high resolution and a short overall optical length when not in use, and is moreover provided with a camera shake-correction function, and the image-forming properties when camera shake correction is performed are also good.

Tenth Embodiment

Figure 42:
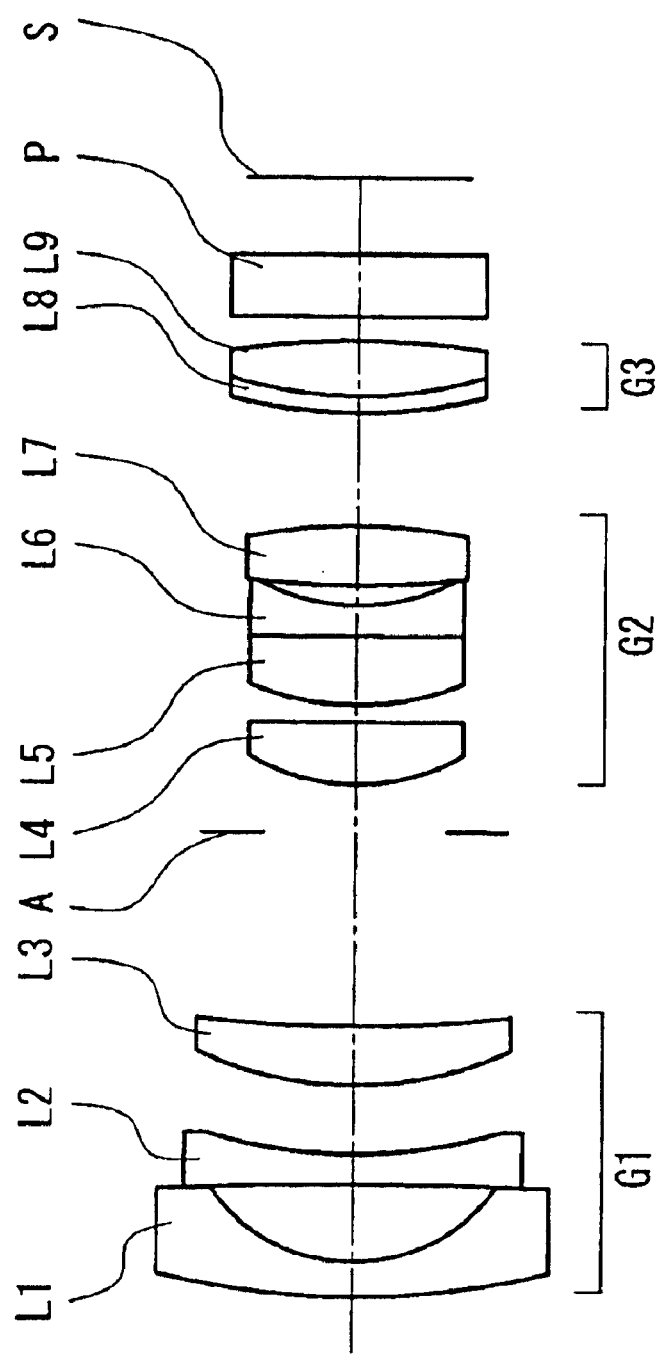
FIG. 42 is a layout drawing showing the configuration of a zoom lens according to a tenth embodiment of the present invention.

FIG. 42 is a layout drawing showing the configuration of a zoom lens according to a tenth embodiment of the present invention.

The zoom lens shown in FIG. 42 has the same configuration as the zoom lens detailed above in the ninth embodiment (see FIG. 37), and is different only in the manner in which the first lens group G1 is provided with aspherical surfaces. That is, in the first lens group G1 of the zoom lens shown in FIG. 37, the surface on the image plane S side of the second lens L2 of the first lens group G1 is an aspherical surface, whereas in the zoom lens according to this embodiment and shown in FIG. 42, the surface on the image plane S side of the first lens L1 of the first lens groups G1 is an aspherical surface. More specifically, the surface of the first lens L1 on the image plane S side is an aspherical surface whose local radius of curvature monotonically increases as distance from the center increases.

It is preferable that the various conditions set forth in Conditional Expressions (1) to (12) are satisfied in this embodiment as well.

Table 26 below shows specific examples of the numerical values of the zoom lens shown in FIG. 42, Table 27 below shows the aspheric coefficients of the zoom lens, and Table 28 below shows the variable distance between surfaces (in mm) in a case where the shooting distance of the zoom lens is ∞.

TABLE 26

| Group | Element | Surface | r | d | $n_d$ | $v_d$ |
|---|---|---|---|---|---|---|
| G1 | L1 | 1 | 25.701 | 1.200 | 1.66549 | 55.4 |
| | | 2 | 6.435* | 2.415 | | |
| | L2 | 3 | 432.478 | 1.150 | 1.75500 | 52.3 |
| | | 4 | 19.593 | 2.643 | | |
| | L3 | 5 | 15.290 | 2.146 | 1.74077 | 27.8 |
| | | 6 | 51.063 | variable | | |
| G2 | Stop | 7 | ∞ | 1.500 | | |
| | L4 | 8 | 7.968* | 2.200 | 1.66549 | 55.4 |
| | | 9 | ∞ | 0.729 | | |
| | L5 | 10 | 10.478 | 2.200 | 1.69680 | 55.5 |
| | L6 | 11 | 50.596 | 0.980 | 1.80518 | 25.5 |
| | | 12 | 5.509 | 0.972 | | |
| | L7 | 13 | 22.296* | 2.000 | 1.60602 | 57.8 |
| | | 14 | −66.133 | variable | | |
| G3 | L8 | 15 | 24.264 | 0.600 | 1.69895 | 30.1 |
| | L9 | 16 | 12.584 | 1.900 | 1.69680 | 55.5 |
| | | 17 | −53.311 | variable | | |
| | P | 18 | ∞ | 2.220 | 1.51680 | 64.2 |
| | | 19 | ∞ | | | |

TABLE 27

| | Second Surface | Eighth Surface | Thirteenth Surface |
|---|---|---|---|
| K | $-3.49956 \times 10^{-1}$ | $-1.39879 \times 10^{-1}$ | 0.0 |
| D | $-2.06432 \times 10^{-5}$ | $1.32646 \times 10^{-4}$ | $-2.91528 \times 10^{-4}$ |
| E | $-2.74808 \times 10^{-6}$ | $4.01355 \times 10^{-6}$ | $-9.51726 \times 10^{-6}$ |
| F | $1.30430 \times 10^{-7}$ | $-6.81505 \times 10^{-7}$ | $-8.38223 \times 10^{-7}$ |
| G | $-3.07567 \times 10^{-9}$ | $3.01305 \times 10^{-8}$ | $4.94365 \times 10^{-8}$ |

TABLE 28

| Surface Spacing | Wide-angle End | Intermediate Position | Telescope End |
|---|---|---|---|
| $d_6$ | 19.243 | 7.539 | 0.800 |
| $d_{14}$ | 3.898 | 8.712 | 17.046 |
| $d_{16}$ | 1.000 | 1.000 | 1.000 |
| F | 5.299 | 9.192 | 15.931 |
| F value | 2.72 | 3.47 | 4.80 |
| $2\omega$ | 63.86° | 38.70° | 22.74° |

Figure 43:
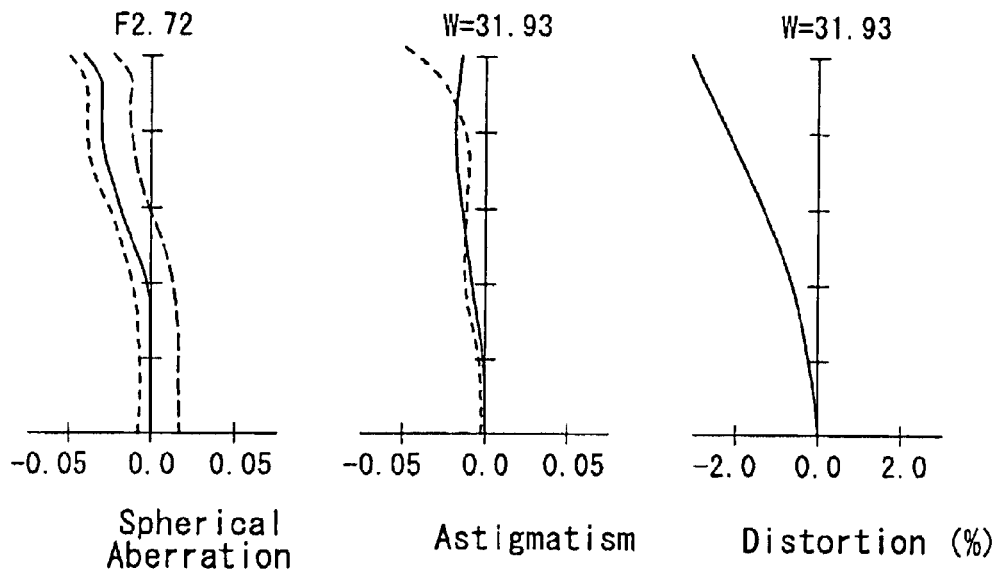
FIG. 43 shows aberration diagrams for the wide-angle end, in the standard state, of the zoom lens according to the tenth embodiment of the present invention.
Figure 44:
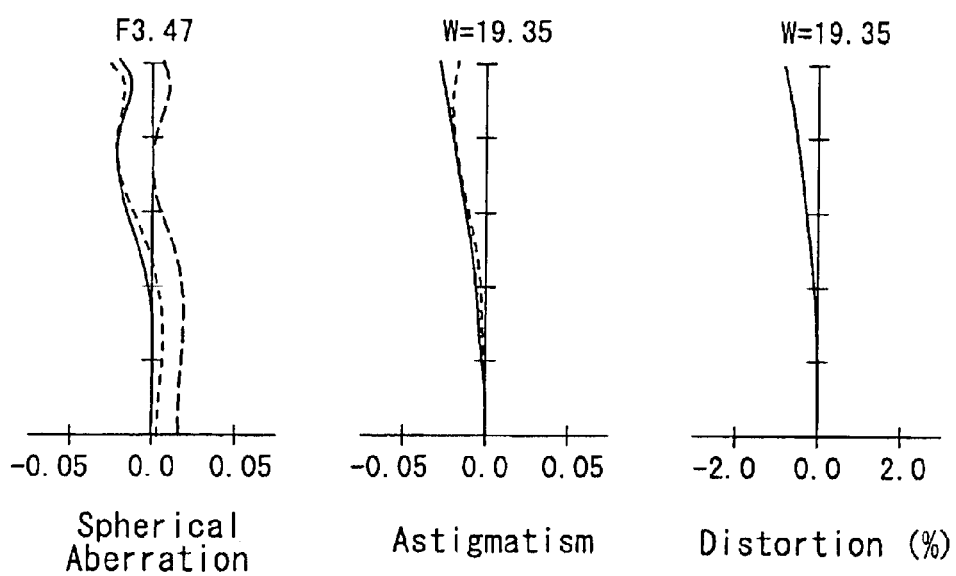
FIG. 44 shows aberration diagrams for the intermediate focal length (intermediate position), in the standard state, of the zoom lens according to the tenth embodiment of the present invention.
Figure 45:
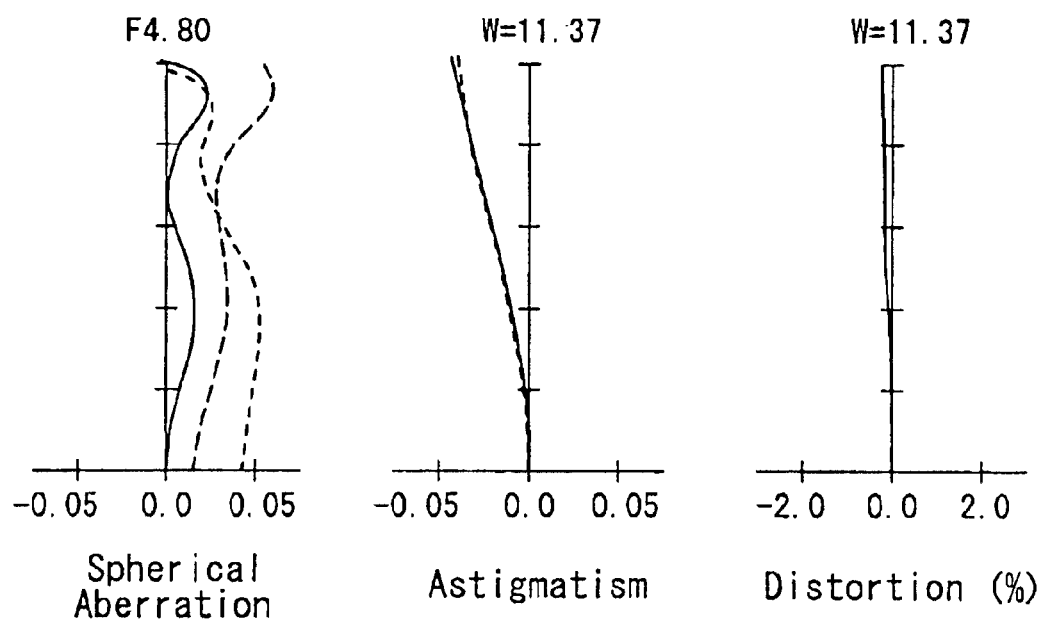
FIG. 45 shows aberration diagrams for the telescope end, in the standard state, of the zoom lens according to the tenth embodiment of the present invention.

FIGS. 43 to 45 are aberration diagrams (spherical aberration, astigmatism, and distortion) of the zoom lens shown in FIG. 42 when the shooting distance is ∞ and the aperture stop is open. FIG. 43 shows the case for the wide-angle end, FIG. 44 shows the case for the intermediate position, and FIG. 45 shows the case for the telescope end.

It is clear from the aberration diagrams shown in FIGS. 43 to 45 that the zoom lens of this embodiment demonstrates good aberration properties even if the zoom position is changed as the shooting distance changes.

Figure 46:
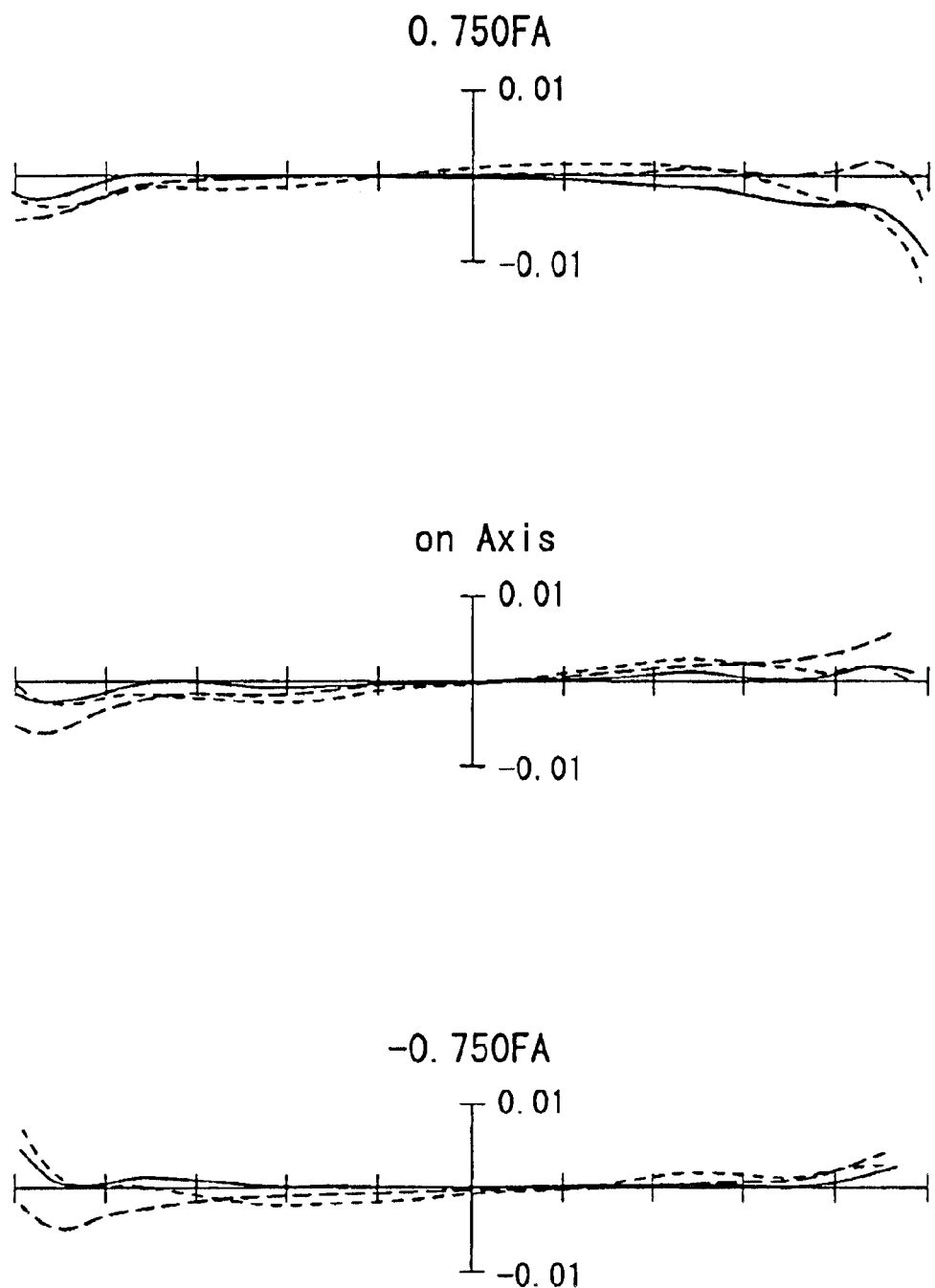
FIG. 46 shows aberration diagrams for the telescope end, in the state where camera shake is corrected, of the zoom lens according to the tenth embodiment of the present invention.

FIG. 46 shows the aberration diagrams during a camera shake correction at the telescope end. FIG. 46 shows the transverse aberration at an image point on the axis and at the image points of ±75% of the maximum image height in a case where the shooting distance is ∞, the aperture stop is open, and the second lens group G2 has been parallel displaced by 0.0692 mm in the direction perpendicular to the optical axis. The conditions and denotations for FIG. 46 are the same as those of FIG. 26 of the sixth embodiment. The amount 0.0692 mm by which the second lens group G2 is parallel displaced corresponds to a case where the shooting distance is ∞, at the telescope end, in which the zoom lens is tilted by 0.5°.

It is clear from the aberration diagrams of FIG. 46 that, like in the sixth embodiment, sufficient camera shake correction is possible for camera shake angles of the zoom lens up to 0.5°.

The same solid-state imaging elements as those described above in the first embodiment can be used in the zoom lens shown in FIG. 42.

As described above, the zoom lens shown in FIG. 42, with a zoom ratio of ×2.5 to ×3.2 and an angle of view at the wide-angle end of about 60°, has high resolution and a short overall optical length when not in use, and is moreover provided with a camera shake-correction function, and the image-forming properties when camera shake correction is performed are also good.

Eleventh Embodiment

Figure 47:
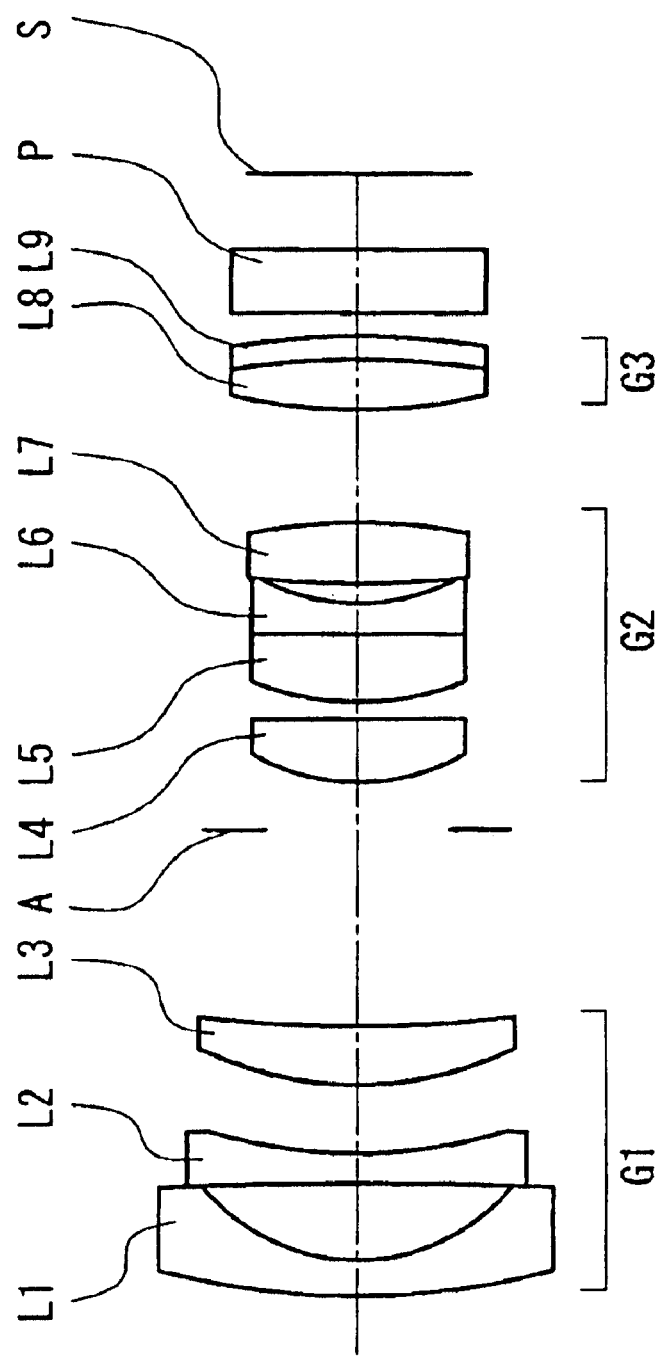
FIG. 47 is a layout drawing showing the configuration of a zoom lens according to an eleventh embodiment of the present invention.

FIG. 47 is a layout drawing showing the configuration of a zoom lens according to an eleventh embodiment of the present invention.

The zoom lens shown in FIG. 47 has a third lens group G3 with a configuration different than that in the zoom lens detailed above in the tenth embodiment (see FIG. 42), however, it is the same in all other aspects. That is, in the zoom lens shown in FIG. 42, the third lens group G3 is a cemented lens constituted by an eighth lens L8 that is a negative meniscus lens and a ninth lens L9 that is a biconvex lens, whereas in the zoom lens according to this embodiment and shown in FIG. 47 the third lens group G3 is a cemented lens constituted by an eighth lens L8 that is a biconvex lens and a ninth lens L9 that is a negative meniscus lens whose surface with strong curvature is facing the object.

It is preferable that the various conditions set forth in Conditional Expressions (1) to (12) are satisfied in this embodiment as well.

Table 29 below shows specific examples of the numerical values of the zoom lens shown in FIG. 47, Table 30 below shows the aspheric coefficients of the zoom lens, and Table 31 below shows the variable distance between surfaces (in mm) in a case where the shooting distance of the zoom lens is ∞.

TABLE 29

| Group | Element | Surface | r | d | $n_d$ | $v_d$ |
|---|---|---|---|---|---|---|
| G1 | L1 | 1 | 23.890 | 1.200 | 1.66549 | 55.4 |
|  |  | 2 | 6.390* | 2.477 |  |  |
|  | L2 | 3 | ∞ | 1.150 | 1.75500 | 52.3 |
|  |  | 4 | 18.112 | 2.512 |  |  |
|  | L3 | 5 | 15.390 | 2.146 | 1.74077 | 27.8 |
|  |  | 6 | 62.385 | variable |  |  |

TABLE 29-continued

| Group | Element | Surface | r | d | $n_d$ | $v_d$ |
|---|---|---|---|---|---|---|
| G2 | Stop | 7 | ∞ | 1.500 |  |  |
|  | L4 | 8 | 7.999* | 2.200 | 1.66549 | 55.4 |
|  |  | 9 | ∞ | 0.777 |  |  |
|  | L5 | 10 | 10.599 | 2.200 | 1.69680 | 55.5 |
|  | L6 | 11 | 78.018 | 0.980 | 1.80518 | 25.5 |
|  |  | 12 | 5.699 | 0.959 |  |  |
|  | L7 | 13 | 24.202* | 2.000 | 1.60602 | 57.8 |
|  |  | 14 | −63.985 | variable |  |  |
| G3 | L8 | 15 | 21.761 | 1.900 | 1.69680 | 55.5 |
|  | L9 | 16 | −20.418 | 0.600 | 1.69895 | 30.1 |
|  |  | 17 | −72.103 | variable |  |  |
|  | P | 18 | ∞ | 2.220 | 1.51680 | 64.2 |
|  |  | 19 | ∞ |  |  |  |

TABLE 30

| | Second Surface | Eighth Surface | Thirteenth Surface |
|---|---|---|---|
| K | $-3.37747 \times 10^{-1}$ | $-1.41801 \times 10^{-1}$ | 0.0 |
| D | $-2.55648 \times 10^{-5}$ | $-1.19954 \times 10^{-4}$ | $-3.59554 \times 10^{-4}$ |
| E | $-2.51707 \times 10^{-6}$ | $3.34983 \times 10^{-6}$ | $-1.02563 \times 10^{-5}$ |
| F | $1.26933 \times 10^{-7}$ | $-5.87463 \times 10^{-7}$ | $-1.19869 \times 10^{-6}$ |
| G | $-3.17465 \times 10^{-9}$ | $2.64426 \times 10^{-8}$ | $5.88132 \times 10^{-8}$ |

TABLE 31

| Surface Spacing | Wide-angle End | Intermediate Position | Telescope End |
|---|---|---|---|
| $d_6$ | 18.812 | 7.387 | 0.800 |
| $d_{14}$ | 3.887 | 8.784 | 17.273 |
| $d_{16}$ | 1.000 | 1.000 | 1.000 |
| F | 5.298 | 9.188 | 15.930 |
| F value | 2.71 | 3.47 | 4.81 |
| 2ω | 63.88° | 38.72° | 22.74° |

Figure 48:
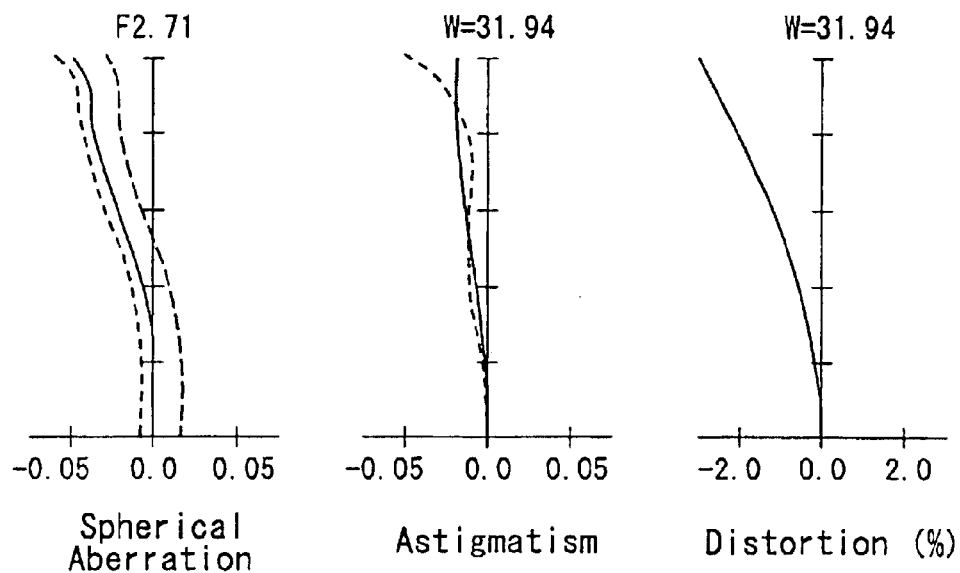
FIG. 48 shows aberration diagrams for the wide-angle end, in the standard state, of the zoom lens according to the eleventh embodiment of the present invention.
Figure 49:
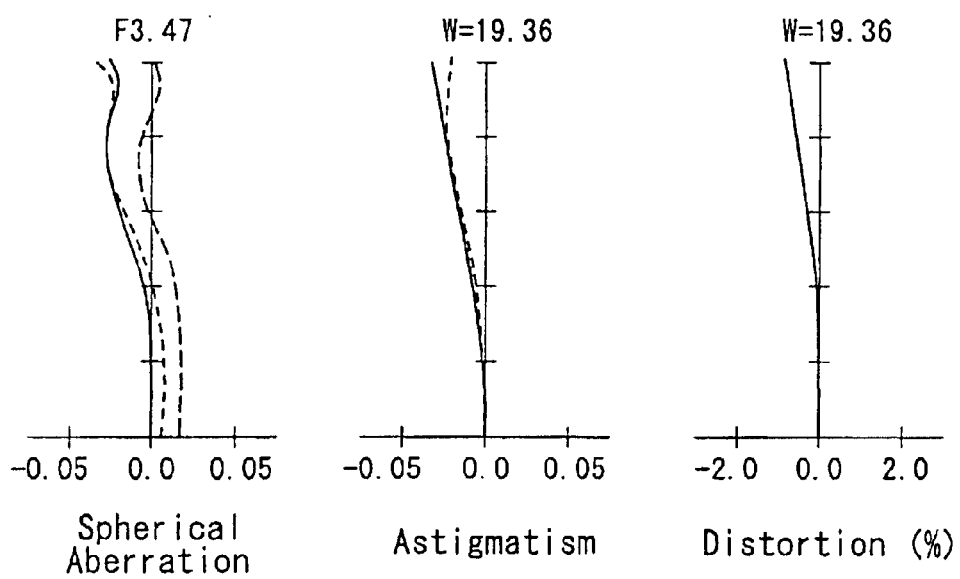
FIG. 49 shows aberration diagrams for the intermediate focal length (intermediate position), in the standard state, of the zoom lens according to the eleventh embodiment of the present invention.
Figure 50:
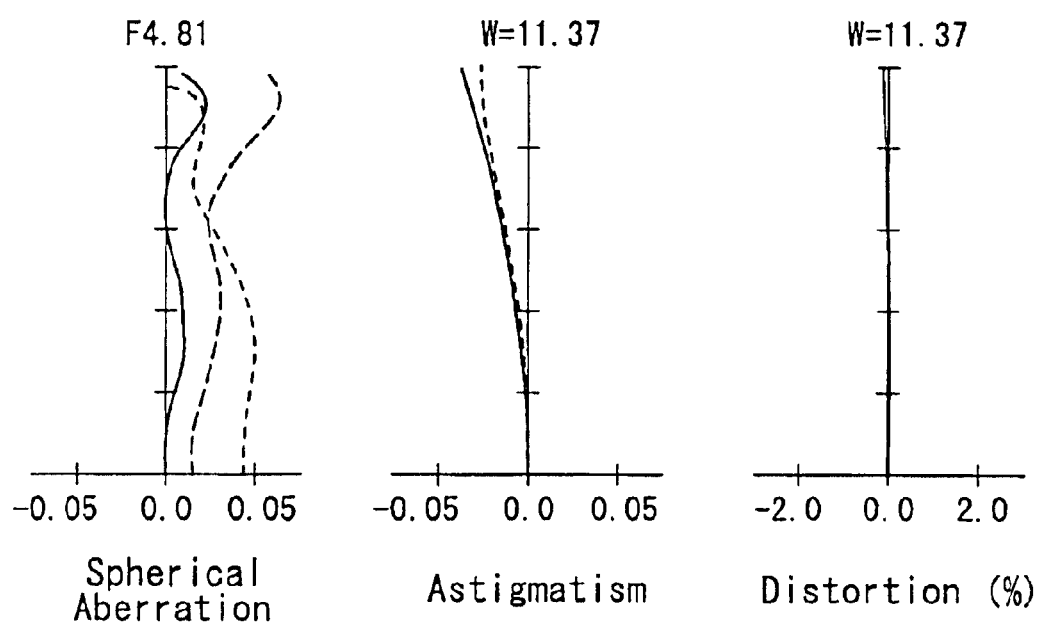
FIG. 50 shows aberration diagrams for the telescope end, in the standard state, of the zoom lens according to the eleventh embodiment of the present invention.

FIGS. 48 to 50 are aberration diagrams (spherical aberration, astigmatism, and distortion) of the zoom lens shown in FIG. 47 when the shooting distance is ∞ end the aperture stop is open. FIG. 48 shows the case for the wide-angle end, FIG. 49 shows the case for the intermediate position, and FIG. 50 shows the case for the telescope end.

It is clear from the aberration diagrams shown in FIGS. 48 to 50 that the zoom lens of this embodiment demonstrates good aberration properties even if the zoom position is changed as the shooting distance changes.

Figure 51:
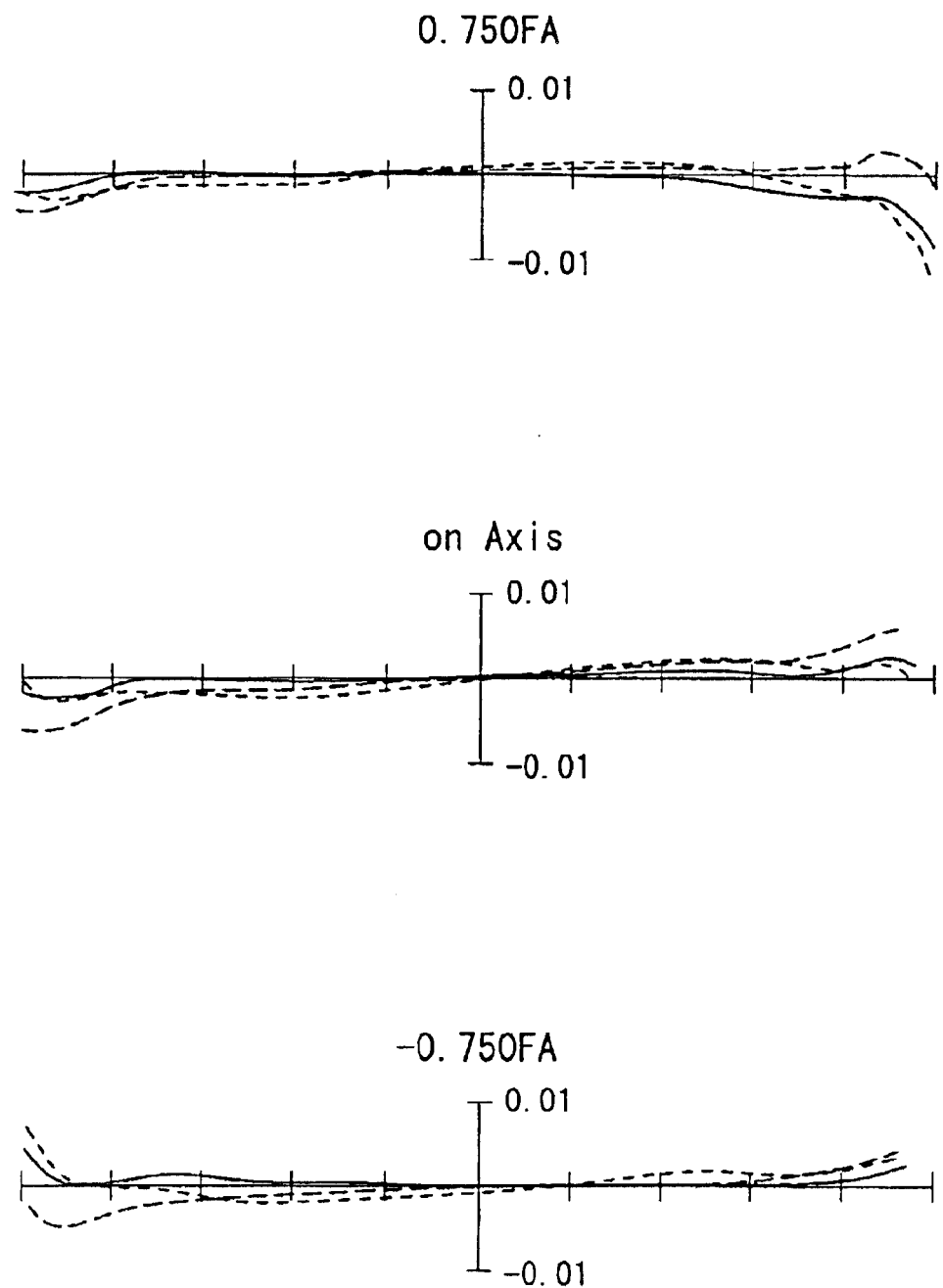
FIG. 51 shows aberration diagrams for the telescope end, in the state where camera shake is corrected, of the zoom lens according to the eleventh embodiment of the present invention.

FIG. 51 shows the aberration diagrams during a camera shake correction at the telescope end. FIG. 51 shows the transverse aberration at an image point on the axis and at the image points of ±75% of the maximum image height in a case where the shooting distance is ∞, the aperture stop is open, and the second lens group G2 has been parallel displaced by 0.0687 mm in the direction perpendicular to the optical axis. The conditions and denotations for FIG. 51 are the same as those of FIG. 26 of the sixth embodiment.

The amount 0.0687 mm by which the second lens group G2 is parallel displaced corresponds to a case where the shooting distance is ∞, at the telescope end, in which the zoom lens is tilted by 0.5°.

It is clear from the aberration diagrams of FIG. 51 that, like in the sixth embodiment, sufficient camera shake correction is possible for camera shake angles of the zoom lens up to 0.5°.

The same solid-state imaging elements as those described above in the first embodiment can be used in the zoom lens shown in FIG. 47.

As described above, the zoom lens shown in FIG. 47, with a zoom ratio of ×2.5 to ×3.2 and an angle of view at the wide-angle end of about 60°, has high resolution and a short overall optical length when not in use, and is moreover provided with a camera shake-correction function, and the image-forming properties when camera shake correction is performed are also good.

Table 32 below shows the main parameters and the numerical values of the conditional expressions detailed above for the sixth through eleventh embodiments described above.

TABLE 32

| Conditional Expressions | Embodiments | | | | | |
|---|---|---|---|---|---|---|
| | 6 | 7 | 8 | 9 | 10 | 11 |
| $f_{G2}/f_W$ | 2.453 | 2.460 | 2.552 | 2.536 | 2.540 | 2.532 |
| $f_{G3}/f_W$ | 6.392 | 6.417 | 4.585 | 4.587 | 4.585 | 4.586 |
| $d_{L6}/f_{G2}$ | 0.038 | 0.054 | 0.057 | 0.076 | 0.072 | 0.071 |
| $f_4/f_{G2}$ | 0.972 | 0.895 | 1.048 | 1.052 | 0.890 | 0.896 |
| $f_7/f_{G2}$ | 2.617 | 1.858 | 2.293 | 2.408 | 2.062 | 2.178 |
| σ | 2.016 | 1.954 | 1.961 | 1.919 | 1.850 | 1.863 |
| $B_7$ | −13.12 | −10.41 | −6.31 | −6.22 | −7.27 | −7.41 |

Twelfth Embodiment

Figure 52:
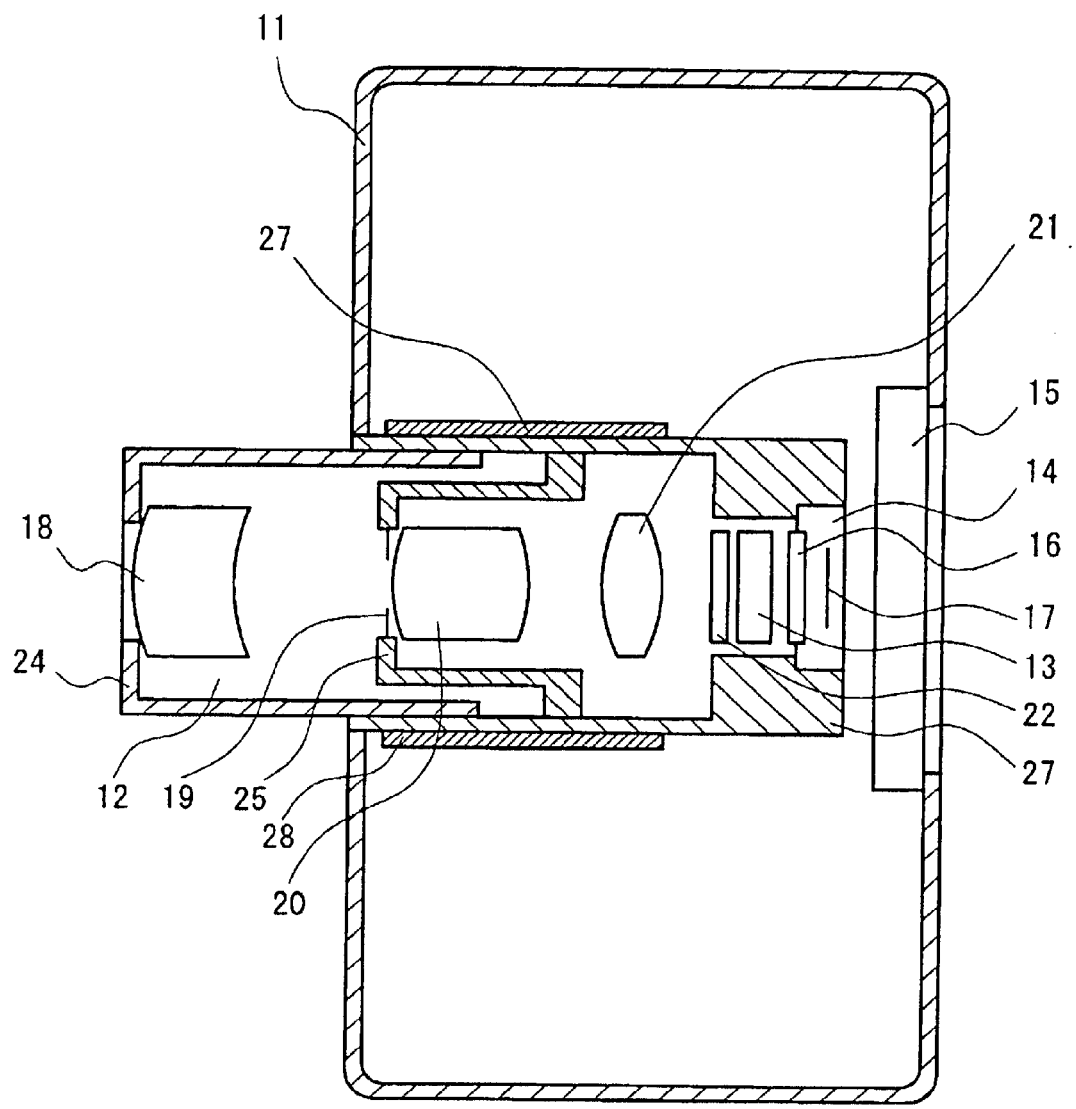
FIG. 52 diagrammatically shows the configuration of an electronic still camera according to a twelfth embodiment of the present invention.

FIG. 52 is a diagrammatic structural diagram showing the electronic still camera according to a twelfth embodiment of the present invention.

In FIG. 52, the reference numeral 12 denotes a zoom lens, 14 denotes a solid-state imaging element, 15 denotes a liquid crystal monitor, 18 denotes a first lens group, 19 denotes an aperture stop, 20 denotes a second lens group, and 21 denotes a third lens group.

The zoom lens 12 is arranged on the front side of a housing 11, and to the rear of the zoom lens 12 are arranged an infrared cut filter 22, an optical low-pass filter 13 and the solid-state imaging element 14 in that order from the object side to the image plane side. The liquid crystal monitor 15 is arranged at the rear side of the housing 11, and the solid-state imaging element 14 and the liquid crystal monitor 15 are near one another.

The infrared cut filter 22 is characterized by absorbing infrared light and passing light in the visible spectrum. The optical low-pass filter 13 has a configuration in which a first quartz plate, a second quartz plate, and a third quartz plate are cemented by a transparent adhesive and arranged in that order from the object side to the image plane side. The three quartz plates are parallel flat plates and the optic axes of the quartz plates are tilted 45° with respect to the optical axis. Also, seen from the zoom lens 12, the directions in which the optic axes of the quartz plates are projected onto a light-receiving surface 17 of the solid-state imaging element 14 are for the first quartz plate a direction rotated 45° to the left from the image horizontal direction, for the second quartz plate a direction rotated 45° to the right from the image horizontal direction, and for the third quartz plate the image horizontal direction. The optical low-pass filter 13 prevents error signals such as moiré due to the pixel structure of the solid-state imaging element 14.

The solid-state imaging element 14 has an effective pixel number of 1800 (horizontal)×1200 (vertical), a pixel pitch of 3.2 μm (horizontal)×3.2 μm (vertical), and an, effective image size of 5.12 mm (horizontal)×3.84 mm (vertical), and each pixel is provided with a miniature positive lens. A cover glass 16 is provided on the object-side of the solid-state imaging element 14. The image of the subject captured by the zoom lens 12 is formed on the light-receiving surface 17.

In this embodiment, the zoom lens shown in FIG. 22 is used as the zoom lens 12. The zoom lens 12 is constituted by a first lens group 18, an aperture stop 19, a second lens group 20, and a third lens group 21, arranged in that order from the object side to the image plane side.

The first lens group 18 is attached to a moving lens barrel 24. The second lens group 20 is attached to a member 25 that can be parallel displaced in the direction perpendicular to the optical axis, and the aperture stop 19 is attached to the object-side of the member 25. By adopting this configuration, the aperture stop 19 can be shifted in the optical axis direction as a single unit with the second lens group 20, and it is possible to parallel displace only the second lens group 20 in the direction perpendicular to the optical axis during camera shake correction.

The moving lens barrel 24 and the member 25 are incorporated into a main lens barrel 27, and can be moved in the direction of the optical axis. The moving lens barrel 24 and the member 25 can be moved in the direction of the optical axis in such a manner that their position with respect to the solid-state imaging element 14 becomes a predetermined relationship, by rotating a cylindrical cam 28 that is attached to the outside of the main lens barrel 27, thereby allowing the combined focal length of the overall lens system to be changed. In the case of changing from the wide-angle end to the telescope end, the first lens group 18 projects toward the object after it has been retreated toward the image plane, and the second lens group 20 is monotonically moved from the image plane side to the object side. By adopting a collapsed configuration in which the first lens group 18, the member 25, and the third lens group 21 are each drawn toward the image plane (toward the solid-state imaging element 14) when not in use, it is possible to shorten the overall optical length of the zoom lens when not in use (when collapsed). A mechanism for drawing the first lens group 18 and the member 25 toward the image plane can be achieved by extending the cam grooves of the cylindrical cam 27.

The third lens group 21 can be moved in the direction of the optical axis by a motor. By detecting the position at which high-frequency components of the captured image become a peak while moving the third lens group 21 in the direction of the optical axis by the motor and then moving the third lens group 21 to that position, it is possible to carry out automatic focus adjustment.

If the zoom lens is tilted due to camera shake, then by parallel displacing the second lens group 20 by a predetermined amount using an actuator of shifting in the image horizontal direction and an actuator for shifting in the image vertical direction, it is possible perform camera shake correction. For example, if the zoom lens is tilted due to camera shake so that its object side drops, then camera shake correction can be performed by parallel displacing the second lens group 20 upward by a predetermined amount using the actuator for parallel displacing in the image vertical direction. To perform camera shake correction requires means for detecting the camera shake angle of the zoom lens in the image horizontal direction, the camera shake angle in the image vertical direction, the magnification of the second lens group 20, and the magnification of the third lens group 21. Two angle velocity sensors can be used to detect the two camera shake angles, and a position detection sensor for determining the positions of the second lens group 20 and the third lens group 21 with respect to the solid-state imaging element 14 can be used to detect the magnification of the second lens group 20 and the magnification of the third lens group 21. In this case, it is possible to calculate by microcomputer the camera shake angles of the two directions, the magnification of the second lens group 20, and the magnification of the third lens group 21 based on the output of these sensors, generate the required control signals, and input the control signals to the actuators.

As described above, it is possible to provide an electronic still camera whose zoom ratio is at least ×2.5, whose angle of view at the wide-angle end is about 60°, and which has high resolution and is thin in the depth direction when not in use.

The electronic still camera described above can be provided with an electronic zoom function for using a signal processing circuit to magnify to the entire picture the image that is formed in the center portion of the solid-state imaging element.

It should be noted that the zoom lens according to the sixth embodiment was used in the electronic still camera shown in FIG. 52, however, any of the zoom lenses according to the seventh through eleventh embodiments may be used in place of the zoom lens of the sixth embodiment. Also, an electronic still camera without the camera shake correction function is also extremely useful as an electronic still camera.

The optical system of the electronic still camera shown in FIG. 52 can also be used in video cameras designed for moving pictures. In this case, it is possible to capture not only moving pictures but also still pictures at high resolution.

Industrial Applicability

As described above, with the present invention it is possible to provide a zoom lens with a zoom ratio of ×2.5 to ×3.2 and an angle of view at the wide-angle end of about 60°, that has high resolution, and that has a short overall optical length when not in use, and it is moreover possible to achieve a zoom lens provided with a camera shake-correction function, and thus the zoom lens can be employed in a high-performance electronic still camera that is compact.

What is claimed is:

1. A zoom lens comprising a first lens group with a negative power, an aperture stop, a second lens group with a positive power, and a third lens group with a positive power, arranged in that order from an object side to an image plane side, wherein the first lens group comprises a first lens that is a negative meniscus lens whose surface with strong curvature is facing the image plane, a second lens that is a negative meniscus lens whose surface with strong curvature is facing the image plane, and a third lens that is a positive lens, arranged in that order from the object side;

wherein the second lens group comprises a fourth lens that is a positive lens, a fifth lens that is a positive lens, a sixth lens that is a negative lens, and a seventh lens that is a positive lens, arranged in that order from the object side;

wherein the third lens group comprises a single positive lens, and can be moved in the optical axis direction for focus adjustment;

wherein the image plane-side surface of the first lens or the second lens is an aspherical surface whose local radius of curvature is monotonically increased as distance from the center increases;

wherein the object-side surface of the fourth lens is an aspherical surface whose local radius of curvature is monotonically increased as distance from the center increases;

wherein the object-side surface of the seventh lens is an aspherical surface whose local radius of curvature is monotonically increased as distance from the center increases, or the image plane-side surface of the seventh lens is an aspherical surface whose local radius of curvature is monotonically decreased as distance from the center increases;

wherein when zooming from a wide-angle end to a telescope end, an air gap between the first lens group and the second lens group is reduced and an air gap from the second lens to the third lens group is increased;

wherein a zoom ratio is ×2.5 to ×3.2 if the shooting distance is ∞, wherein the angle of view at the wide-angle end is approximately 60°; and wherein when the shooting distance is ∞, $f_W$ is a combined focal length of the overall lens system at the wide-angle end, $f_{G2}$ is a combined focal length of the second lens group, $f_{G3}$ is a combined focal length of the third lens group, $d_{L6}$ is an air gap between the sixth lens and the seventh lens, $f_4$ is a focal length of the fourth lens, and $f_7$ is a focal length of the seventh lens, the conditional expressions $$2.0 < f_{G2}/f_W < 3.0 \tag{1}$$

$$4.0 < f_{G3}/f_W < 7.0 \tag{2}$$

$$0.02 < d_{L6}/f_{G2} < 0.1 \tag{3}$$

$$0.8 < f_4/f_{G2} < 1.2 \tag{4}$$

$$1.6 < f_7/f_{G2} < 3.0 \tag{5}$$

are satisfied.

2. The zoom lens according to claim 1, wherein the fifth lens and the sixth lens are cemented.

3. The zoom lens according to claim 1, wherein the sixth lens and the seventh lens are in contact outside their effective diameters.

4. The zoom lens according to claim 1, wherein the third lens group is a cemented lens constituted by a positive lens and a negative lens.

5. The zoom lens according to claim 1, wherein the surface of the fourth lens that is on the image plane side is a flat surface.

6. A zoom lens comprising a first lens group with a negative power, an aperture stop, a second lens group with a positive power, and a third lens group with a positive power, arranged in that order from an object side to an image plane side, wherein the second lens group is provided with a positive lens that is arranged furthest to the object side and a positive lens that is arranged furthest to the image plane side;

wherein when zooming from a wide-angle end to a telescope end, an air gap between the first lens group and the second lens group is reduced and an air gap between the second lens group and the third lens group is increased;

wherein the third lens group can be moved in the optical axis direction for focus adjustment;

wherein the second lens group can be parallel displaced in the direction perpendicular to the optical axis;

wherein the zoom ratio is ×2.5 to ×3.2 if the shooting distance is ∞, wherein the angle of view at the wide-angle end is approximately 60°;

wherein when $m_{G2T}$ is the magnification of the second lens group at the telescope end with a shooting distance of ∞ and $m_{G3T}$ is the magnification of the third lens group at the telescope end with a shooting distance of ∞, and σ is defined as $\sigma=(1-m_{G2T})m_{G3T}$, then the conditional expression $$1.7<|\sigma|<2.1 \quad (6)$$

is satisfied; and wherein when the shooting distance is ∞, $f_W$ is a combined focal length of the overall lens system at the wide-angle end, $f_{G2}$ is a combined focal length of the second lens group, $f_{G3}$ is a combined focal length of the third lens group, $d_{G2R}$ is an air gap between the lens furthest to the image plane side and the lens furthest to the object side of the second lens group, $f_{G2F}$ is a focal length of the lens of the second lens group furthest to the object side, and $f_{G2R}$ is a focal length of the lens of the second lens group furthest to the image plane side, then the conditional expressions $$2.2<f_{G2}/f_W<2.8 \quad (7)$$
$$4.0<f_{G3}/f_W<7.0 \quad (8)$$
$$0.02<d_{G2R}/f_{G2}<0.1 \quad (9)$$
$$0.8<f_{G2F}/f_{G2}<1.2 \quad (10)$$
$$1.5<f_{G2R}/f_{G2}<3.0 \quad (11)$$

are satisfied.

7. The zoom lens according to claim 6, wherein the first lens group comprises a first lens that is a negative meniscus lens whose surface with strong curvature is facing the image plane, a second lens that is a negative meniscus lens whose surface with strong curvature is facing the image plane, and a third lens that is a positive lens, arranged in that order from the object side;

wherein the second lens group comprises a fourth lens that is a positive lens, a fifth lens that is a positive lens, a sixth lens that is a negative lens, and a seventh lens that is a positive lens, arranged in that order from the object side;

wherein the third lens group comprises a single positive lens;

wherein the image plane-side surface of the first lens or the second lens is an aspherical surface whose local radius of curvature is monotonically increased as distance from the center increases;

wherein the object-side surface of the fourth lens is an aspherical surface whose local radius of curvature is monotonically increased as distance from the center increases;

wherein the object-side surface of the seventh lens is an aspherical surface whose local radius of curvature is monotonically increased as distance from the center increases, or the image plane-side surface of the seventh lens is an aspherical surface whose local radius of curvature is monotonically decreased as distance from the center increases;

wherein an air gap between the aperture stop and the second lens group is constant; and wherein the position of the aperture stop in the direction perpendicular to the optical axis is fixed.

8. The zoom lens according to claim 7, wherein when $n_7$ is the refractive index of the seventh lens, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end when the shooting distance is ∞, then $B_7$ defined by Expression 8 satisfies the below condition $$-15<B_7<-5 \quad (12)$$

$$B_7 = (n_7-1)\left(\frac{\kappa_{7F}}{r_{7F}^3}+8D_{7F}-\frac{\kappa_{7R}}{r_{7R}^3}-8D_{7R}\right)f_T^3. \quad \text{Expression 8}$$

9. The zoom lens according to claim 7,
wherein the fifth lens and the sixth lens are cemented.

10. The zoom lens according to claim 7,
wherein the sixth lens and the seventh lens are in contact outside their effective diameters.

11. The zoom lens according to claim 7,
wherein the third lens group is a cemented lens constituted by a positive lens and a negative lens.

12. The zoom lens according to claim 7,
wherein the surface of the fourth lens that is on the image plane side is a flat surface.

13. An electronic still camera comprising a zoom lens and a solid-state imaging element,
wherein the zoom lens is any zoom lens set forth in claim 1.

14. The electronic still camera according to claim 13,
wherein a miniature positive lens is provided at each pixel of the solid-state imaging element.

15. An electronic still camera comprising a zoom lens in which a portion of the lens groups are parallel displaced in a direction perpendicular to an optical axis, a solid-state imaging element, a camera shake detection means for detecting a camera shake angle in two directions, and a lens group drive means for parallel displacing the parallel displaced lens group in correspondence with signals output by the camera shake detection means;
wherein the zoom lens is any zoom lens set forth in claim 6.

16. The electronic still camera according to claim 15,
wherein a miniature positive lens is provided at each pixel of the solid-state imaging element.

17. The electronic still camera according to claim 15,
provided with an electronic zoom means that uses a signal processing circuit to magnify, up to the entire picture, an image formed in a center portion of the solid-state imaging element.

18. A zoom lens comprising a first lens group with a negative power, an aperture stop, a second lens group with a positive power, and a third lens group with a positive power, arranged in that order from an object side to an image plane side,
wherein the first lens group comprises a first lens that is a negative meniscus lens whose surface with strong curvature is facing the image plane, a second lens that is a negative meniscus lens whose surface with strong curvature is facing the image plane, and a third lens that is a positive lens, arranged in that order from the object side;

wherein the second lens group comprises a fourth lens that is a positive lens, a fifth lens that is a positive lens, a sixth lens that is a negative lens, and a seventh lens that is a biconvex lens, arranged in that order from the object side;

wherein the third lens group comprises a single positive lens, and can be moved in the optical axis direction for focus adjustment;

wherein the image plane-side surface of the first lens or the second lens is an aspherical surface;

wherein the object-side surface of the fourth lens is an aspherical surface whose local radius of curvature is monotonically increased as distance from the center increases;

wherein the object-side surface or the image plane-side surface of the seventh lens is an aspherical surface where an absolute value of the local radius of curvature has a local maximum in a range from the center to the effective diameter;

wherein when zooming from a wide-angle end to a telescope end, an air gap between the first lens group and the second lens group is reduced and an air gap between the second lens group and the third lens group is increased;

wherein a zoom ratio is ×2.5 to ×3.2 if the shooting distance is ∞, wherein the angle of view at the wide-angle end is approximately 60°; and wherein when the shooting distance is ∞, $f_W$ is a combined focal length of the overall lens system at the wide-angle end, $f_{G2}$ is a combined focal length of the second lens group, $f_{G3}$ is a combined focal length of the third lens group, $d_{L6}$ is an air gap between the sixth lens and the seventh lens, $f_4$ is a focal length of the fourth lens, and $f_7$ is a focal length of the seventh lens, then the conditional expressions $$2.2 < f_{G2}/f_W < 2.8 \quad (13)$$

$$4.0 < f_{G3}/f_W < 7.0 \quad (14)$$

$$0.05 < d_{L6}/f_{G2} < 0.15 \quad (15)$$

$$0.9 < f_4/f_{G2} < 1.2 \quad (16)$$

$$1.2 < f_7/f_{G2} < 1.7 \quad (17)$$

are satisfied.

19. The zoom lens according to claim 18,
wherein the fifth lens and the sixth lens are cemented.
20. The zoom lens according to claim 18,
wherein the image-plane side surface of the fourth lens is a flat surface.
21. The zoom lens according to claim 18,
wherein if the image-plane side surface of the first lens is an aspherical surface, then that aspherical surface is an aspherical surface in which the local radius of curvature is monotonically increased as distance from the center increases.
22. The zoom lens according to claim 18,
wherein if the image-plane side surface of the second lens is an aspherical surface, then that aspherical surface is an aspherical surface in which the local curvature is monotonically decreased as distance from the center increases, and the local curvature at the effective diameter is negative.
23. The zoom lens according to claim 18,
wherein the third lens group is a cemented lens constituted by a positive lens and a negative lens.
24. A zoom lens comprising a first lens group with a negative power, an aperture stop, a second lens group with a positive power, and a third lens group with a positive power, arranged in that order from an object side to an image plane side, wherein the second lens group comprises a positive lens arranged furthest to the object side and a positive lens arranged furthest to the image plane side;

wherein the lens of the second lens group furthest to the image-plane side can be parallel displaced in the direction perpendicular to an optical axis;

wherein the third lens group can be moved in the direction of the optical axis for focus adjustment;

wherein when zooming from a wide-angle end to a telescope end, an air gap between the first lens group and the second lens group is reduced and an air gap between the second lens group and the third lens group is increased;

wherein a zoom ratio is ×2.5 to ×3.2 if the shooting distance is ∞, wherein the angle of view at the wide-angle end is approximately 60°;

wherein when $m_{DT}$ is the magnification of the parallel displaced lens at the telescope end with a shooting distance of ∞ and $M_{G3T}$ is the magnification of the third lens group at the telescope end with a shooting distance of ∞, then the conditional expression $$0.9 < (1 - m_{DT}) m_{G3T} < 1.3 \quad (18)$$

is satisfied; and wherein when the shooting distance is ∞, $f_W$ is a combined focal length of the overall lens system at the wide-angle end, $f_{G2}$ is a combined focal length of the second lens group, $f_{G3}$ is a combined focal length of the third lens group, $d_{G2R}$ is an air gap between the lens furthest to the image plane side and the lens furthest to the object side of the second lens group, $f_{G2F}$ is a focal length of the lens of the second lens group furthest to the object side, and $f_{G2R}$ is a focal length of the lens of the second lens group furthest to the image plane side, then the conditional expressions $$2.2 < f_{G2}/f_W < 2.8 \quad (13)$$

$$4.0 < f_{G3}/f_W < 7.0 \quad (14)$$

$$0.05 < d_{G2R}/f_{G2} < 0.15 \quad (22)$$

$$0.9 < f_{G2F}/f_{G2} < 1.2 \quad (23)$$

$$1.2 < f_{G2R}/f_{G2} < 1.7 \quad (24)$$

are satisfied.

25. The zoom lens according to claim 24,
wherein the first lens group comprises a first lens that is a negative meniscus lens whose surface with strong curvature is facing the image plane, a second lens that is a negative meniscus lens whose surface with strong curvature is facing the image plane, and a third lens that is a positive lens, arranged in that order from the object side;

wherein the second lens group comprises a fourth lens that is a positive lens, a fifth lens that is a positive lens, a sixth lens that is a negative lens, and a seventh lens that is a biconvex lens, arranged in that order from the object side;

wherein the third lens group comprises a single positive lens;

wherein the image plane-side surface of the first lens or the second lens is an aspherical surface;

wherein the object-side surface of the fourth lens is an aspherical surface whose local radius of curvature is monotonically increased as distance from the center increases;

wherein the object-side surface or the image plane-side surface of the seventh lens is an aspherical surface where an absolute value of the local radius of curvature has a local maximum in a range from the center to the effective diameter;

wherein an air gap between the aperture stop and the second lens group is constant; and wherein the position of the aperture stop in the direction perpendicular to the optical axis is fixed.

26. The zoom lens according to claim 25, wherein when $n_7$ is the refractive index of the seventh lens, $r_{7F}$ is the paraxial radius of curvature of its surface on the object side, $\kappa_{7F}$ is the conic constant of its surface on the object side, $D_{7F}$ is the fourth-order aspheric coefficient of its surface on the object side, $r_{7R}$ is the paraxial radius of curvature of its surface on the image plane side, $\kappa_{7R}$ is the conic constant of its surface on the image plane side, $D_{7R}$ is the fourth-order aspheric coefficient of its surface on the image plane side, and $f_T$ is the combined focal length of the overall lens system at the telescope end when the shooting distance is ∞, then $B_7$ defined by Expression 9 satisfies the below conditions $$-1.5 < B_7 < -0.7 \quad (19)$$

$$B_7 = (n_7 - 1)\left(\frac{\kappa_{7F}}{r_{7F}^3} + 8D_{7F} - \frac{\kappa_{7R}}{r_{7R}^3} - 8D_{7R}\right)f_T^3. \quad \text{Expression 9}$$

27. The zoom lens according to claim 25, wherein when the Abbe number of the seventh lens at a d-line is $\nu_7$, then the conditional expression $$\nu_7 > 50 \quad (20)$$

is satisfied.

28. The zoom lens according to claim 25, wherein the fifth lens and the sixth lens are cemented.

29. The zoom lens according to claim 24, wherein the third lens group is a cemented lens constituted by a positive lens and a negative lens.

30. The zoom lens according to claim 25, wherein the image-plane side surface of the fourth lens is a flat surface.

31. The zoom lens according to claim 25, wherein if the image-plane side surface of the first lens is an aspherical surface, then that aspherical surface is an aspherical surface in which the local radius of curvature is monotonically increased as distance from the center increases.

32. The zoom lens according to claim 25, wherein if the image-plane side surface of the second lens is an aspherical surface, then that aspherical surface is an aspherical surface in which the local curvature is monotonically decreased as distance from the center increases, and the local curvature at the effective diameter is negative.

33. An electronic still camera comprising a zoom lens and a solid-state imaging element, wherein the zoom lens is any zoom lens set forth in claim 18.

34. The electronic still camera according to claim 33, wherein a miniature positive lens is provided at each pixel of the solid-state imaging element.

35. An electronic still camera comprising a zoom lens where a portion of the lenses is parallel displaced in the direction perpendicular to an optical axis, a solid-state imaging element, a camera shake detection means for detecting a camera shake angle in two directions, and a lens drive means for parallel displacing the parallel displaced lens in correspondence with signals output by the camera shake detection means; wherein the zoom lens is any zoom lens set forth in claim 24.

36. The electronic still camera according to claim 35, wherein a miniature positive lens is provided at each pixel of the solid-state imaging element.

37. The electronic still camera according to claim 35, provided with an electronic zoom means that uses a signal processing circuit to magnify, up to the entire picture, an image formed in a center portion of the solid-state imaging element.

* * * * *